US012668466B2

(12) United States Patent
Augustsson

(10) Patent No.: US 12,668,466 B2
(45) Date of Patent: Jun. 30, 2026

(54) NAVIGATOR INTERFACE

(71) Applicant: FQ IP AB, Mölndal (SE)

(72) Inventor: Per Augustsson, Mölndal (SE)

(73) Assignee: FQ IP AB, Mölndal (SE)

( * ) Notice: Subject to any disclaimer, the term of this patent is extended or adjusted under 35 U.S.C. 154(b) by 422 days.

(21) Appl. No.: 18/122,912

(22) Filed: Mar. 17, 2023

(65) Prior Publication Data

US 2024/0308824 A1     Sep. 19, 2024

(51) Int. Cl.
| | |
|---|---|
| *B62B 5/00* | (2006.01) |
| *B66F 9/06* | (2006.01) |
| *B66F 9/075* | (2006.01) |
| *B66F 9/18* | (2006.01) |
| *G05D 1/656* | (2024.01) |
| *G05D 105/28* | (2024.01) |

(52) U.S. Cl.
CPC .......... *B66F 9/063* (2013.01); *B66F 9/07504* (2013.01); *B66F 9/0755* (2013.01); *B66F 9/07559* (2013.01); *B66F 9/07581* (2013.01); *B66F 9/18* (2013.01); *G05D 1/656* (2024.01); *G05D 2105/28* (2024.01)

(58) Field of Classification Search
CPC ....... B62D 63/025; B62D 27/00; B66F 9/063; B66F 9/07504; B66F 9/07559; B66F 9/07581; B66F 9/18; Y10S 901/01; G05D 1/656; G05D 2105/28; G05B 2219/45084; B25J 5/007
See application file for complete search history.

(56) References Cited

U.S. PATENT DOCUMENTS

| | | | |
|---|---|---|---|
| 8,544,574 | B2 | 10/2013 | Fegley et al. |
| 8,725,363 | B2 | 5/2014 | Elston et al. |
| 9,082,293 | B2 | 7/2015 | Wellman et al. |
| 10,017,322 | B2 | 7/2018 | High et al. |
| 10,214,400 | B2 | 2/2019 | High et al. |
| 10,875,540 | B2 | 12/2020 | Takhirov et al. |
| 11,077,551 | B2 | 8/2021 | Skaaksrud et al. |
| 11,222,299 | B1 | 1/2022 | Baalke et al. |
| 11,235,756 | B2 | 2/2022 | Kim |
| 12,110,050 | B2 * | 10/2024 | Augustsson ........... B62D 63/02 |
| 2004/0015266 | A1 | 1/2004 | Skoog |
| 2004/0073337 | A1 | 4/2004 | Mckee et al. |
| 2004/0093650 | A1 * | 5/2004 | Martins ................ G05D 1/0225 |
| | | | 180/167 |

(Continued)

FOREIGN PATENT DOCUMENTS

| | | |
|---|---|---|
| CN | 215711496 U | 2/2022 |
| JP | H11285109 A | 10/1999 |

(Continued)

*Primary Examiner* — Scott A Browne
(74) *Attorney, Agent, or Firm* — Flaster Greenberg P.C.

(57) ABSTRACT

A self-propelled guide unit configured to connect to and guide a self-propelled load bearing unit, such that the self-propelled load bearing unit can travel on a floor surface when the self-propelled guide unit and the self-propelled load bearing unit are connected. The self-propelled guide unit being configured to receive at least one parameter from the self-propelled load bearing unit, use the at least one parameter in the generation of a control signal, and transmit the generated control signal to the self-propelled load bearing unit for controlling the propulsion of the self-propelled load bearing unit.

20 Claims, 26 Drawing Sheets

(56)　　　　　References Cited

U.S. PATENT DOCUMENTS

| | | | |
|---|---|---|---|
| 2010/0318241 A1 | 12/2010 | Post et al. | |
| 2010/0326746 A1 | 12/2010 | Kraus | |
| 2012/0191272 A1 | 7/2012 | Andersen et al. | |
| 2014/0246257 A1* | 9/2014 | Jacobsen | F41H 7/005 |
| | | | 180/14.2 |
| 2015/0045992 A1 | 2/2015 | Ashby et al. | |
| 2015/0073589 A1* | 3/2015 | Khodl | G06Q 50/40 |
| | | | 700/218 |
| 2015/0125252 A1 | 5/2015 | Berzen Ratzel | |
| 2015/0203140 A1 | 7/2015 | Holtan et al. | |
| 2015/0217790 A1 | 8/2015 | Golden et al. | |
| 2016/0129958 A1 | 5/2016 | Byrnes et al. | |
| 2016/0312435 A1 | 10/2016 | Voelz | |
| 2017/0182924 A1 | 6/2017 | Lendo et al. | |
| 2017/0190048 A1 | 7/2017 | Vice et al. | |
| 2017/0283171 A1* | 10/2017 | High | B65G 1/0492 |
| 2018/0022405 A1* | 1/2018 | Gecchelin | B62D 47/025 |
| | | | 701/23 |
| 2018/0057034 A1 | 3/2018 | Deshpande et al. | |
| 2018/0208398 A1 | 7/2018 | Haveman et al. | |
| 2018/0273292 A1 | 9/2018 | High et al. | |
| 2018/0330319 A1 | 11/2018 | Liang et al. | |
| 2018/0330622 A1 | 11/2018 | Liang et al. | |
| 2019/0276241 A1 | 9/2019 | Royce et al. | |
| 2019/0283239 A1 | 9/2019 | Skaaksrud et al. | |
| 2020/0071144 A1 | 3/2020 | Draayer et al. | |
| 2020/0087127 A1 | 3/2020 | Hammer et al. | |
| 2020/0099739 A1 | 3/2020 | Boehm | |
| 2020/0102147 A1 | 4/2020 | Sullivan et al. | |
| 2020/0394743 A1 | 12/2020 | Lisso et al. | |
| 2021/0017007 A1 | 1/2021 | Houston et al. | |
| 2021/0061157 A1 | 3/2021 | Castillo et al. | |
| 2021/0101748 A1 | 4/2021 | Helsel et al. | |
| 2021/0206003 A1 | 7/2021 | Zhou et al. | |
| 2021/0332558 A1 | 10/2021 | Lensing et al. | |
| 2022/0024738 A1 | 1/2022 | Le Polotec et al. | |
| 2022/0041299 A1 | 2/2022 | Wankewycz et al. | |
| 2022/0289540 A1 | 9/2022 | Galin | |
| 2022/0350319 A1 | 11/2022 | Yoshida et al. | |
| 2023/0001956 A1 | 1/2023 | Langenfeld et al. | |
| 2023/0004377 A1 | 1/2023 | Nagata et al. | |
| 2023/0074147 A1 | 3/2023 | Hasegawa | |
| 2023/0173694 A1 | 6/2023 | Sohmshetty et al. | |
| 2023/0271657 A1 | 8/2023 | Mauletti et al. | |
| 2023/0406366 A1 | 12/2023 | Zhou et al. | |
| 2024/0004391 A1 | 1/2024 | Galluzzo et al. | |
| 2024/0262437 A1 | 8/2024 | Mckendrick | |

FOREIGN PATENT DOCUMENTS

| | | | | |
|---|---|---|---|---|
| JP | 2009146322 A | 7/2009 | | |
| WO | 0138945 A1 | 5/2001 | | |
| WO | 2019172821 A1 | 9/2019 | | |
| WO | 2019231477 A1 | 12/2019 | | |
| WO | 2020022479 A1 | 1/2020 | | |
| WO | 2020069504 A1 | 4/2020 | | |
| WO | WO-2020089170 A1 * | 5/2020 | | B62D 53/005 |
| WO | 2021079251 A1 | 4/2021 | | |
| WO | 2022129036 A1 | 6/2022 | | |

* cited by examiner

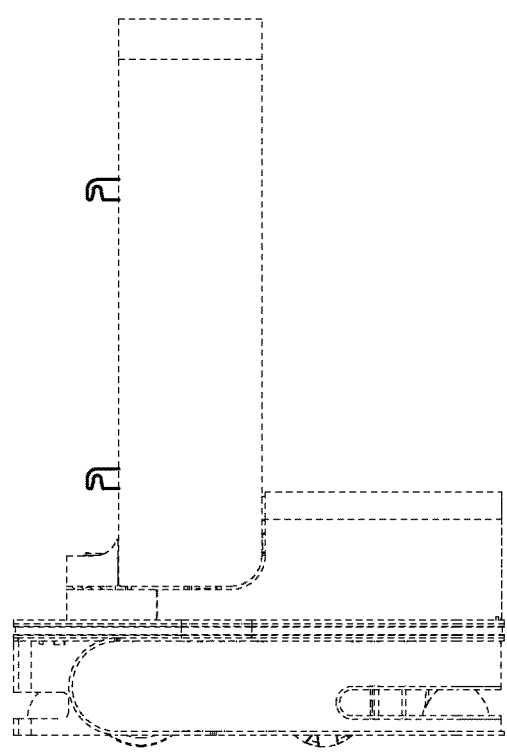
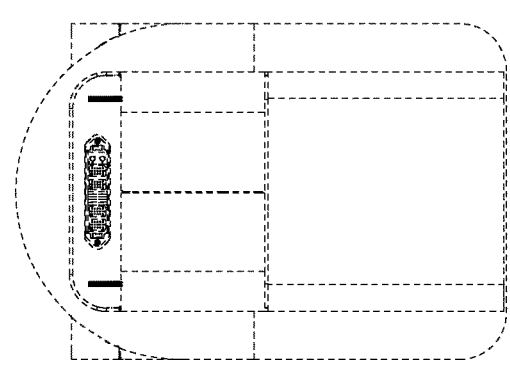
*Fig. 12D*
*Fig. 12C*
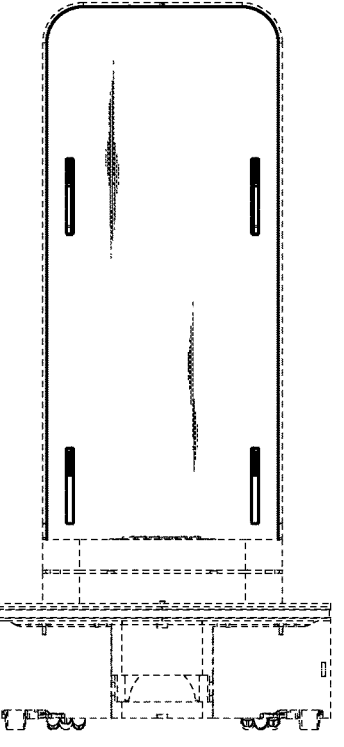
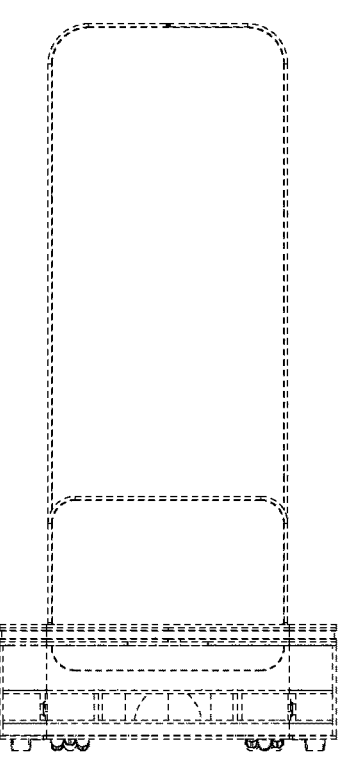
*Fig. 12E*
*Fig. 12F*

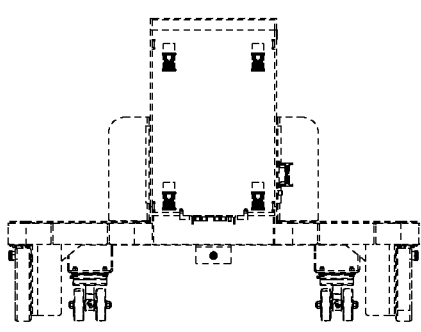
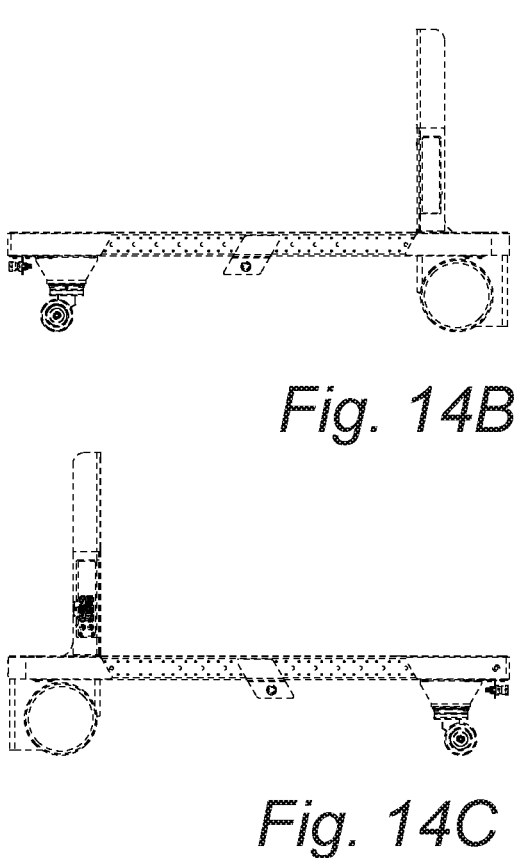
*Fig. 14B*
*Fig. 14D*
*Fig. 14C*
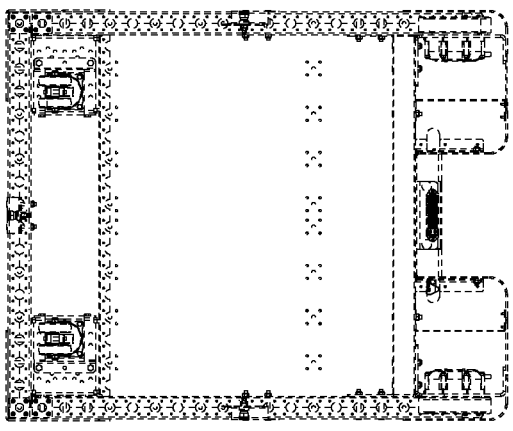
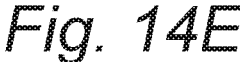
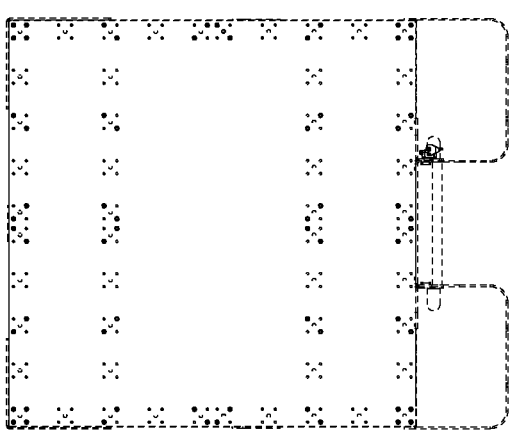
*Fig. 14E*
*Fig. 14F*

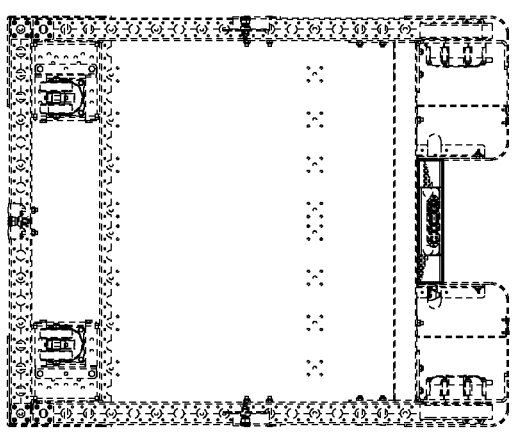
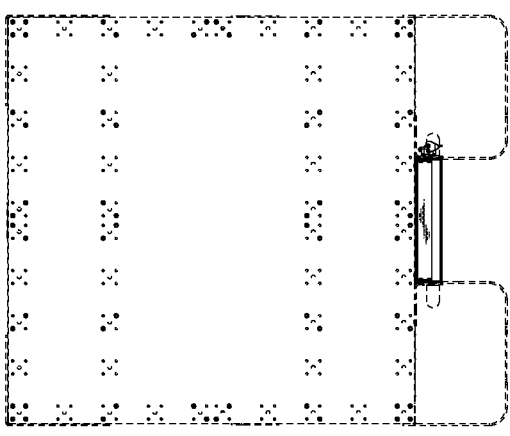
*Fig. 15E*                              *Fig. 15F*
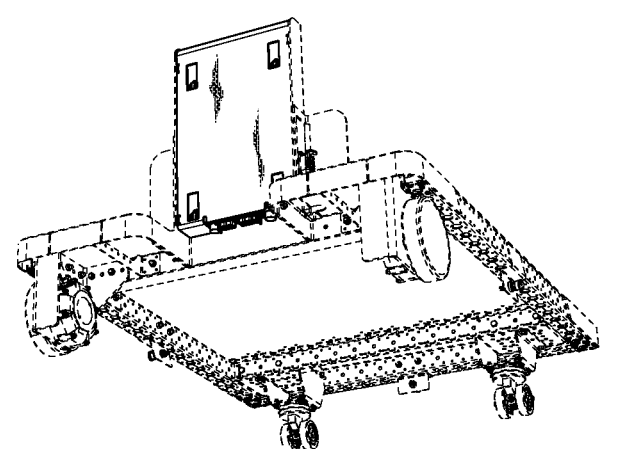
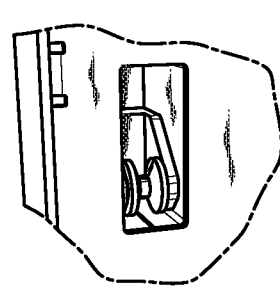
*Fig. 16A*              *Fig. 16B*

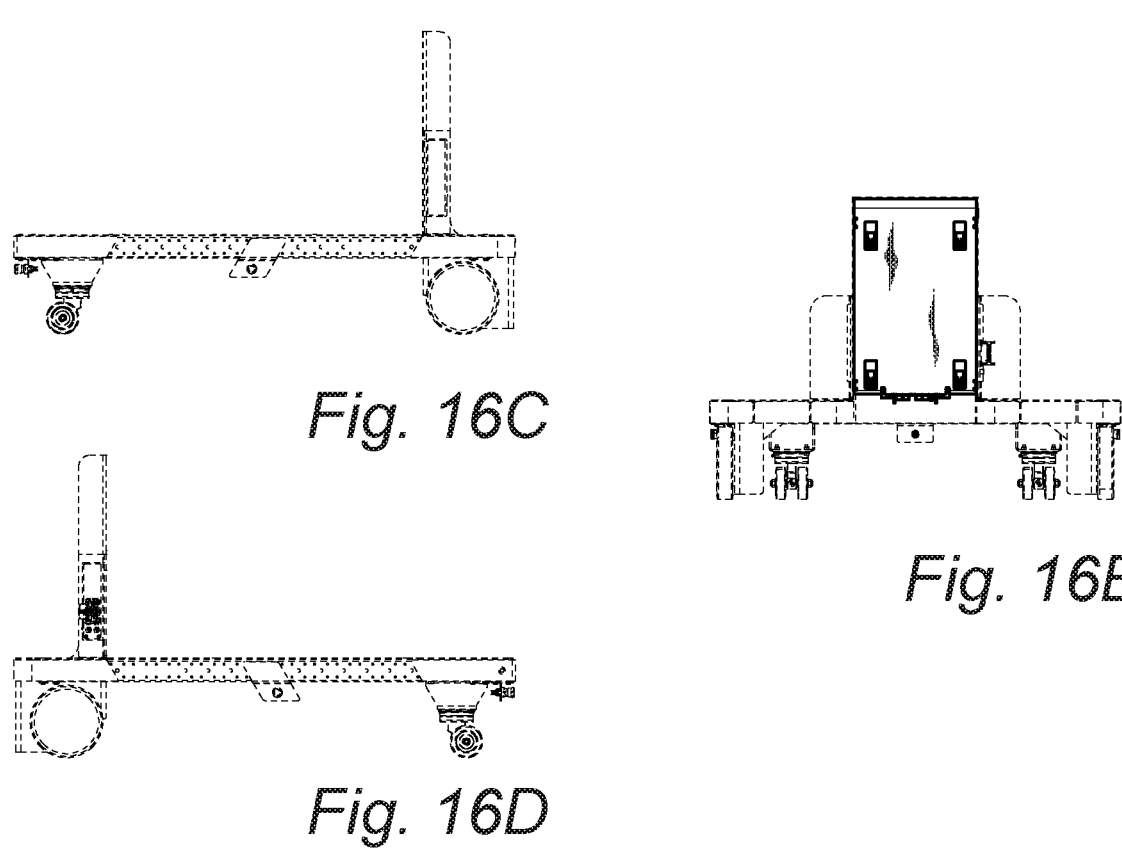
*Fig. 16C*
*Fig. 16E*
*Fig. 16D*
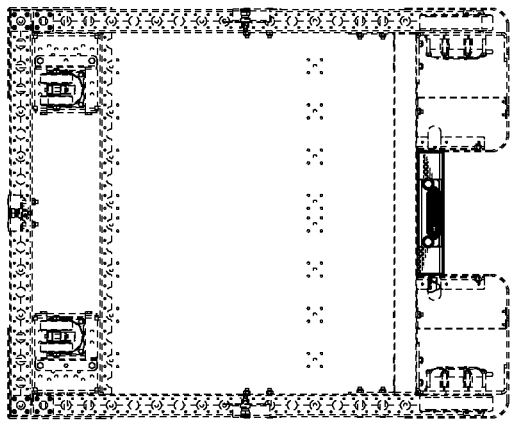
*Fig. 16F*

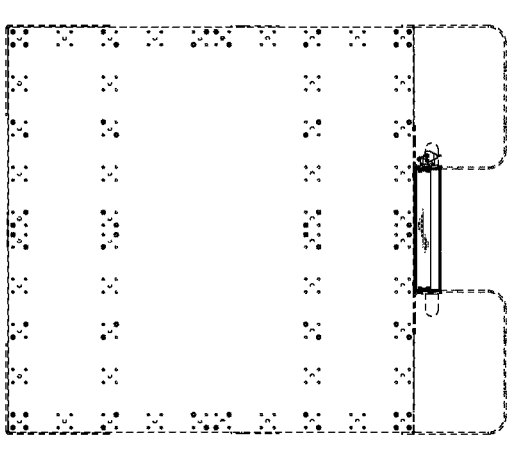
*Fig. 16G*
*Fig. 17A*
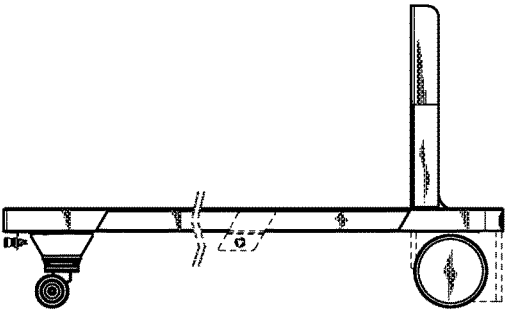
*Fig. 17B*
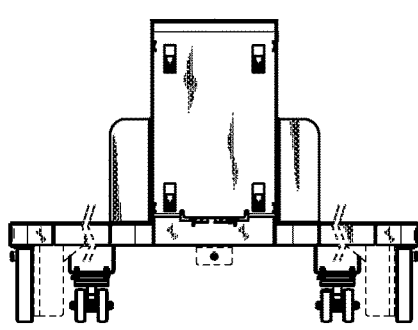
*Fig. 17C*
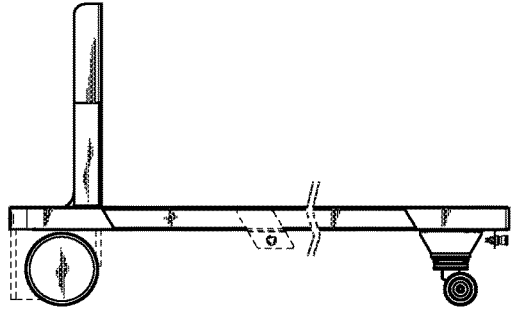
*Fig. 17D*

NAVIGATOR INTERFACE

FIELD OF THE INVENTION

This invention relates to a self-propelled guide unit in an intra-logistic system, as well as an interface between a self-propelled guide unit and a self-propelled load bearing unit in an intra-logistic system.

BACKGROUND ART

All forms of handling of goods, material or items of manufacturing requires intralogistics, i.e. logistics within some confined area such as a factory, warehouse or yard. Traditionally, forklifts have been the dominating vehicle both for transporting pallets of smaller items and larger items individually. Forklifts however have some limitations and are being replaced in many environments by manual carts pushed by human workers. The carts are less likely to cause accidents and are much more adaptable to specific uses or sizes of the transported items. However, the manual carts also have drawbacks, such as limitations of the maximum load capacity that a human operator can handle, and in that the logistic system becomes relatively labour intensive. Also, the carts are sometimes incompatible with logistic systems which are based on pallets and forklifts.

SUMMARY

It is an object to mitigate, alleviate or eliminate one or more of the above-identified deficiencies in the art and disadvantages singly or in any combination. Accordingly, there is provided a self-propelled guide unit configured to connect to and guide a self-propelled load bearing unit, such that the self-propelled load bearing unit can travel on a floor surface when the self-propelled guide unit and the self-propelled load bearing unit are connected. The self-propelled guide unit being configured to receive at least one parameter from the self-propelled load bearing unit, use the at least one parameter in the generation of a control signal, and transmit the generated control signal to the self-propelled load bearing unit for controlling the propulsion of the self-propelled load bearing unit. The self-propelled guide unit comprises at least one engaging element configured to engage at least one corresponding engaging element on the self-propelled load bearing unit, and an actuator configured to lift the self-propelled guide unit from the floor surface by actuating the at least one engaging element. The actuator is configured to move the at least one engaging element in a direction towards the floor surface, such that the at least one engaging element engages the at least one engaging element on the self-propelled load bearing unit. The at least one engaging element carries a major portion of the weight of the self-propelled guide unit, when the self-propelled guide unit is lifted from the floor surface.

By having the actuator moving the at least one engaging element in a direction towards the floor surface the engaging elements of the self-propelled guide unit can vertically engage the engaging elements of the self-propelled load bearing unit such that gravity can assist in aligning and stabilizing the self-propelled guide unit during connection.

The direction towards the floor surface, may be a strictly vertical or a substantially vertical or angled direction being mainly a vertical direction.

In some embodiments, the at least one engaging element on the self-propelled guide unit comprises a recess or protrusion configured to engage a corresponding recess or protrusion on the self-propelled load bearing unit.

In some embodiments, the at least one engaging element on the self-propelled guide unit comprises a protrusion configured to engage a corresponding recess on the self-propelled load bearing unit.

In some embodiments, the at least one engaging element on the self-propelled guide unit is configured to stabilize the self-propelled guide unit in at least a first and second direction, wherein the first and second directions are perpendicular to the direction towards the floor surface, and opposite to each other.

In some embodiments, the self-propelled guide unit comprises at least two engaging elements being spaced apart.

In some embodiments, a floor contacting plane is defined by wheel portions of the self-propelled guide unit configured to engage the floor surface when the self-propelled guide unit travels on the floor surface, and the at least two engaging elements are horizontally spaced apart in a direction parallel to the floor contacting plane.

In some embodiments, the at least two engaging elements are horizontally aligned on a common axis parallel to the floor contacting plane.

In some embodiments, the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, wherein the self-propelled guide unit has a maximum width at the widest portion of the self-propelled guide unit, in a horizontal direction perpendicular to the engagement axis, and wherein, the at least two engaging elements are spaced apart with a distance exceeding 20% of the maximum width.

In some embodiments, the at least two engaging elements are spaced apart with a distance exceeding 40% of the maximum width.

In some embodiments, the self-propelled guide unit comprises at least two wheels, and wherein a maximum wheel-base distance is the largest distance between the distal portions of two wheels of the self-propelled guide unit, and wherein, the at least two engaging elements are spaced apart with a distance exceeding 20% of the maximum wheel-base distance.

In some embodiments, the at least two engaging elements are spaced apart with a distance exceeding 40% of the maximum wheel-base distance.

In some embodiments, a floor contacting plane is defined by wheel portions of the self-propelled guide unit configured to engage the floor surface when the self-propelled guide unit travels on the floor surface, and wherein the at least two engaging elements are vertically spaced apart in a direction perpendicular to the floor contacting plane.

In some embodiments, the at least two engaging elements are vertically aligned on a common axis parallel to the floor contacting plane.

In some embodiments, the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the self-propelled guide unit has a maximum height at the tallest portion of the self-propelled guide unit, in a vertical direction perpendicular to the engagement axis, and wherein the at least two engaging elements are vertically spaced apart with a distance exceeding 20% of the maximum height.

In some embodiments, the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the self-propelled guide unit has an average height relative to the footprint of the self-propelled guide unit, in a vertical direction perpendicular to the engagement axis, and wherein the at least two engaging elements are vertically spaced apart with a distance exceeding 10% of the average height.

In some embodiments, the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, wherein the at least one engaging element on the self-propelled guide unit is configured to stabilize the self-propelled guide unit in at least a first and second direction, wherein the first and second directions are parallel to the engagement axis, and opposite to each other.

In some embodiments, the self-propelled guide unit comprises at least four engaging elements, and wherein at least two of the four engaging elements are vertically spaced apart and at least two of the four engaging elements are horizontally spaced apart.

In some embodiments, the at least one engaging element is positioned vertically above the center of gravity of the self-propelled guide unit, when the self-propelled guide unit travels on the floor surface.

In some embodiments, the at least one engaging element has an average vertical distance from the floor contacting plane, and wherein the actuator withholds force from a position having a longer vertical distance from the floor contacting plane than the average vertical distance.

The self-propelled guide unit may comprise a first electrical connector configured to connect to a second electrical connector comprised by the self-propelled load bearing unit, wherein the first electrical connector is configured to be moved by the actuator.

In some embodiments, the first electrical connector is configured to be moved to connect to the second electrical connector by the actuator after the actuator has moved the at least one engaging element.

In some embodiments, the first electrical connector is configured to be moved, relative to the second electrical connector, by the actuator in a direction opposite to the direction towards the floor surface.

There is further provided a self-propelled guide unit configured to connect to and guide a self-propelled load bearing unit, such that the self-propelled load bearing unit can travel on a floor surface when the self-propelled guide unit and the self-propelled load bearing unit are connected. The self-propelled guide unit being configured to receive at least one parameter from the self-propelled load bearing unit, use the at least one parameter in the generation of a control signal, and transmit the generated control signal to the self-propelled load bearing unit for controlling the propulsion of the self-propelled load bearing unit. The self-propelled guide unit comprises at least two engaging elements configured to engage at least two corresponding engaging elements on the self-propelled load bearing unit,

4 and at least one actuator configured to lift the self-propelled guide unit from the floor surface by actuating the at least two engaging elements. At least one of the at least two engaging elements is positioned vertically above the center of gravity of the self-propelled guide unit, when the self-propelled guide unit travels on the floor surface, and the at least two engaging elements are spaced apart. The at least one actuator is configured to move the at least two engaging elements, such that the at least two engaging elements engages the at least two engaging elements on the self-propelled load bearing unit, and the at least two engaging elements carries a major portion of the weight of the self-propelled guide unit, when the self-propelled guide unit is lifted from the floor surface.

By having at least one of the engaging elements positioned vertically above the center of gravity of the self-propelled guide unit, when the self-propelled guide unit travels on the floor surface, a more stable fixation of the self-propelled guide unit is created as the self-propelled guide unit is lifted from the floor surface and thus hangs on the engaging elements on the self-propelled load bearing unit. The engaging elements being spaced-apart horizontally creates stability in the side-to-side direction when the self-propelled guide unit is lifted from the floor surface and hangs on the self-propelled load bearing unit by the connection between the self-propelled guide unit and the self-propelled load bearing unit.

In some embodiments, the at least two engaging elements on the self-propelled guide unit each comprises a recess or protrusion configured to engage a corresponding recess or protrusion on the self-propelled load bearing unit.

In some embodiments, the at least one engaging element on the self-propelled guide unit comprises a protrusion configured to engage a corresponding recess on the self-propelled load bearing unit.

In some embodiments, the at least two engaging elements on the self-propelled guide unit are configured to stabilize the self-propelled guide unit in at least a first and second direction, wherein the first and second directions are perpendicular to the direction towards the floor surface, and opposite to each other.

In some embodiments, the at least two engaging elements are horizontally spaced apart.

In some embodiments, a floor contacting plane is defined by wheel portions of the self-propelled guide unit configured to engage the floor surface when the self-propelled guide unit travels on the floor surface, and wherein the at least two engaging elements are horizontally spaced apart in a direction parallel to the floor contacting plane.

In some embodiments, the at least two engaging elements are horizontally aligned on a common axis parallel to the floor contacting plane.

In some embodiments, the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the self-propelled guide unit has a maximum width at the widest portion of the self-propelled guide unit, in a horizontal direction perpendicular to the engagement axis, and wherein, the at least two engaging elements are spaced apart with a distance exceeding 20% of the maximum width.

In some embodiments, the at least two engaging elements are spaced apart with a distance exceeding 40% of the maximum width.

In some embodiments, the self-propelled guide unit comprises at least two wheels, and wherein a maximum wheel-base distance is the largest distance between the distal portions of two wheels of the self-propelled guide unit, and wherein, the at least two engaging elements are spaced apart with a distance exceeding 20% of the maximum wheel-base distance.

In some embodiments, the at least two engaging elements are spaced apart with a distance exceeding 40% of the maximum wheel-base distance.

In some embodiments, a floor contacting plane is defined by wheel portions of the self-propelled guide unit configured to engage the floor surface when the self-propelled guide unit travels on the floor surface, and wherein the at least two engaging elements are vertically spaced apart in a direction perpendicular to the floor contacting plane.

In some embodiments, the at least two engaging elements are vertically aligned on a common axis perpendicular to the floor contacting plane.

In some embodiments, the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the self-propelled guide unit has a maximum height at the tallest portion of the self-propelled guide unit, in a vertical direction perpendicular to the engagement axis, and wherein the at least two engaging elements are vertically spaced apart with a distance exceeding 20% of the maximum height.

In some embodiments, the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the self-propelled guide unit has an average height relative to the footprint of the self-propelled guide unit, in a vertical direction perpendicular to the engagement axis, and wherein the at least two engaging elements are vertically spaced apart with a distance exceeding 10% of the average height.

In some embodiments, the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, wherein the at least one engaging element on the self-propelled guide unit is configured to stabilize the self-propelled guide unit in at least a first and second direction, wherein the first and second directions are parallel to the engagement axis, and opposite to each other.

In some embodiments, the self-propelled guide unit comprises at least four engaging elements, and wherein at least two of the four engaging elements are vertically spaced apart and at least two of the four engaging elements are horizontally spaced apart.

In some embodiments, the at least two engaging elements has an average vertical distance from the floor contacting plane, and wherein the actuator withholds force from a position having a longer vertical distance from the floor contacting plane than the average vertical distance.

In some embodiments, the at least four engaging elements have an average vertical distance from the floor contacting plane, and wherein the actuator withholds force from a position having a longer vertical distance from the floor contacting plane than the average vertical distance.

In some embodiments, the at least two engaging elements are positioned vertically above the center of gravity of the self-propelled guide unit, when the self-propelled guide unit travels on the floor surface.

The self-propelled guide unit may further comprise a first electrical connector configured to connect to a second electrical connector comprised by the self-propelled load bearing unit, wherein the first electrical connector is configured to be moved by the actuator.

In some embodiments, the first electrical connector is configured to be moved to connect to the second electrical connector by the actuator after the actuator has moved the at least one engaging element.

In some embodiments, the first electrical connector is configured to be moved, relative to the second electrical connector, by the actuator in a direction opposite to the direction towards the floor surface.

There is further provided a system for intralogistics comprising a self-propelled guide unit according to any one of previous embodiments, and at least one self-propelled load bearing unit.

Thereby the present invention provides a system for intralogistics with an improved functionality of autonomous or remote controlled connection between units in the system.

There is further provided a self-propelled load bearing unit configured to connect to and be guided by a self-propelled guide unit, such that the self-propelled load bearing unit can travel on a floor surface when the self-propelled guide unit and the self-propelled load bearing unit are connected. The self-propelled load bearing unit being configured to transmit at least one parameter to the self-propelled load bearing unit, and receive a control signal based on the at least one parameter from the self-propelled load bearing unit for controlling the propulsion of the self-propelled load bearing unit. The self-propelled load bearing unit comprises at least two spaced-apart engaging elements configured to engage at least two engaging elements on the self-propelled guide unit. At least one of the at least two spaced-apart engaging elements are positioned vertically above the center of gravity of the self-propelled load bearing unit, when the self-propelled load bearing unit travels on the floor surface, and the at least two engaging elements carries a major portion of the weight of the self-propelled guide unit, when the self-propelled guide unit is connected to the self-propelled load bearing unit.

By having the engaging elements positioned vertically above the center of gravity of the self-propelled load bearing unit, when the self-propelled load bearing unit travels on the floor surface, a more stable fixation of the self-propelled guide unit is created as the self-propelled guide unit hangs on the engaging elements. The engaging elements being spaced-apart horizontally creates stability in the side-to-side direction when the self-propelled guide unit is lifted from the floor surface and hangs on the self-propelled load bearing unit by the connection between the self-propelled guide unit and the self-propelled load bearing unit.

In some embodiments, the at least one engaging element on the self-propelled load bearing unit comprises a recess or protrusion configured to engage a corresponding recess or protrusion on the self-propelled guide unit.

In some embodiments, the at least one engaging element on the self-propelled load bearing unit comprises a recess configured to engage a corresponding protrusion on the self-propelled guide unit.

In some embodiments, a floor contacting plane is defined by wheel portions of the self-propelled load bearing unit configured to engage the floor surface when the self-propelled load bearing unit travels on the floor surface, and wherein the at least two engaging elements are horizontally spaced apart in a direction parallel to the floor contacting plane.

In some embodiments, the at least two engaging elements are horizontally aligned on a common axis parallel to the floor contacting plane.

In some embodiments, the self-propelled load bearing unit is configured to engage the self-propelled guide unit along an engagement axis, for positioning the self-propelled guide unit relative to the self-propelled load bearing unit in a position enabling the connection between the self-propelled guide unit and the self-propelled load bearing unit, and wherein the at least two engaging elements are spaced-apart in a horizontal direction perpendicular to the engagement axis with a distance exceeding 10 cm or exceeding 20 cm.

In some embodiments, a floor contacting plane is defined by wheel portions of the self-propelled load bearing unit configured to engage the floor surface when the self-propelled load bearing unit travels on the floor surface, and wherein the at least two engaging elements are vertically spaced apart in a direction perpendicular to the floor contacting plane.

In some embodiments, the at least two engaging elements are vertically aligned on a common axis parallel to the floor contacting plane.

In some embodiments, the self-propelled load bearing unit is configured to engage the self-propelled guide unit along an engagement axis, for positioning the self-propelled guide unit relative to the self-propelled load bearing unit in a position enabling the connection between the self-propelled guide unit and the self-propelled load bearing unit, and wherein the at least two engaging elements are spaced-apart in a vertical direction perpendicular to the engagement axis with a distance exceeding 10 cm or exceeding 20 cm.

In some embodiments, the self-propelled load bearing unit comprises at least four engaging elements, and wherein at least two of the four engaging elements are vertically spaced apart and at least two of the four engaging elements are horizontally spaced apart.

The self-propelled load bearing unit may comprise a second electrical connector configured to connect to a first electrical connector comprised by the self-propelled guide unit, wherein the second electrical connector is substantially facing upwards when the self-propelled load bearing unit travels on the floor surface, enabling connection of the first and second electrical connector by vertical movement of the first electrical connector.

The self-propelled load bearing unit may comprise a receiving portion configured to receive at least a portion of the self-propelled guide unit, such that the receiving portion encloses three sides of at least the portion of the self-propelled guide unit.

In some embodiments, the receiving portion is configured to receive at least the portion of the self-propelled guide unit along a receival axis, and wherein the receiving portion is configured to receive at least ⅕ of the length of the self-propelled guide unit in the direction of the receival axis.

In some embodiments, the receiving portion comprises an entry portion, and wherein the entry portion comprises at least one rounded or chamfered surface acting as a guide for the self-propelled guide unit to enter the receiving portion.

The self-propelled load bearing unit may comprise a mechanical guide element configured to guide the self-propelled guide unit to enter the receiving portion.

In some embodiments, the mechanical guide element is at least two mechanical guide elements configured to engage two opposite sides of the self-propelled guide unit with two opposite sides of the receiving portion for guiding the self-propelled guide unit to enter the receiving portion.

In some embodiments, the at least two mechanical guide elements are comprised by the self-propelled guide unit.

There is further provided a system for intralogistics comprising a self-propelled guide unit and a self-propelled load bearing unit, according to any one of previous embodiments.

Thereby the present invention provides a system for intralogistics with an improved functionality of autonomous or remote controlled connection between units in the system.

There is further provided a connection system for connecting a self-propelled guide unit to a self-propelled load bearing unit, wherein the self-propelled guide unit is configured to connect to and guide the self-propelled load bearing unit, such that the self-propelled load bearing unit can travel on a floor surface when the self-propelled guide unit and the self-propelled load bearing unit are connected. The connection system comprises at least one engaging element, on the self-propelled load bearing unit, at least one engaging element, on the self-propelled guide unit, and at least one actuator configured to actuate the at least one engaging element on the self-propelled guide unit. The at least one engaging element of the self-propelled guide unit is configured to engage the at least one engaging element of the self-propelled load bearing unit when the actuator actuates the at least one engaging element of self-propelled guide unit in a direction towards the floor surface. The at least one engaging element on the self-propelled load bearing unit carries a major portion of the weight of the self-propelled guide unit, when the self-propelled guide unit is lifted from the floor surface.

By having the actuator actuating the at least one engaging element in a direction towards the floor surface the engaging elements of the self-propelled guide unit can vertically engage the engaging elements of the self-propelled load bearing unit such that gravity can assist in aligning and stabilizing the self-propelled guide unit during connection.

In some embodiments, the at least one engaging element on the self-propelled load bearing unit comprises a recess or protrusion configured to engage a corresponding recess or protrusion on the self-propelled guide unit.

In some embodiments, the recess or protrusion on the self-propelled guide unit is a protrusion and the recess or protrusion on the self-propelled load bearing unit is a recess.

In some embodiments, the at least one engaging element on the self-propelled load bearing unit comprises a set of recesses or protrusions configured to engage a corresponding set of recesses or protrusions comprised by the self-propelled guide unit.

In some embodiments, the self-propelled load bearing unit further comprises a second electrical connector configured to connect to a first electrical connector comprised by the self-propelled guide unit for electrically connecting the self-propelled guide unit to the self-propelled load bearing unit.

In some embodiments, the first electrical connector and second electrical connector are configured to engage in connection by movement of the least one engaging element of the self-propelled guide unit in a direction towards the floor surface.

In some embodiments, the first electrical connector and second electrical connector are configured to be connected in a substantially vertical direction.

The connection system may comprise a receiving portion on the self-propelled load bearing unit, the receiving portion being configured to receive at least a portion of the self-propelled guide unit, such that the receiving portion encloses three sides of at least the portion of the self-propelled guide unit.

In some embodiments, the receiving portion is configured to receive at least the portion of the self-propelled guide unit along a receival axis, and wherein the receiving portion is configured to receive at least ⅕ of the length of the self-propelled guide unit in the direction of the receival axis.

In some embodiments, the receiving portion comprises an entry portion, wherein the entry portion comprises at least one rounded or chamfered surface acting as a guide for the self-propelled guide unit to enter the receiving portion.

The connection system may comprise a mechanical guide element configured to guide the self-propelled guide unit to enter the receiving portion.

In some embodiments, the mechanical guide element is at least two mechanical guide elements configured to engage two opposite sides of the self-propelled guide unit with two opposite sides of the receiving portion for guiding the self-propelled guide unit to enter the receiving portion.

In some embodiments, the at least two mechanical guide elements are comprised by the self-propelled guide unit.

In some embodiments, the set of recesses or protrusions comprised by the self-propelled load bearing unit is spaced apart with a distance exceeding 40% of the maximum width of the self-propelled load bearing unit.

In some embodiments, the set of recesses or protrusions comprised by the self-propelled guide unit is spaced apart with a distance exceeding 40% of the maximum width of the self-propelled guide unit.

In some embodiments, the first electrical connector is configured to be moved, relative to the second electrical connector, by the actuator in a direction opposite to the direction towards the floor surface.

There is further provided a connection system for connecting a self-propelled guide unit to a self-propelled load bearing unit, wherein the self-propelled guide unit is configured to connect to and guide the self-propelled load bearing unit, such that the self-propelled load bearing unit can travel on a floor surface when the self-propelled guide unit and the self-propelled load bearing unit are connected. The connection system comprises at least two engaging elements on the self-propelled load bearing unit, at least two engaging elements on the self-propelled guide unit, and at least one actuator configured to actuate the at least two engaging element on the self-propelled guide unit. The at least two engaging elements of the self-propelled guide unit is configured to engage the at least two engaging elements of self-propelled load bearing unit when the actuator moves the at least two engaging elements of self-propelled guide unit, and wherein the at least two engaging elements on the self-propelled load bearing unit carries a major portion of the weight of the self-propelled guide unit, when the self-propelled guide unit is lifted from the floor surface.

The connection system provides stable and effective way of connection, as well as the possibility of lifting the self-propelled guide unit of the floor surface by the same movement as used for the engagement between the engaging elements of the self-propelled load bearing unit and the self-propelled guide unit, respectively.

In some embodiments, the at least two engaging elements on the self-propelled load bearing unit each comprises a recess or protrusion configured to engage a corresponding recess or protrusion on the self-propelled guide unit.

In some embodiments, each of the recess or protrusions on the self-propelled guide unit is protrusions and each of the recess or protrusions on the self-propelled load bearing unit is recesses.

In some embodiments, the protrusions stabilizes the self-propelled guide unit in a first, second and third direction, all perpendicular to one another, when the protrusions are connected to the recesses.

In some embodiments, the self-propelled load bearing unit further comprising a second electrical connector configured to connect to a first electrical connector of the self-propelled guide unit for electrically connecting the self-propelled guide unit to the self-propelled load bearing unit.

In some embodiments, the first electrical connector and second electrical connector are configured to be connected by movement of the least two engaging elements of self-propelled guide unit in a direction towards the floor surface.

In some embodiments, the first electrical connector and second electrical connector are configured to be connected in a substantially vertical direction.

In some embodiments, the self-propelled load bearing unit further comprising a receiving portion configured to receive at least a portion of the self-propelled guide unit, such that the receiving portion encloses three sides of at least the portion of the self-propelled guide unit.

In some embodiments, the receiving portion is configured to receive at least the portion of the self-propelled guide unit along a receival axis, and wherein the receiving portion is configured to receive at least ⅕ of the length of the self-propelled guide unit in the direction of the receival axis.

In some embodiments, the receiving portion comprises an entry portion, and wherein the entry portion comprises at least one rounded or chamfered surface acting as a guide for the self-propelled guide unit to enter the receiving portion.

The connection system may comprise a mechanical guide element configured to guide the self-propelled guide unit to enter the receiving portion.

In some embodiments, the mechanical guide element is at least two mechanical guide elements configured to engage two opposite sides of the self-propelled guide unit with two opposite sides of the receiving portion for guiding the self-propelled guide unit to enter the receiving portion.

In some embodiments, the at least two mechanical guide elements are comprised by the self-propelled guide unit.

In some embodiments, the at least two engaging elements are horizontally spaced apart.

In some embodiments, the at least two engaging elements comprised by the self-propelled load bearing unit is spaced apart with a distance exceeding 40% of the maximum width of the self-propelled load bearing unit.

In some embodiments, the at least two engaging elements comprised by the self-propelled guide unit is spaced apart with a distance exceeding 40% of the maximum width of the self-propelled guide unit.

In some embodiments, at least one of the at least two engaging elements is positioned vertically above the center of gravity of the self-propelled guide unit, when the self-propelled guide unit travels on the floor surface.

In some embodiments, the at least two engaging elements are positioned vertically above the center of gravity of the self-propelled guide unit, when the self-propelled guide unit travels on the floor surface.

In some embodiments, the first electrical connector is configured to be moved by the actuator.

In some embodiments, the first electrical connector is configured to be moved to connect to the second electrical connector by the actuator after the actuator has moved the at least two engaging elements.

In some embodiments, the first electrical connector is configured to be moved, relative to the second electrical connector, by the actuator in a direction opposite to the direction towards the floor surface.

There is further provided a connection system for connecting a self-propelled guide unit to a self-propelled load bearing unit, the self-propelled guide unit being configured to guide the self-propelled load bearing unit for moving on a floor surface when the self-propelled guide unit and the self-propelled load bearing unit are connected. The connection system comprising a first set of recesses or protrusions on the self-propelled guide unit, a second set of recesses or protrusions on the self-propelled load bearing unit, a first electrical connector on the self-propelled guide unit, and a second electrical connector on the self-propelled load bearing unit. The first set of recesses or protrusions are configured to engage the second set of recesses or protrusions for mechanically connecting the self-propelled guide unit to the self-propelled load bearing unit and the first and second electrical connectors are configured to be connected for electrically connecting the self-propelled guide unit to the self-propelled load bearing unit. The connection system further comprises an actuator configured to move at least one of the first set of recesses or protrusions and the second set of recesses or protrusions for engaging the first set of recesses or protrusions and the second set of recesses or protrusions, wherein at least one of the first and second electrical connectors is configured to be actuated for connecting the first electrical connector to the second electrical connector. A control unit for controlling the actuation of at least one of the first set of recesses or protrusions and the second set of recesses or protrusions, and at least one of the first and second electrical connector. The control unit is configured to control the actuation such that the first set of recesses or protrusions engages the second set of recesses or protrusions before the first electrical connector engages the second electrical connector, such that the actuation of at least one of the first set of recesses or protrusions and the second set of recesses or protrusions aligns the first electrical connector and the second electrical connector before the first electrical connector engages the second electrical connector. The engagement of the first and second electrical connector enables transfer of electrical control signals from the self-propelled load bearing unit to the self-propelled guide unit.

By having the engagement of the recesses and protrusions aligning the electrical connectors, a single actuator can align, mechanically connect, lift and electrically connect the self-propelled guide unit.

In some embodiments, the first set of recesses or protrusions on the self-propelled guide unit comprises a set of protrusions.

In some embodiments, the second set of recesses or protrusions on the self-propelled load bearing unit comprises a set of recesses.

In some embodiments, the first set of recesses or protrusions comprises a pair of horizontally aligned recesses or protrusions.

In some embodiments, the pair of horizontally aligned recesses or protrusions comprises load bearing portions, and wherein the load bearing portions are spaced apart along a horizontal axis with a distance exceeding ¼ of the width of the self-propelled guide unit at the horizontal axis.

The connection system may comprise a first electrical connector on the self-propelled guide unit, and a second electrical connector on the self-propelled load bearing unit, and wherein the first and second electrical connectors are configured to be connected for electrically connecting the self-propelled guide unit to the self-propelled load bearing unit.

In some embodiments, the first and second electrical connectors are configured to be connected by the movement of the first set of recesses or protrusions in a direction towards the floor surface.

In some embodiments, the first electrical connector is fixedly fixated to a major portion of the self-propelled guide unit.

In some embodiments, the first and second electrical connectors are configured to be connected in a substantially vertical direction.

In some embodiments, the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the first and second electrical connectors are configured to be connected in a vertical direction perpendicular to the engagement axis.

In some embodiments, the first set of recesses or protrusions comprises a second pair of horizontally aligned recesses or protrusions.

In some embodiments, the set of protrusions stabilizes the self-propelled guide unit in a first, second and third direction, all perpendicular to one another, when the set of protrusions are connected to the set of recesses.

In some embodiments, the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, wherein the first set of recesses or protrusions on the self-propelled guide unit is configured to stabilize the self-propelled guide unit in at least a first and second direction, wherein the first and second directions are parallel to the engagement axis, and opposite to each other.

The connection system may comprise a receiving portion on the self-propelled load bearing unit, and wherein the receiving portion is configured to receive at least a portion of the self-propelled guide unit, such that the receiving portion encloses three sides of at least the portion of the self-propelled guide unit.

In some embodiments, the receiving portion is configured to receive at least the portion of the self-propelled guide unit along a receival axis, and wherein the receiving portion is configured to receive at least ⅕ of the length of the self-propelled guide unit in the direction of the receival axis.

In some embodiments, the receiving portion comprises an entry portion, and wherein the entry portion comprises at least one rounded or chamfered surface acting as a guide for the self-propelled guide unit to enter the receiving portion.

The connection system may comprise a mechanical guide element configured to guide the self-propelled guide unit to enter the receiving portion.

In some embodiments, the mechanical guide element is at least two mechanical guide elements configured to engage two opposite sides of the self-propelled guide unit with two opposite sides of the receiving portion for guiding the self-propelled guide unit to enter the receiving portion.

In some embodiments, the at least two mechanical guide elements are comprised by the self-propelled guide unit.

There is further provided a connection system for connecting a self-propelled guide unit to a self-propelled load bearing unit, the self-propelled guide unit being configured to guide the self-propelled load bearing unit for moving on a floor surface when the self-propelled guide unit and the self-propelled load bearing unit are connected. The connection system comprising a first electrical connector on the self-propelled guide unit, the first electrical connector comprising a first plurality of recesses or protrusions, a second electrical connector on the self-propelled load bearing unit, the second electrical connector comprising a second plurality of recesses or protrusions, an actuator configured to move the first electrical connector in a direction towards the second electrical connector. The first electrical connector is configured to be connected to the second electrical connector such that the first and second plurality of recesses or protrusions are engaged thereby electrically connecting the self-propelled guide unit to the self-propelled load bearing unit. A first pair of recesses or protrusions of the first and second plurality of recesses or protrusions are configured to transfer a first electrical status signal from the self-propelled load bearing unit to the self-propelled guide unit to verify proper engagement, and a second pair of recesses or protrusions of the first and second plurality of recesses or protrusions are configured to transfer a second electrical status signal from the self-propelled load bearing unit to the self-propelled guide unit to verify proper engagement. The first and second pair of recesses or protrusions are spaced apart such that at least one third pair of recesses or protrusions for transferring electrical signals from the self-propelled guide unit to the self-propelled load bearing unit are placed between the first and second pairs of recesses or protrusions.

If a first pin and socket engagement is verified at a first position and a second pin and socket engagement is verified at a second position, the probability is high that the pin and socket engagements placed between the first and second positions are also correct.

In some embodiments, the first and second pair are spaced apart with a distance exceeding 20% of the width of the first electrical connector, preferably exceeding 40% of the width of the first electrical connector and most preferably exceeding 60% of the width of the first electrical connector.

In some embodiments, the first and second pair are spaced apart with a distance exceeding 5 cm, preferably exceeding 10 cm.

In some embodiments, the first and second pair of recesses or protrusions are configured to transfer a electrical status signals with a frequency exceeding 1 Hz, preferably exceeding 10 Hz and most preferably exceeding 100 Hz.

In some embodiments, the first plurality of recesses or protrusions are divided into a first number of sections and the second plurality of recesses or protrusions are divided into a second number of sections, wherein each of the sections of the first and second number of sections comprises some of the portion of the recesses or protrusions of the first and the second plurality of recesses or protrusions configured to transfer electrical control signals.

In some embodiments, each of the sections of the first and second number of sections comprises a mechanical guide element structure configured to aid in correct engagement between the first and second plurality of recesses or protrusions.

The connection system may comprise a first set of recesses or protrusions on the self-propelled guide unit and a second set of recesses or protrusions on the self-propelled load bearing unit, wherein the first set of recesses or protrusions are configured to engage the second set of recesses or protrusions for mechanically connecting the self-propelled guide unit to the self-propelled load bearing unit.

In some embodiments, the actuator is configured to move at least one of the first set of recesses or protrusions and the second set of recesses or protrusions for engaging the first set of recesses or protrusions with the second set of recesses or protrusions.

The connection system may comprise a control unit for controlling the actuation of at least one of the first set of recesses or protrusions and the second set of recesses or protrusions, and at least one of the first and second electrical connector. The control unit is configured to control the actuation such that the first set of recesses or protrusions engages the second set of recesses or protrusions before the first electrical connector engages the second electrical connector, such that the actuation of at least one of the first set of recesses or protrusions and the second set of recesses or protrusions aligns the first electrical and the second electrical connector before the first electrical connector engages the second electrical connector.

In some embodiments, the first and second electrical connectors are configured to be connected by the movement of the first set of recesses or protrusions in a direction towards the floor surface.

In some embodiments, the first and second electrical connectors are configured to be connected in a substantially vertical direction.

Please note that any aspect or part of an aspect as well as any method or part of method or any unit, feature or system could be combined in any applicable way if not clearly contradictory.

BRIEF DESCRIPTIONS OF THE DRAWINGS

The invention will by way of example be described in more detail with reference to the appended schematic drawings, on which:

FIG. 8E shows the mechanical guide element of the first embodiment in a plain back view.

FIG. 8F shows the mechanical guide element of the first embodiment in a plain front view.

FIG. 10E shows the mechanical guide element of the third embodiment in a plain back view.

FIG. 10F shows the mechanical guide element of the third embodiment in a plain front view.

FIG. 12C shows the connection system of a self-propelled guide unit of the second embodiment in a plain side view from the right.

FIG. 12D shows the connection system of a self-propelled guide unit of the second embodiment in plain top view.

FIG. 12E shows the connection system of a self-propelled guide unit of the second embodiment in plain front view FIG. 12F shows the connection system of a self-propelled guide unit of the second embodiment in a plain back view.

FIG. 14B shows the connection system of a self-propelled load bearing unit of the first embodiment in a plain side view from the left.

FIG. 14C shows the connection system of a self-propelled load bearing unit of the first embodiment in a plain side view from the right.

FIG. 14D shows the connection system of a self-propelled load bearing unit of the first embodiment in plain front view FIG. 14E shows the connection system of a self-propelled load bearing unit of the first embodiment in plain bottom view.

FIG. 14F shows the connection system of a self-propelled load bearing unit of the first embodiment in plain top view.

FIG. 15E shows the connection system of a self-propelled load bearing unit of the second embodiment in plain bottom view.

FIG. 15F shows the connection system of a self-propelled load bearing unit of the second embodiment in plain top view.

FIG. 16A shows a connection system of a self-propelled load bearing unit of a third embodiment in a lowered perspective view from the right.

FIG. 16B shows an engaging element of the connection system of a self-propelled load bearing unit of the third embodiment in a perspective view from the left.

FIG. 16C shows the connection system of a self-propelled load bearing unit of the third embodiment in a plain side view from the left.

FIG. 16D shows the connection system of a self-propelled load bearing unit of the third embodiment in a plain side view from the right.

FIG. 16E shows the connection system of a self-propelled load bearing unit of the third embodiment in plain front view.

FIG. 16F shows the connection system of a self-propelled load bearing unit of the third embodiment in plain bottom view.

FIG. 16G shows the connection system of a self-propelled load bearing unit of the third embodiment in plain top view.

FIG. 17A shows a self-propelled load bearing unit of a first embodiment in an elevated perspective view from the right.

FIG. 17B shows the self-propelled load bearing unit of the first embodiment in a plain side view from the left.

FIG. 17C shows the self-propelled load bearing unit of the first embodiment in plain front view.

FIG. 17D shows the self-propelled load bearing unit of the first embodiment in a plain side view from the right.

DETAILED DESCRIPTION

Figure 1A:
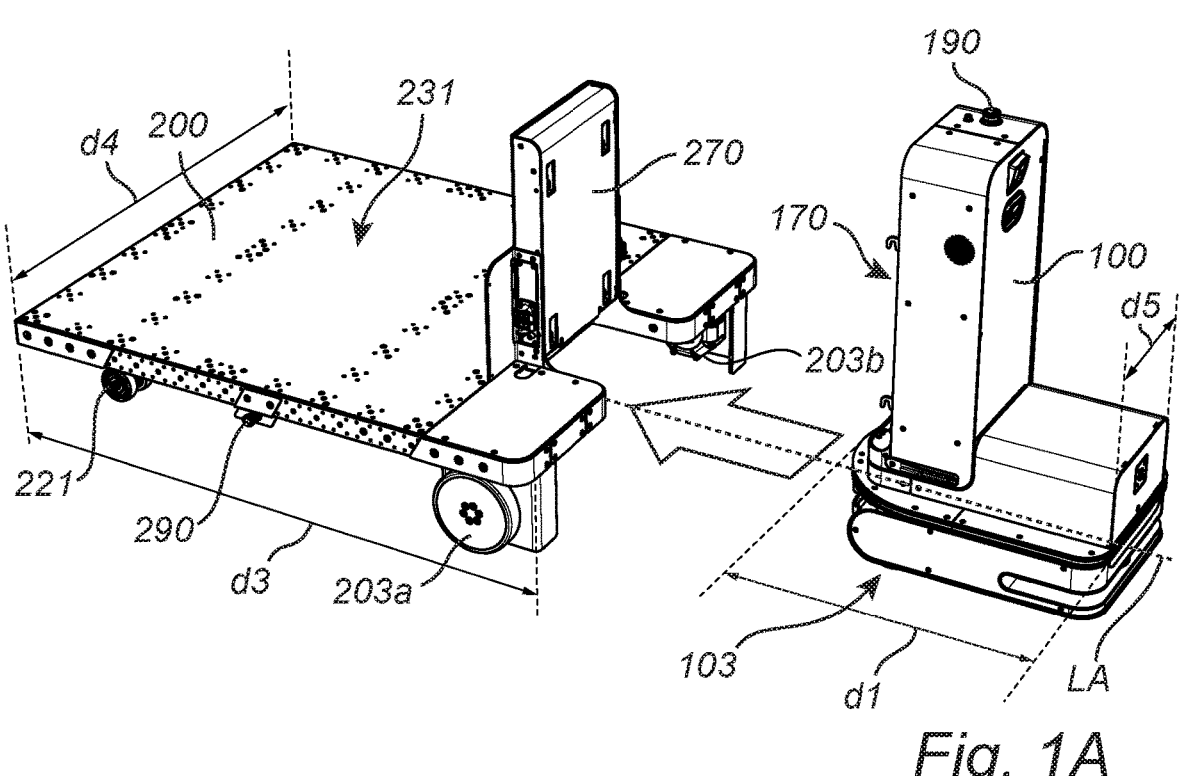
FIG. 1A-1B shows a self-propelled guide unit in the process of engaging with and connected to a self-propelled load bearing unit in an elevated view.

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided for thoroughness and completeness.

A logistic system using self-propelled guide units for moving self-propelled load bearing units is provided, as well as self-propelled load bearing units for moving loads in such a system and self-propelled guide units guiding and controlling the self-propelled load bearing units in the system. The logistics system may be used in an intralogistics system in which material, goods or items need to be transported in an efficient and/or autonomous way. Intralogistics systems could be systems in manufacturing industry or warehouse facilities. Some of the advantages with the system is that the self-propelled guide units can be made relatively light and small, enabling the self-propelled guide units to travel relatively fast and with relatively low risk to human operators in an indoor environment. The small size enables the self-propelled guide units to travel in narrow passages and enter into cramped spaces which enables optimization of e.g. a factory or warehouse layout. That the self-propelled guide units can be made small, fast and safe is enabled by the idea that the self-propelled guide units only need to propel their own weight. I.e., the self-propelled guide units are not made to lift or tug any load, they are made to connect to, control and guide self-propelled load bearing units. After connection with the self-propelled load bearing units, the self-propelled guide unit shown in the embodiment of the drawings lifts itself by means of an actuator on the self-propelled guide unit such that the entire weight of the self-propelled guide units is carried by the self-propelled load bearing unit. The self-propelled load bearing unit comprises means for propulsion of the self-propelled load bearing unit, the self-propelled guide unit and the load placed on, or pulled by, the self-propelled load bearing unit. The means for propulsion typically comprises electrical motors connected to drive wheels of the self-propelled load bearing unit and motor controller configured to control the motors based on control signals that the self-propelled load bearing unit receives from the self-propelled guide unit. The self-propelled load bearing units may have on board batteries, but in the preferred embodiments, the self-propelled load bearing units are powered from batteries on the self-propelled guide unit. This is advantageous as the self-propelled load bearing unit do not have to be moved to a charging station and it further eliminates the risk that a load that needs to be moved sits on a self-propelled load bearing unit with depleted batteries. The self-propelled load bearing units can be made in an infinite number of different versions, all configured to fit with, be connected to, and be controlled by the self-propelled guide unit. Specifically, the self-propelled load bearing units can be made in different sizes and made to carry different weights and can be adapted to lift, push or pull the loads.

FIG. 1A shows an embodiment of a self-propelled guide unit 100 and self-propelled load bearing unit 200 for an intralogistics, when the self-propelled guide unit 100 is in the process of connecting to the self-propelled load bearing unit 200. The self-propelled guide unit 100 comprises a mechanical connector 170 configured to engage with and connect to a mechanical connector 270 of the self-propelled load bearing unit 200. The self-propelled guide unit 100 further comprises an electrical connector (not shown) for electrically connecting the self-propelled guide unit 100 to the self-propelled load bearing unit 200 for transferring power, sensor signals, control signals and information between the self-propelled guide unit 100 and the self-propelled load bearing unit 200. The self-propelled load bearing unit 200 comprises two drive wheels 203*a*, 203*b* in the rear of the self-propelled load bearing unit 200. Each of the drive wheels 203*a*, 203*b* is connected to an electrical motor for propelling the self-propelled load bearing unit 200. As each of the drive wheels 203*a*, 203*b* is connected to an electrical motor, the self-propelled load bearing unit 200 can turn by driving one of the motors faster than the other. The self-propelled load bearing unit 200 further comprises swiveling casters 221 placed underneath the load bearing surface 231 in the front portion of the self-propelled load bearing unit 200. In the embodiment shown in FIG. 1A, the self-propelled load bearing unit 200 is configured to carry a load on a load bearing surface 231. The load could for example be a load placed on a pallet. The self-propelled guide unit 100 approaches the self-propelled load bearing unit 200 along an engagement axis LA and thereby aligns the mechanical connector 170 of the self-propelled guide unit 100 with the mechanical connector 270 of the self-propelled load bearing unit 200.

The self-propelled guide unit 100 comprises drive wheels 103 (not visible) for propelling the self-propelled guide unit 100 on a floor surface, and further comprises at least one additional wheel (not visible), e.g. in the form of a swiveling castor.

Figure 1B:
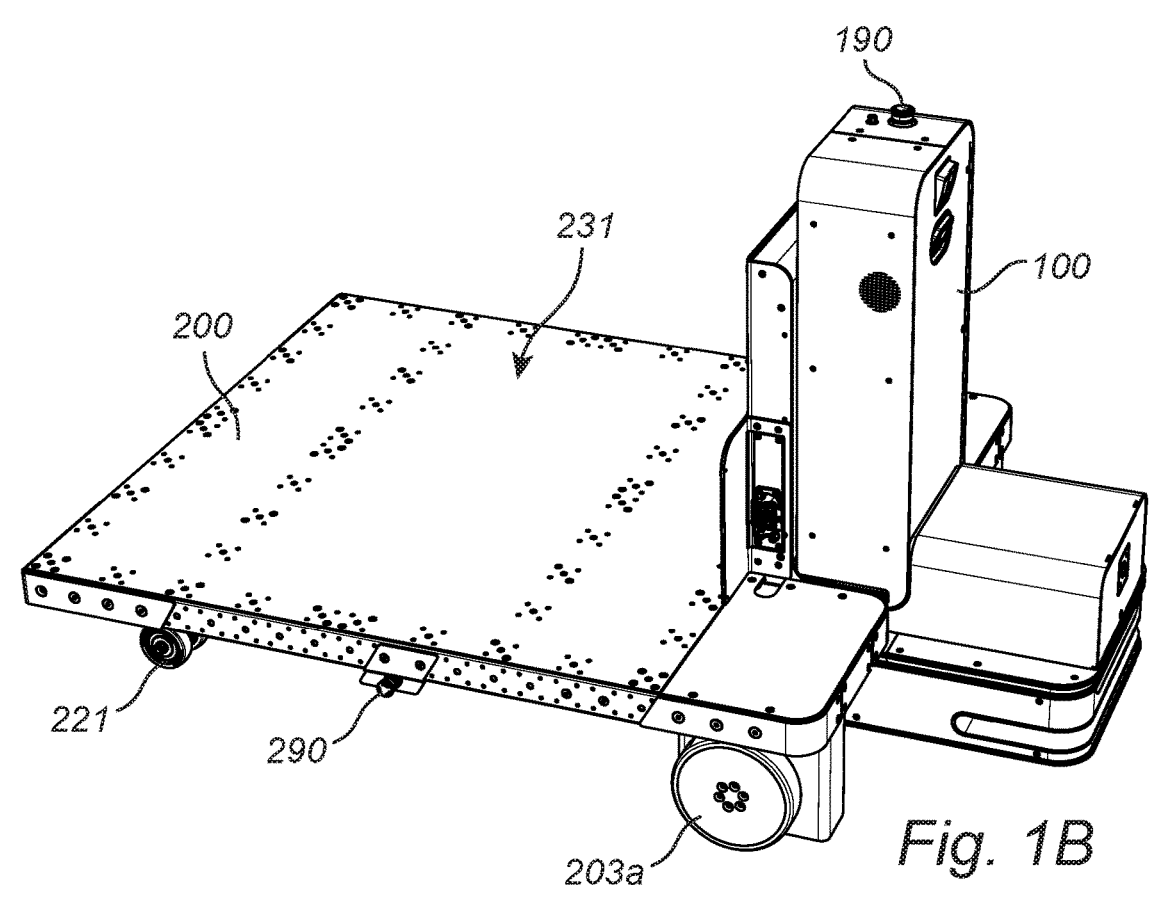

FIG. 1B shows the same embodiment of a self-propelled guide unit 100 and self-propelled load bearing unit 200 for an intralogistics as in FIG. 1A, when the self-propelled guide unit 100 is connected to a self-propelled load bearing unit 200. As will be described in further detail with reference to FIGS. 2-5, the self-propelled guide unit 100 has approached the self-propelled load bearing unit 200 along the engagement axis (LA). The mechanical connector 170 of the self-propelled guide unit 100 has been engaged and connected to the mechanical connector 270 on the self-propelled load bearing unit 200. The self-propelled guide unit 100 has then lifted itself by means of an actuator (further described with reference to FIG. 6) in the self-propelled guide unit 100 such that the weight of the self-propelled guide unit 100 is carried by the self-propelled load bearing unit 200 and the wheels of the self-propelled guide unit 100 have been lifted from the floor surface such that the wheels of the self-propelled guide unit 100 no longer engages the floor surface. The lifting of the self-propelled guide unit 100 relative to the self-propelled load bearing unit 200 has caused a first electrical connector on the self-propelled guide unit 100 to connect to a second electrical connector on the self-propelled load bearing unit 100 such that power, sensor signals, control signals and information can be transferred between the self-propelled guide unit 100 and the self-propelled load bearing unit 200. In this connected state, the self-propelled guide unit 100 receives sensor signals from the self-propelled load bearing unit 200 related to the movement of the drive wheels 203*a*, 203*b* of the self-propelled load bearing unit 100, such that the self-propelled guide unit 100 can use the movement of the drive wheels 203*a*, 203*b* when navigating the environment. The self-propelled guide unit 100 transmits control signals to the self-propelled load bearing unit 200 for controlling the propulsion of the self-propelled load bearing unit 200 by controlling the electrical motors of the self-propelled load bearing unit 200.

The self-propelled load bearing unit 200 further comprises an emergency stop button 290 which may be pushed by a human operator any time. When the emergency stop button 290 is pushed, an emergency stop signal is transmitted to the self-propelled guide unit 100 for stopping the self-propelled load bearing unit 200. The self-propelled guide unit 100 also has an emergency stop button 190.

In the embodiment shown in FIG. 1B, all wheels of the self-propelled guide unit 100 are lifted from the floor surface when the self-propelled guide unit 100 and self-propelled load bearing unit 200 are fully connected, such that the entire self-propelled guide unit 100 is lifted from the floor surface. The weight of the self-propelled load bearing unit 200 is thus increased which increases the force creating the traction between the drive wheels 203*a*, 203*b* of the self-propelled load bearing unit 200 and the floor surface. When the self-propelled guide unit 100 is lifted from the floor surface, the self-propelled guide unit 100 is configured to receive information concerning the movement of a drive wheel 203*a*, 203*b* of the self-propelled load bearing unit 200 obtained from at least one motor of the self-propelled load bearing unit 200, or from at least one encoder connected to at least one of the drive wheels 203*a*, 203*b* of the self-propelled load bearing unit 200. Information concerning the movement of the at last one drive wheel 203*a*, 203*b* is preferably received from two drive wheels 203*a*, 203*b* of the self-propelled load bearing unit 200, such that turning, and drive pattern of the self-propelled load bearing unit 200 can be assessed. In the embodiments shown in the drawings, the self-propelled guide unit 100 is equipped with an actuator (further described with reference to FIG. 6), such as a linear actuator, for lifting the self-propelled guide unit 100. However, in alternative embodiments, self-propelled load bearing units may be equipped with an actuator for lifting the self-propelled guide unit 100.

In the embodiment shown in the drawings, the self-propelled guide unit 100 is remote controlled and/or autonomous and is more competent, faster, and lighter than the self-propelled load bearing unit 200 but lack the load bearing capabilities or have load bearing capabilities that are less than $\frac{1}{10}$ of the load bearing capabilities of the self-propelled load bearing unit 200. The self-propelled guide unit 100 has a smaller footprint than the self-propelled load bearing unit 200.

In the embodiment shown in the drawings, sophisticated, sensitive, and expensive components are excluded from the self-propelled load bearing unit 200, making the self-propelled load bearing unit 200 easier to manufacture, more robust and reduces the maintenance cost of the self-propelled load bearing unit 200. As the load bearing unit 200 is self-propelled, i.e., not pulled by the self-propelled guide unit 100, the self-propelled guide unit 100 can be made small, light and fast, making it possible to have the self-propelled guide unit 100 move about for example a factory setting without many of the risks to human operators that unavoidably are present when moving a large and heavy load bearing cart. It is also possible to have self-propelled guide units 100 coordinating a larger amount of self-propelled load bearing units 200. It is also possible to have one type of self-propelled guide unit 100 guiding and controlling a large variety of self-propelled load bearing units 200. In the embodiment shown in the figures, the self-propelled guide unit 100 is less than 50% of the footprint area of the self-propelled load bearing unit 200. The length d1 of the self-propelled guide unit 100 is less than 50% of the length d3 of the self-propelled load bearing unit 200, the width d5 of the self-propelled guide unit 100 is less than 50% of the width d4 of the self-propelled load bearing unit 200, the weight of the self-propelled guide unit 100 is less than 50% of the weight of the self-propelled load bearing unit 200, and the footprint of the self-propelled guide unit 100 is less than 50% of the footprint of the self-propelled load bearing unit 200. In alternative embodiments, the length and/or width and/or weight and/or footprint of the self-propelled guide unit 100 may be less than 30% of the length and/or width and/or weight and/or footprint of the self-propelled load bearing unit 200.

The self-propelled guide unit 100 has a top speed which is at least 200% of the top speed of the self-propelled load bearing unit 200, which means that the self-propelled guide unit 100 can move around in an environment, such as a factory, much quicker when not being connected to a self-propelled load bearing unit.

In the embodiment shown in the drawings, the self-propelled guide unit 100 has a weight in the range 50-200 kg, which means that that the motors of the self-propelled guide unit 100 only need to create torque sufficient for accelerating the self-propelled guide unit 100 with a weight in the range 50-200 kg and the breaks only need to be capable of deaccelerating the self-propelled guide unit 100 with a weight in the range 50-200 kg.

In contrast, the self-propelled load bearing unit 200 described with reference to the drawings are configured to carry a load in the range 300-2000 kg, which means that the motors of the self-propelled load bearing unit 200 need to create torque sufficient for accelerating the self-propelled load bearing unit 200 with a weight in the range 300-2000 kg and the breaks of the self-propelled load bearing unit 200 need to be capable of deaccelerating the self-propelled load bearing unit 200 with a weight in the range 300-2000 kg.

In one exemplifying embodiment, the combined motors for the propulsion of the self-propelled load bearing unit are configured for generating a maximum torque being 3 times the maximum torque of the combined motors for the propulsion of the self-propelled guide unit 100.

In another exemplifying embodiment, the combined motors for the propulsion of the self-propelled load bearing unit 200 is configured for generating a maximum torque being 6 times the maximum torque of the combined motors for the propulsion of the self-propelled guide unit 100.

Figure 2:
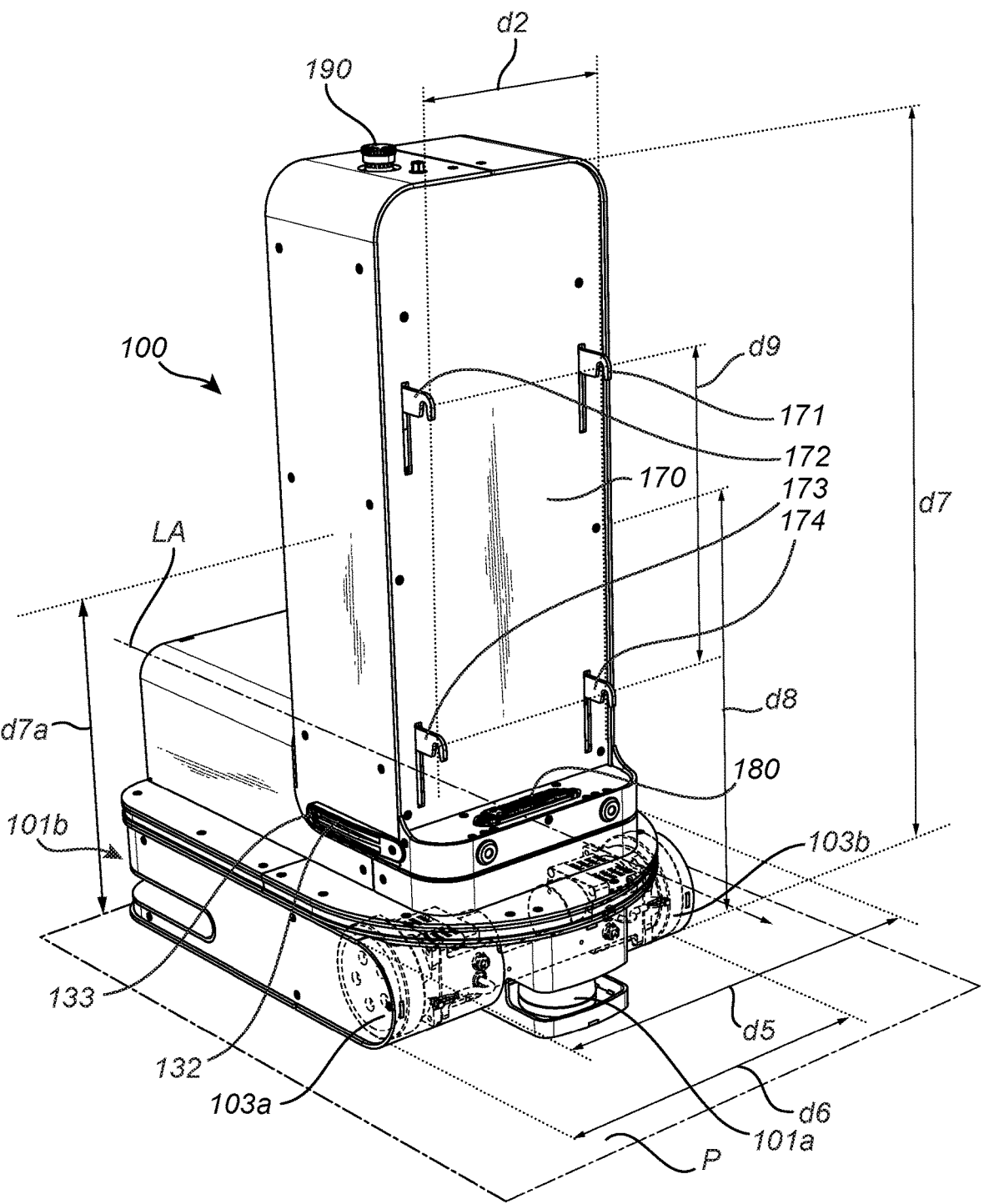
FIG. 2 shows a self-propelled guide unit for an intralogistics system in an elevated perspective view.

FIG. 2 shows an isolated view of the self-propelled guide unit 100 of the embodiment in FIGS. 1A and 1B. The self-propelled guide unit 100 is configured to connect to and guide a self-propelled load bearing unit (200), such that the self-propelled load bearing unit can travel on a floor surface when the self-propelled guide unit 100 and the self-propelled load bearing unit are connected. The self-propelled guide unit 100 is configured to receive at least one parameter from the self-propelled load bearing unit and use the at least one parameter in the generation of control signals that are transmitted to the self-propelled load bearing unit for controlling the propulsion of the self-propelled load bearing unit.

In the embodiment shown in FIG. 2, the self-propelled guide unit 100 comprises four engaging elements 171-174 configured to engage corresponding engaging elements (271-274) on the self-propelled load bearing unit. The engaging elements 171-174 are connected to and operated by an actuator (further described with reference to FIG. 6). The actuator is configured to actuate the engaging elements 171-174 for moving the engagement elements 171-174 downwards, lifting the self-propelled guide unit 100 from the floor surface by the engagement between the engagement elements 171-174 on the self-propelled guide unit 100 and the corresponding engagement elements on the self-propelled load bearing unit. In the embodiment shown in FIG. 2, the actuator is configured to move the engaging elements 171-714 in a strict vertical direction towards the floor surface, i.e. a direction being a normal to the plane of the floor surface. As such, the engaging elements 171-174 carries a major portion of the weight of the self-propelled guide unit 100, when the self-propelled guide unit 100 is lifted from the floor surface. However, in alternative embodiments, the actuator may be configured to move the engaging elements at an angle relative to the normal of the plane of the floor surface, such that the self-propelled guide unit 100 may be lifted at an angle, e.g. an angle in range 0°-45° From relative to the normal of the plane of the floor surface. In such an embodiment, the lifting of the self-propelled guide unit 100 may be guided by an inclined plane connected to the self-propelled load bearing unit for supporting the lifting of the self-propelled guide unit 100.

In the embodiment shown in FIG. 2, the engaging elements 171-174 on the self-propelled guide unit 100 comprises a protrusion in the form of hooks 171-174 configured to engage corresponding recesses comprising shafts suitable for engagement with the hooks 171-174. The hooks 171-174 and the shafts for engagement are described in further detail with reference to FIGS. 4A-4C. The hooks 171-174 are configured to stabilize the self-propelled guide unit 100 in at least a first, second and third direction. The self-propelled guide unit 100 is configured to engage the self-propelled load bearing unit along an engagement axis LA, for positioning the self-propelled guide unit 100 relative to the self-propelled load bearing unit in a position enabling the connection between the self-propelled guide unit 100 and the self-propelled load bearing unit. The engagement axis LA being the axis along which the self-propelled guide unit 100 travels in the final stages before engaging with the self-propelled load bearing unit. The engagement axis LA is parallel to the plane of the floor surface and thus perpendicular to the normal of the plane of the floor surface (perpendicular to the vertical direction towards the floor surface). The hooks 171-174 are configured to stabilize the self-propelled guide unit 100 in a first direction, being a direction of the engagement axis LA (the direction of protrusion of the hooks 171-174), a second direction being the direction opposite to the engagement axis LA, and a third direction being the direction of the normal to the plane of the floor surface, i.e. the direction supporting the weight from the self-propelled guide unit 100 when the self-propelled guide unit 100 has been lifted from the floor surface.

In the embodiment shown in FIG. 2, the first hook 171 and the second hook 172 are horizontally aligned and horizontally spaced-apart, the third hook 173 and the fourth hook 174 are horizontally aligned and horizontally spaced-apart, the second hook 172 and the third hook 173 are vertically aligned and vertically spaced-apart, and the first hook 171 and the fourth hook 174 are vertically aligned and vertically spaced-apart. The plane of the floor surface coincides with a floor contacting plane P, which is defined by wheel portions of the self-propelled guide unit 100 configured to engage the floor surface when the self-propelled guide unit 100 travels on the floor surface. I.e., the plane P being the plane that the wheels abut when the self-propelled guide unit 100 travels on the floor surface. The first and second hooks 171, 172, and the third and fourth hooks 173, 174, are horizontally aligned and spaced-apart on a common axis parallel to the floor contacting plane P.

The self-propelled guide unit 100 has a maximum width d5 at the widest portion of the self-propelled guide unit 100, in a horizontal direction perpendicular to the engagement axis LA. In the embodiment shown in FIG. 2, the first and second hooks 171, 172, and the third and fourth hooks 173, 174, are horizontally spaced-apart with a distance d2 exceeding 20% of the maximum width d5, more specifically exceeding 30% of the maximum width d5, more specifically exceeding 40% of the maximum width d5, more specifically exceeding 50% of the maximum width d5.

In the embodiment shown in FIG. 2, the self-propelled guide unit 100 comprises two frontal wheels 103a, 103b. The two wheels 103a, 103b has a maximum wheel-base distance d6, which is the largest distance between the distal portions of the two frontal wheels 103a, 103b of the self-propelled guide unit 100. In the embodiment shown in FIG. 2, the first and second hooks 171, 172, and the third and fourth hooks 173, 174, are horizontally spaced-apart with a distance d2 exceeding 20% of the maximum wheel-base distance d6, more specifically exceeding 30% of the maximum wheel-base distance d6, more specifically exceeding 40% of the maximum wheel-base distance d6, more specifically exceeding 50% of the maximum wheel-base distance d6.

In the embodiment shown in FIG. 2, the first and fourth hooks 171, 174, and the second and third hooks 172, 173, are vertically aligned on a common axis parallel to the floor contacting plane P, and spaced-apart in a direction perpendicular to the floor contacting plane P.

In the embodiment shown in FIG. 2, the self-propelled guide unit 100 has a maximum height d7 at the tallest portion of the self-propelled guide unit 100, in a vertical direction normal to the floor contacting plane P and perpendicular to the engagement axis LA. In the embodiment shown in FIG. 2, the first and fourth hooks 171, 174, and the second and third hooks 172, 173, are vertically spaced-apart with a distance exceeding 20% of the maximum height d7, more specifically exceeding 30% of the maximum height d7, more specifically exceeding 40% of the maximum height d7.

In the embodiment shown in FIG. 2, the self-propelled guide unit 100 further has an average height d7a relative to the footprint of the self-propelled guide unit 100, in a vertical direction perpendicular to the engagement axis LA, i.e., being the average of all heights of the footprint of the self-propelled guide unit 100. In the embodiment shown in FIG. 2, the first and fourth hooks 171, 174, and the second and third hooks 172, 173 are vertically spaced-apart with a distance d9 exceeding 10% of the average height.

In the embodiment shown in FIG. 2, the first and fourth hooks 171, 174, and the second and third hooks 172, 173 are vertically spaced-apart with a distance d9 exceeding 10 cm, more specifically exceeding 20 cm and even more specifically exceeding 30 cm.

In the embodiment shown in FIG. 2, the first and second hooks 171, 172, and the third and fourth hooks 173, 174 are horizontally spaced-apart with a distance exceeding 10 cm, more specifically exceeding 20 cm.

The engaging elements or hooks 171-174 being spaced-apart horizontally creates stability in the side-to-side direction when the self-propelled guide unit 100 is lifted from the floor surface and hangs on the self-propelled load bearing unit by the connection between the self-propelled guide unit 100 and the self-propelled load bearing unit. The engaging elements or hooks 171-174 being spaced-apart vertically creates stability in a front-to-back direction, i.e. the direction of the engagement axis LA, when the self-propelled guide unit 100 is lifted from the floor surface and hangs on the self-propelled load bearing unit by the connection between the self-propelled guide unit 100 and the self-propelled load bearing unit.

In the embodiment shown in FIG. 2, the engaging elements or hooks 171-174 protrudes within the foot-print lower portion of the self-propelled guide unit 100, such that the engaging elements or hooks 171-174 do not protrude from the self-propelled guide unit 100 in a way that risks injuring people in the vicinity of the self-propelled guide unit 100.

In the embodiment shown in FIG. 2, all of the engaging elements or hooks 171-174 are positioned vertically above the center of gravity of the self-propelled guide unit 100, when the self-propelled guide unit 100 travels on the floor surface. This creates a more stable fixation of the self-propelled guide unit 100 as the self-propelled guide unit 100 hangs on the hooks 171-174 with a majority of the weight below the engagement between the self-propelled guide unit 100 and the self-propelled load bearing unit, which means that gravity stabilizes the self-propelled guide unit 100. It is however conceivable in other embodiments that one or two engagement elements are positioned vertically above the center of gravity of the self-propelled guide unit 100 and one or two engagement elements are positioned vertically below the center of gravity of the self-propelled guide unit.

In the embodiment shown in FIG. 2, the four engaging elements or hooks 171-174 has an average vertical distance d8 from the floor contacting plane P. The actuator (further described with reference to FIG. 7) withholds force from a position having a longer vertical distance from the floor contacting plane P than the average vertical distance d8.

The self-propelled guide unit 100 further comprises an electrical connector 180 for electrically connecting the self-propelled guide unit 100 to the self-propelled load bearing unit such that sensor signals and ID-information can be transferred from the self-propelled load bearing unit to the self-propelled guide unit 100 and control signals can be transferred from the self-propelled guide unit 100 to the self-propelled load bearing unit. The electrical connector 180 is configured to be moved by the actuator by the relative displacement between the engaging elements 171-174 and the electrical connector 180. I.e., when the engaging elements 171-174 are moved downwards, the self-propelled guide unit 100 is lifted from the floor surface and upwards, which means that the electrical connector 180 is also lifted upwards. As the connecting interface of the electrical connector 180 is facing upwards, the electrical connector 180 can connect to a second electrical connector on the self-propelled load bearing unit having a corresponding connecting interface facing downwards when the self-propelled load bearing unit travels on the floor surface, by vertical movement of the first electrical connector 180. As the engaging elements 171-174 first needs to engage with the corresponding engaging elements on the load bearing unit, the actuator will first move the engaging elements 171-174 into engagement before the actuator starts lifting the self-propelled guide unit 100. The process of moving the engaging elements 171-174 into engagement will position the engaging elements 171-174 of the self-propelled guide unit 100 in a specific pre-defined position relative to the self-propelled load bearing unit. This aligns the electrical connector 180 with the second electrical connector on the self-propelled load bearing unit 200 and consequently the electrical connector 180 is configured to be moved by the actuator to connect to the second electrical connector, after the actuator has moved engaging elements 171-174. As the electrical connector moves as a consequence of the movement of the engaging elements 171-174, the electrical connector will move in a direction opposite to the direction towards the floor surface that the engaging elements 171-174 moves in. The electrical connector 180 comprises a plurality of recesses or protrusions for creating multiple electrical connections between the self-propelled guide unit 100 and the self-propelled load bearing unit for transferring power and/or control signals. The electrical connector is further described with reference to FIGS. 4A-4C.

The electrical connector 180 may also be adapted for powering equipment for handling the load placed on the self-propelled load bearing unit, such as electrical rollers for loading/unloading the load. In some embodiments, the electrical connector 180 may be configured for transferring electrical energy for the purpose of charging a battery on the self-propelled load bearing unit, from a battery on the self-propelled guide unit 100, or for the purpose of charging a battery on the self-propelled guide unit 100 from a charger or charging station connected to the electrical grid, or from a battery on the self-propelled load bearing unit or on another self-propelled guide unit 100.

In the embodiment shown in FIG. 2, the two drive wheels 103a, 103b enables control in all directions on a planar surface by altering the rotational speed and/or direction of the drive wheels 103a, 103b. The drive wheels 103a, 103b are drive wheels 103a, 103b suitable for use in a warehouse or factory setting and may be drive wheels 103a, 103b suitable for use on a flat concrete floor. The drive wheels 103a, 103b are connected to rotary encoders, sensing the rotational speed of a particular drive wheel 103a, 103b. The information derived by the rotary encoders may be used to compare the rotational speed of a particular drive wheel 103a, 103b to the speed of other drive wheel(s) 103a, 103b or to the speed of a self-propelled load bearing unit. The information of the movement of the drive wheels 103a, 103b is used as navigation information, it is important that traction is maintained between the floor surface and the drive wheels 103 when the wheels of the self-propelled guide unit 100 engages the floor surface (i.e., when the self-propelled guide unit 100 does not hang on the self-propelled load bearing unit 100).

In the embodiment shown in FIG. 2, the self-propelled guide unit 100 comprises a first frontal LIDAR 101a and at least a second, rear LIDAR 101b. The LIDARS 101a, 101b are protected by a recessed in the body of the self-propelled guide unit 100 such that the body of the self-propelled guide unit 100 protects the LIDARS 101*a*, 101*b*. The LIDARS 101*a*, 101*b* create an image of the surroundings of the self-propelled guide unit 100 such that the self-propelled guide unit 100 can navigate and provide navigational information to, and control, a self-propelled load bearing unit. The LIDARS further helps the self-propelled guide unit 100 to position itself relative to the self-propelled load bearing unit for enabling connection between the self-propelled guide unit 100 and the self-propelled load bearing unit. Alternative sensors on the self-propelled guide unit 100 could be radar units, sonic sensor units and/or optical sensor units, IR or cameras using image recognition.

In the embodiment shown in FIG. 2, the self-propelled guide unit 100 comprises mechanical guide elements 132, made from a resilient polymer material such as nylon. The mechanical guide elements 132 are configured to engage in the final positioning of the self-propelled guide unit 100 relative to the self-propelled load bearing unit. The mechanical guide elements 132 have an integrated inductive or magnetic sensor 133 configured to sense a positioning element on the self-propelled load bearing unit. The integrated inductive or magnetic sensor 133 is configured to send a signal to the control unit of the self-propelled guide unit 100 when the self-propelled guide unit 100 is properly positioned relative to the self-propelled load bearing unit, such that the connection between the engaging elements 171-174 of the self-propelled guide unit 100 and the engaging elements self-propelled load bearing unit can start. The mechanical guide elements 132 are further illustrated in FIGS. 8A-10H.

The self-propelled guide unit 100 further comprises an on-board computer configured to handle all calculations and input/output of sensor and control signals. The on-board computer comprises a transceiver configured to send and receive sensor and control signals to and from the self-propelled load bearing unit. Sensor signals could be data from a navigational sensor, such as a LIDAR located on the self-propelled guide unit 100, or possibly located on the self-propelled load bearing unit 200. Navigation data could also be information about the surroundings, such as a factory or warehouse layout, received by the self-propelled guide unit 100 from external sources, such as an external navigation sensor being stationary or mobile (such as a stationary LIDAR, IR-sensor or a LIDAR on another remote controlled or autonomous vehicle). Sensor signals could also be information concerning the movement of the drive wheels 103*a*, 103*b* of the self-propelled guide unit 100 and/or the drive wheels of the self-propelled load bearing unit. The information on the movement of the drive wheels 103*a*, 103*b* could preferably be obtained by an encoder connected to the drive wheels 103*a*, 103*b*. Sensor information could also be an emergency stop signal.

An emergency stop signal could for example be generated by an operator pushing an emergency stop button 190 located on the self-propelled guide unit 100 or on the self-propelled load bearing unit. The emergency stop signal may then be transferred by means of an electrical connection between the self-propelled load bearing unit and the self-propelled guide unit 100 such that the self-propelled guide unit 100 can control the propulsion of the self-propelled load bearing unit 200 for stopping the self-propelled load bearing unit 200.

The self-propelled guide unit 100 may further comprises a wireless communication unit configured to transmit and receive wireless communication to and/or from at least one of: a self-propelled load bearing unit, other self-propelled guide units or stationary wireless units being part of the logistic system. The wireless communication unit could be based on the IEEE 802.11 standard (WLAN or Wi-Fi) or UHF radio communication such as the IEEE 802.15.1 standard (Bluetooth) or a wireless communication unit based on the 3GPP NR standards (5G) enabling Ultra-Reliable Low-Latency Communications (URLLC). The wireless communication could be information or data e.g., relating to the identity of the self-propelled guide units 100 or the identity of the self-propelled load bearing units. The wireless communication between the self-propelled load bearing unit and the self-propelled guide unit 100 may be bidirectional, such that the self-propelled guide unit 100 may transmit and/or receive information from/to the self-propelled load bearing unit, which information could comprise, apart from identity information, specifics of the load on the self-propelled load bearing unit (weight, height etc.). It is further possible to transmit and/or receive more complex data such as navigation information such as driving instructions or information about the surroundings to or from the self-propelled guide unit 100.

The on-board computer of the self-propelled guide unit 100 is much more sophisticated than the computing unit of the self-propelled load bearing unit. The more sophisticated computing unit of the self-propelled guide unit 100 has a faster processing unit, a larger storage capacity, faster connection to other self-propelled guide units or to the logistics systems or to the self-propelled load bearing units. The computing unit of the self-propelled guide unit 100 further comprises more I/O-units than the computing unit of the self-propelled load bearing unit, enabling the self-propelled guide unit 100 to receive input from more sensors.

Figure 3:
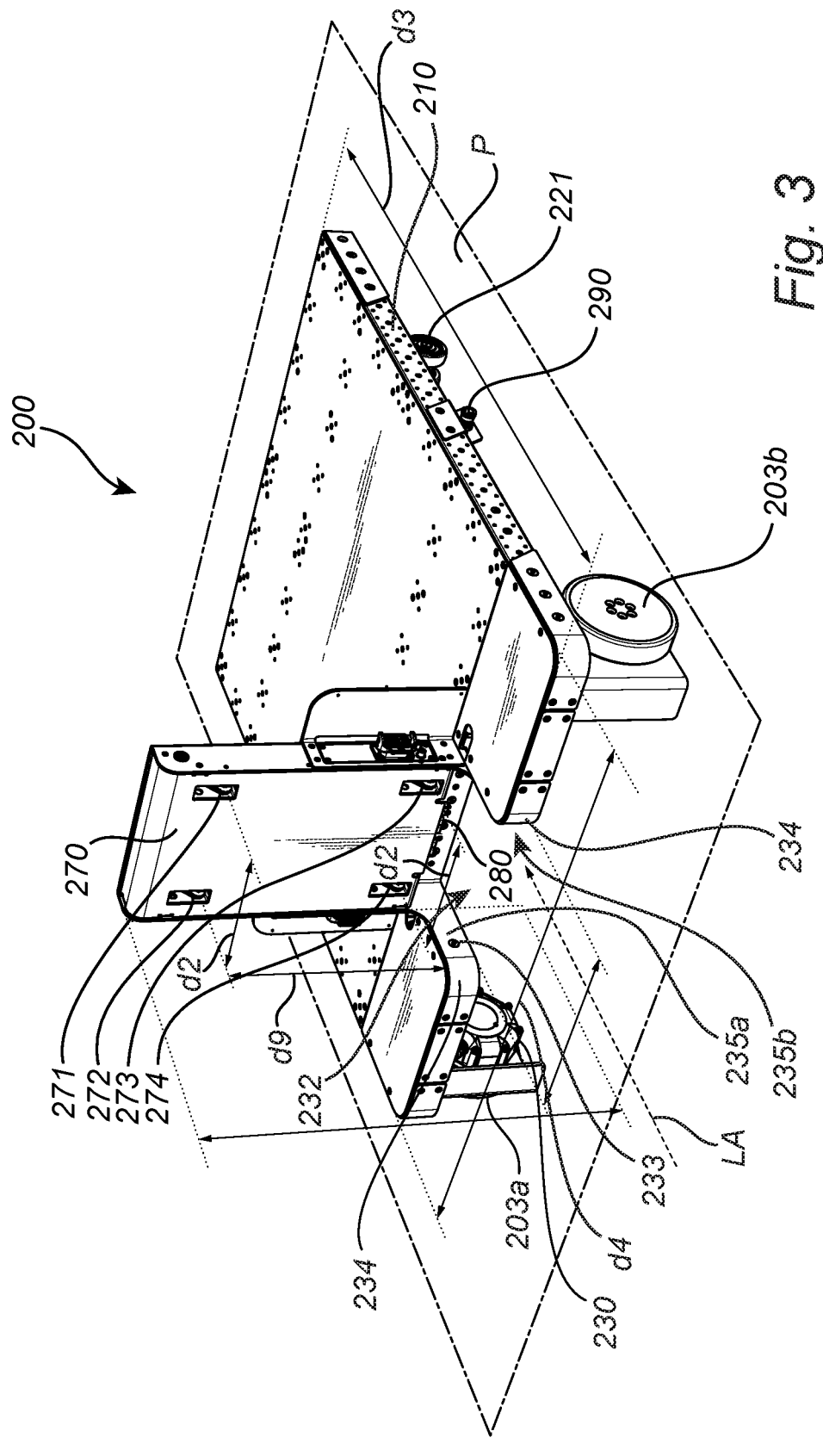
FIG. 3 shows a self-propelled load bearing unit for an intralogistics system in an elevated view.

FIG. 3 shows an isolated view of a self-propelled load bearing unit 200 for an intralogistics system, the self-propelled load bearing unit 200 has two drive wheels 203*a*, 203*b* connected to electrical motors 230. The self-propelled load bearing unit 200 further comprises two swiveling castors 221, the swiveling castors 221 are fixated to support structures which in turn are fixated to the frame 210 of the self-propelled load bearing unit 200 by means of e.g., screws or other fastening means. The emergency stop button 290 is also fixated to the frame 210 of the self-propelled load bearing unit 200 and electrically connected to the self-propelled guide unit for transmitting an emergency stop signal from the emergency stop button 290 on the frame of the self-propelled load bearing unit 200 to the self-propelled guide unit such that the self-propelled guide unit can act on the emergency stop signal and control the propulsion of the self-propelled load bearing unit 200 accordingly.

The self-propelled load bearing unit 200 comprises a receiving portion 232 configured to receive a portion of the self-propelled guide unit, such that the receiving portion 232 encloses three sides of the portion of the self-propelled guide unit. The receiving portion 232 comprises the positioning element 233 configured to interact with the inductive or magnetic sensor (133) of the self-propelled guide unit. The receiving portion is configured to receive the portion of the self-propelled guide unit along the engagement axis LA. In the embodiment shown in FIG. 3, the receiving portion 232 is configured to receive more than ⅕ of the length of the self-propelled guide unit in the direction of the engagement axis LA. The receiving portion 232 comprises an entry portion comprising mechanical guide element in the form or rounded or chamfered surfaces 234 guiding the self-propelled guide unit for facilitating the entry into the receiving portion 232.

In alternative embodiments, the mechanical guide elements (132 in FIG. 2) may be placed on the two opposite sides 235A, 235B of the entry portion 232 for engaging with the sides of the self-propelled guide unit, instead of being placed on the sides of the self-propelled guide unit.

In the embodiment shown in FIG. 3, the mechanical connector 270 of the self-propelled load bearing unit 200 comprises four engagement elements in the form of four recesses 271-274 for connection with the corresponding protrusions (171-174) of the self-propelled guide unit. The mechanical connector 270 is configured to enable the self-propelled guide unit to be connected to the self-propelled load bearing unit 200. The mechanical connector 270 is positioned in the front portion of the self-propelled load bearing unit 200 and facing rearwards such that the self-propelled guide unit 100 will be positioned substantially centrally in front of the self-propelled load bearing unit 200, when the self-propelled guide unit is connected to the self-propelled load bearing unit 200.

The mechanical connection 270 is configured to hold the weight of the self-propelled guide when it is lifted from the floor surface.

The self-propelled load bearing unit 200 further comprises an electrical connector 280 for electrically connecting the self-propelled load bearing unit 200 to the self-propelled guide unit such that sensor signals and ID-information can be transferred from the self-propelled load bearing unit 200 to the self-propelled guide unit and control signals can be transferred from the self-propelled guide unit to the self-propelled load bearing unit 200. The connecting interface of the electrical connector 280 is facing downwards, such that the electrical connector 280 can connect to an electrical connector (180) on the self-propelled guide unit having a corresponding connecting interface facing upwards by vertical movement of the electrical connector (180) of the self-propelled guide unit. As the engaging elements 271-274 first needs to engage with the corresponding engaging elements on the self-propelled guide unit, the engaging elements 271-274 will first be in engagement with the corresponding engaging elements on the self-propelled guide unit before the electrical connector 280 is connected to the corresponding electrical connector on the self-propelled guide unit. The process of having the engaging elements 271-274 engage the engaging elements (171-174) of the self-propelled guide unit aligns the electrical connector 280 with the electrical connector on the self-propelled guide unit and consequently the electrical connector 280 is configured to be connected to the electrical connector on the self-propelled guide unit after the engaging elements 271-274 have been placed in engagement with the engaging elements (171-174) of the self-propelled guide unit.

The electrical connector 280 comprises a plurality of recesses or protrusions for creating multiple electrical connections between the self-propelled guide unit and the self-propelled load bearing unit 200 for transferring power and/or control signals.

The self-propelled load bearing unit 200 may further comprise a wireless transceiver, which may be a wireless communication unit, configured to transmit and receive wireless communication to and/or from a self-propelled guide unit and/or a mobile unit operated by a driver and/or a stationary wireless unit being part of a logistic system. The wireless communication could be information or data e.g. relating to driving or navigation of the self-propelled load bearing unit 200, or identity information or information with regards to the load on the self-propelled load bearing unit 200 (weight, height etc.).

The self-propelled load bearing unit 200 may be powered by the energy source of the self-propelled guide unit. However, in alternative embodiments the self-propelled load bearing unit 200 may have an energy source of its own which is used on its own or in combination with the energy source of the self-propelled guide unit. The energy source of the self-propelled load bearing unit 200 may be a smaller battery capable of powering the self-propelled load bearing unit 200 for short movements (such as short directly controlled movements by an operator). The energy source of the self-propelled load bearing unit 200 may be configured to be charged by and from the self-propelled guide unit by means of the electrical connection.

In alternative embodiments it is also conceivable that the self-propelled load bearing unit 200 comprises only a single drive wheel (not shown) which could be adapted for propulsion only, or for steering and propulsion. In embodiments in which a single drive wheel is adapted for steering and propulsion, the single drive wheel is turnable by means of for example a powered actuator. In embodiments in which the single drive wheel is configured for propulsion only, the self-propelled load bearing unit may be steered by the self-propelled guide unit.

In conceivable embodiments, the self-propelled load bearing unit 200 may also be used as part of a warehouse system, or as part of a station on an assembly line, which sometimes means that the self-propelled load bearing unit 200 will remain on the same spot for a long time, during which the batteries may be depleted. Having an energy source with sufficient energy in the self-propelled guide unit for powering the self-propelled load bearing unit 200 removes this problem as the self-propelled load bearing unit 200 can be easily energized by the batteries of the self-propelled guide unit.

In the embodiment shown in FIG. 3, the self-propelled load bearing unit 200 comprises a computing unit configured to control the drive unit and thus the drive wheels 203a, 203b, handle input from sensors on the self-propelled load bearing unit 200 and for handling communication. Preferably, the computing unit on the self-propelled load bearing unit 200 is a much smaller and simpler computing unit than the computing unit of the self-propelled guide unit.

In the embodiment shown in FIG. 3, the self-propelled guide unit 200 comprises four spaced-apart engaging elements 271-274 in the form or recesses configured to engage four engaging elements (171-174) on the self-propelled guide unit. In the embodiment shown in FIG. 3, all four spaced-apart engaging elements 271-274 are positioned vertically above the center of gravity of the self-propelled load bearing unit 200, when the self-propelled load bearing unit travels on the floor surface and configured to carry a major portion of the weight of the self-propelled guide unit when the self-propelled guide unit is connected to the self-propelled load bearing unit 200. All four spaced-apart engaging elements 271-274 are further positioned vertically above the load bearing surface 231. A floor contacting plane P is defined by wheel portions of the self-propelled load bearing unit 200 configured to engage the floor surface when the self-propelled load bearing unit travels on the floor surface. The first and second engaging elements 271, 272 or recesses, are horizontally aligned on a common axis and horizontally spaced-apart in a direction parallel to the floor contacting plane P. The third and fourth engaging elements or recesses 271, 272 are horizontally aligned on a common axis and horizontally spaced-apart in a direction parallel to the floor contacting plane P. The first and third engaging elements or recesses 271, 273 are vertically aligned on a common axis and vertically spaced-apart in a direction perpendicular to the floor contacting plane P (in the direction of a normal to the floor contacting plane P). The second and fourth engaging elements 272, 274 or recesses are vertically aligned on a common axis and vertically spaced-apart in a direction perpendicular to the floor contacting plane P (in the direction of a normal to the floor contacting plane P).

In the embodiment shown in FIG. 3, the first and third engaging elements 271, 273, and the second and fourth engaging elements 272, 274 are vertically spaced-apart with a distance d9 exceeding 10 cm, more specifically exceeding 20 cm and even more specifically exceeding 30 cm in a direction perpendicular to the floor contacting plane P.

In the embodiment shown in FIG. 3, the first and second engaging elements 271 and 272, and the third and fourth engaging elements 273, 274 are horizontally spaced-apart with a distance d2 exceeding 10 cm, more specifically exceeding 20 cm, in a direction parallel to the floor contacting plane P.

Figure 4A:
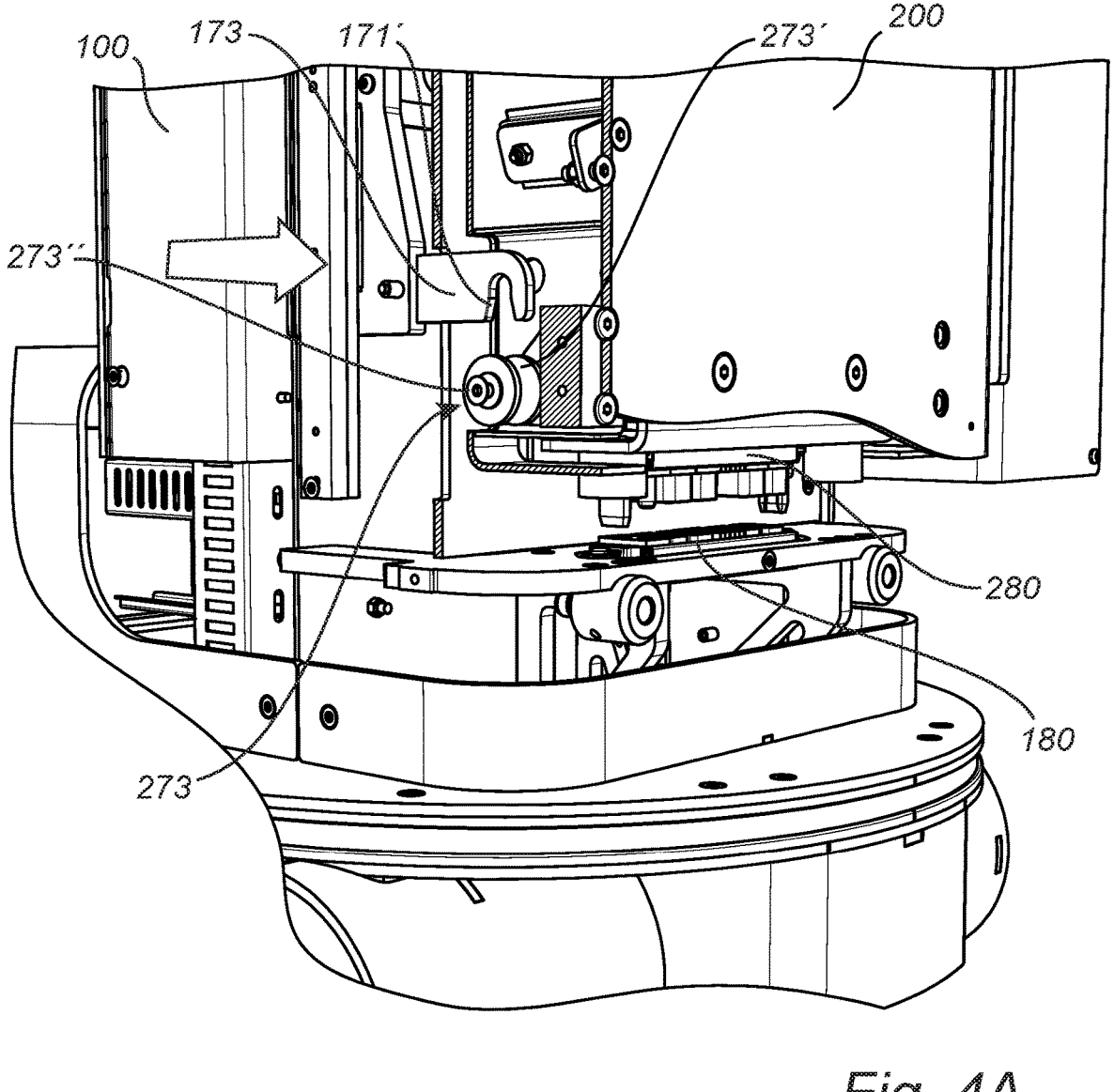
FIG. 4A-4C shows a zoomed partial cross-sectional view of a connection system for connecting a self-propelled guide unit to a self-propelled load bearing unit, in 3 steps (FIG. 4A-4C, respectively) of engagement according to an embodiment of a connection process.
Figure 4B:
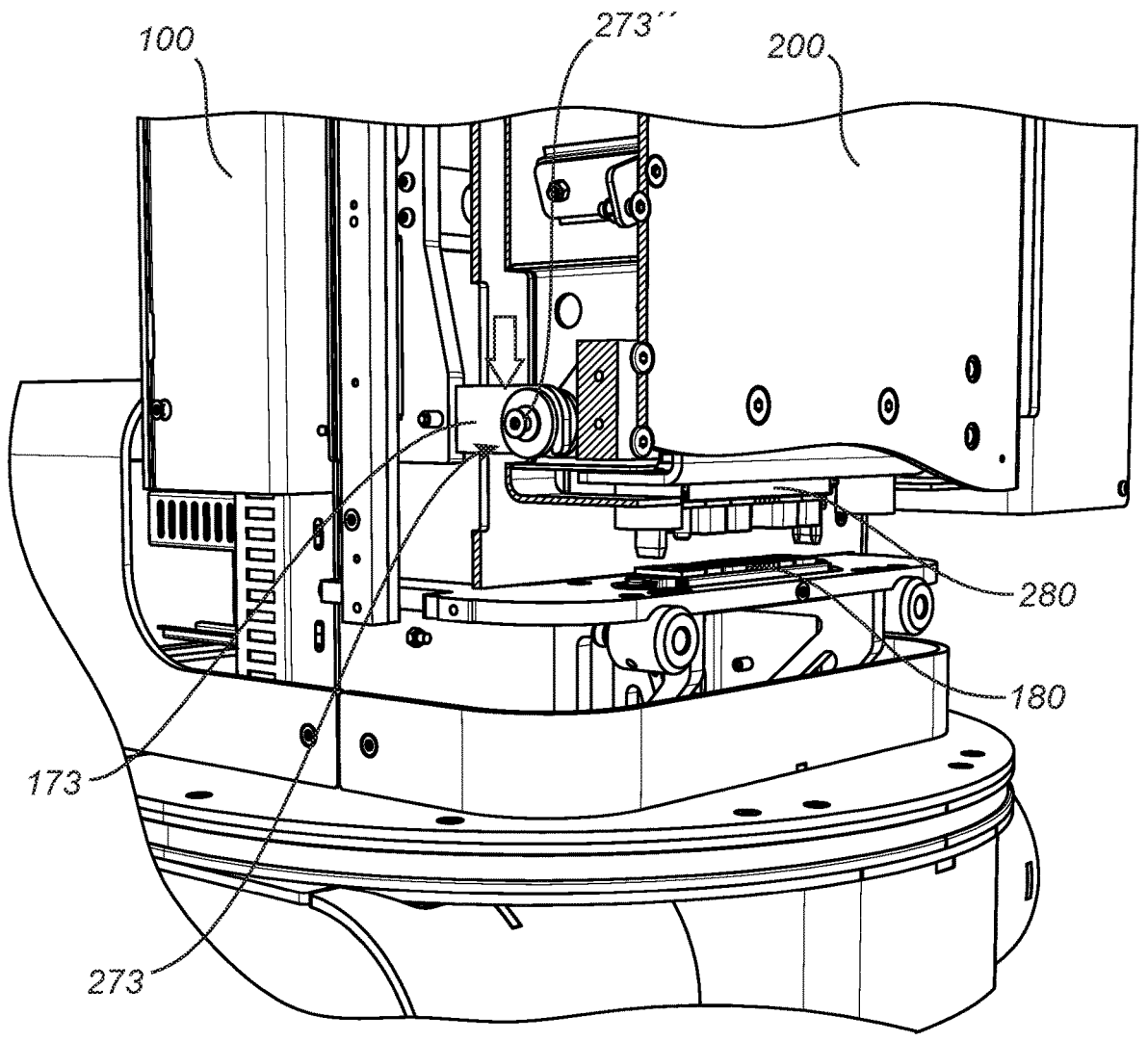
Figure 4C:
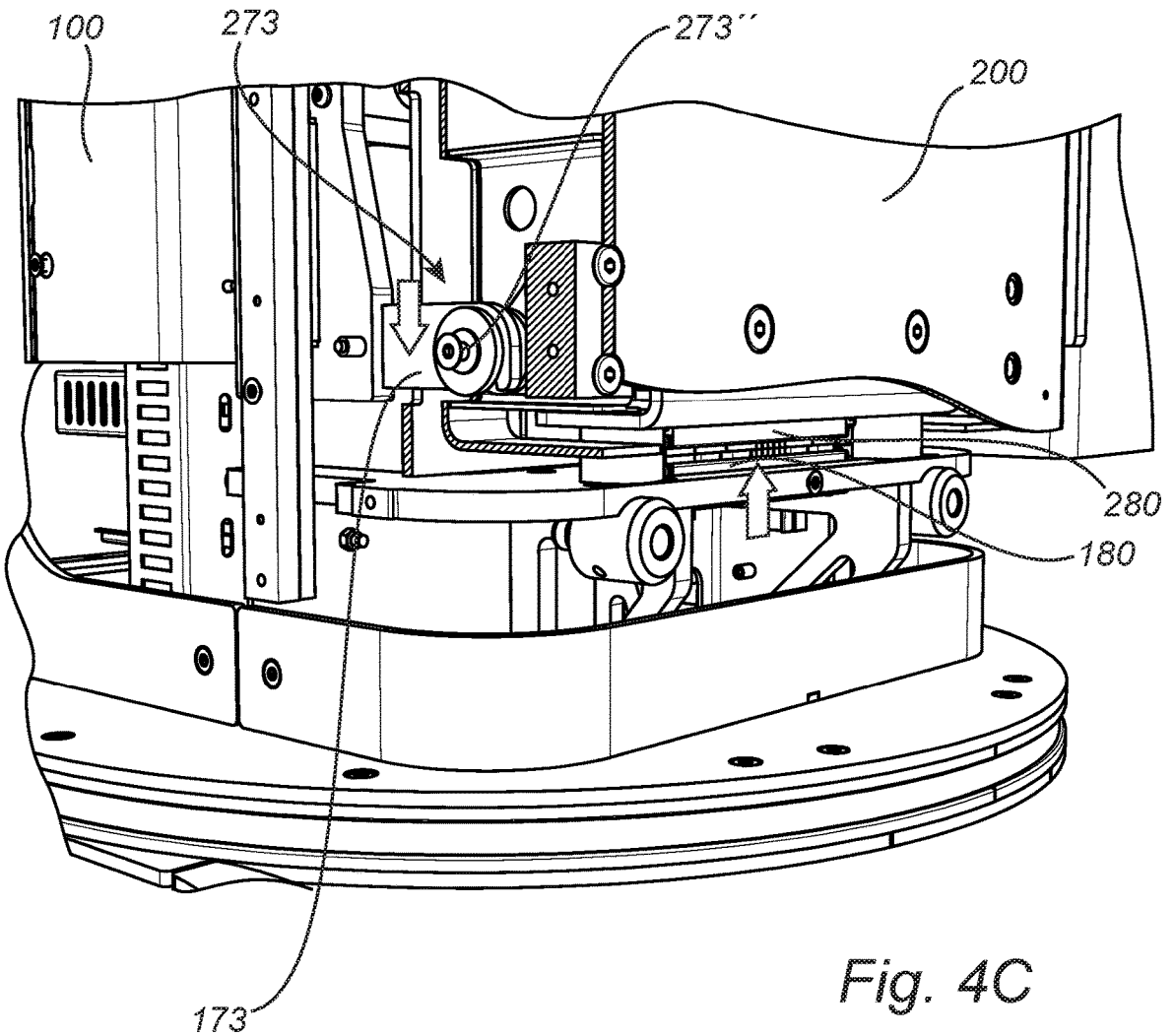

FIG. 4A-4C shows a detailed view of a partial cross-sectional view of the connection system for connecting the self-propelled guide unit 100 to the self-propelled load bearing unit 200 of the embodiments of FIGS. 1-3. The self-propelled guide unit 100 comprises an engaging element 173 in the form of a hook configured to engage an engaging element 273 placed in a recess in the self-propelled load bearing unit 200. The engaging element 273 of the self-propelled load bearing unit 200 comprises a shaft 273" suitable for engagement with the hook 173, i.e. by the hook partially enclosing the shaft 273". The shaft 273" comprises two chamfered rollers 273' which are configured to function as a guide for horizontal alignment of the hooks, in a side-to-side direction. The hook 173 comprises chamfered surfaces 171' configured to engage the shaft 273" for positioning the hook relative to the shaft 273" in a front-to-back direction. As such, when the hook 173 has engaged the shaft 273", the hook 173 and the shaft 273" are in a specific pre-defined position. FIG. 4A shows the connecting system in the state in which the self-propelled guide unit 100 has been positioned in relation to the self-propelled load bearing unit 200 but the connecting operation between by the actuation of the hook 173 has not yet started.

FIG. 4B shows the same view as in FIG. 4A but in the state when the actuator has lowered the engaging element or hook 173 such that the hook partially encloses the shaft 273" of the engaging element of the self-propelled load bearing unit 200. The hook 173 is centered by the two chamfered rollers 273' such that the self-propelled guide unit 100 is positioned in a side-to-side direction and positioned by the chamfered surfaces 173' of the hook 173 in a front-to-back direction. In this state, the self-propelled guide unit 100 is positioned relative to the self-propelled load bearing unit 200, such that the final stage of the connection can be initiated. In this position, the electrical connector 180 of the self-propelled guide unit 100 is aligned with the electrical connector 280 of the self-propelled load bearing unit 200.

FIG. 4C shows the same view as in FIGS. 4A and 4B but in the state when the actuator has further lowered the engagement elements (e.g. the hook 173) of the self-propelled guide unit 100 such that the self-propelled guide unit 100 has been lifted from the floor surface into a position in which the self-propelled guide unit 100 hangs on the self-propelled load bearing unit 100. The lifting of the self-propelled guide unit 100 relative to the self-propelled load bearing unit 200 has caused the electrical connector 180 of the self-propelled guide unit 100 to engage and connect to the electrical connector 280 of the self-propelled load bearing unit 200. The self-propelled guide unit 100 is thus in this state electrically connected to the self-propelled load bearing unit 200 such that sensor signals and ID-information can be transferred from the self-propelled load bearing unit 200 to the self-propelled guide unit 100 and power and control signals can be transferred from the self-propelled guide unit 100 to the self-propelled load bearing unit 200.

Figure 5A:
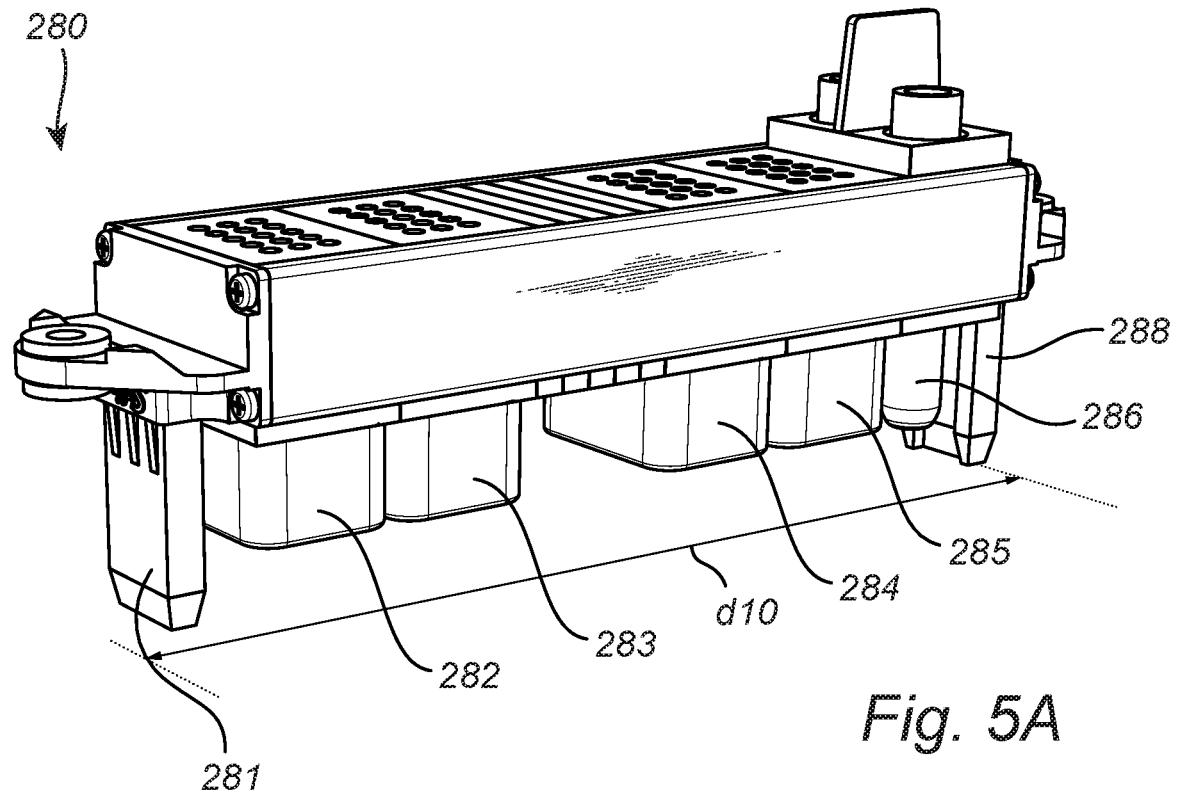
FIG. 5A-5B shows a male and female electrical connector according to the disclosure, respectively.

FIG. 5A shows a detailed view of the second electrical connector 280, being the electrical connector 280 of the self-propelled load bearing unit 200 according to the embodiment shown in the drawings. The electrical connector 280 comprises a first and second protruding mechanical connector 281, 288 configured to mechanically connect the electrical connector 280 of the self-propelled load bearing unit 200 to the electrical connector of the self-propelled guide unit 200. The electrical connector further comprises a plurality of pins for transferring electrical power and/or electrical signals. On the rights side of the connector 280 as illustrated in FIG. 5A, two power pins 286 are located for transferring relatively large currents at 48V voltage for transferring power from the self-propelled guide unit 100 to the self-propelled load bearing unit 200 for powering the drive motors of the self-propelled load bearing unit 200. The electrical connector 280 further comprises a plurality of pins grouped in sections 282-285. Each section being enclosed by a mechanical guide element structure in the form of a protruding wall, configured to protect the pins and aid in the correct engagement between the first and second plurality of recesses or protrusions (or pins and sockets) and for further mechanically connecting and securing the electrical connector 280 of the self-propelled load bearing unit 200 to the electrical connector of the self-propelled guide unit 100. The sections or pins will be further described with reference to FIGS. 5B and 5C.

Figure 5B:
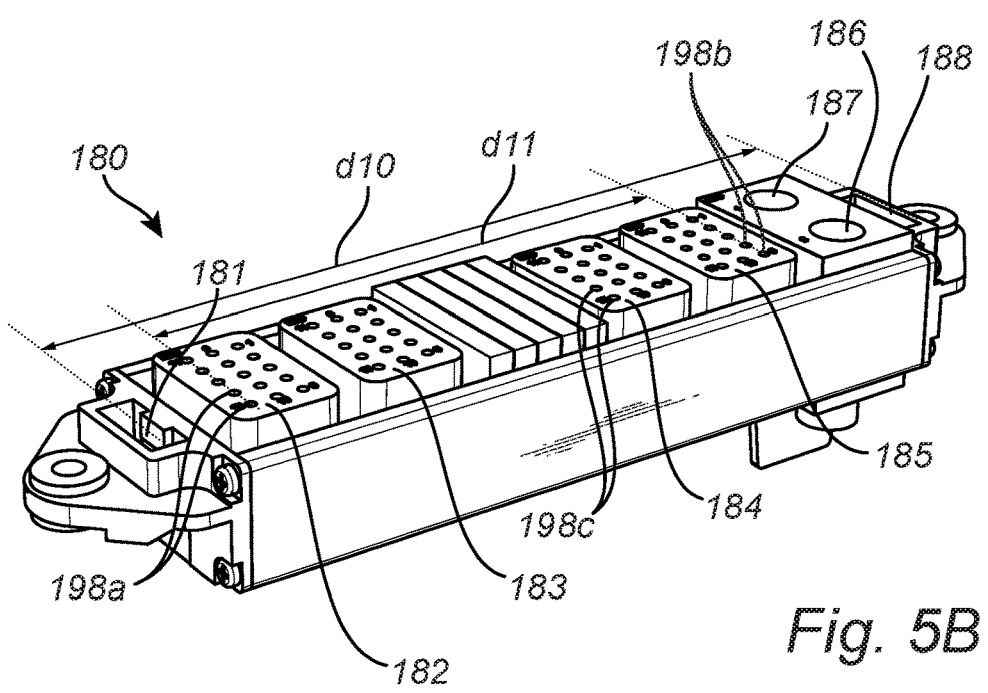

FIG. 5B shows a detailed view of the first electrical connector 180, being the electrical connector 180 of the self-propelled guide unit 100. The electrical connector 180 comprises a first and second mechanical connector recess 181, 188 configured to receive the first and second protruding mechanical connectors (281, 288) of the electrical connector (280) of the self-propelled load bearing unit, for mechanically connecting the electrical connector 180 of the self-propelled guiding unit 100 to the electrical connector of the self-propelled load bearing unit. The electrical connector 180 further comprises a plurality of sockets or recesses for receiving the pins or protrusions of the electrical connector of the self-propelled load bearing unit for transferring electrical power and/or electrical signals between the self-propelled guide unit and the self-propelled load bearing unit. On the rights side of the connector 180 as illustrated in FIG. 5B, two power sockets 186, 187 are located, for receiving the two power pins (286, 287) of the electrical connector of the self-propelled guide unit for transferring relatively large currents at 48V voltage, for transferring power from the self-propelled guide unit to the self-propelled load bearing unit for powering the drive motors of the self-propelled load bearing unit. The electrical connector 180 further comprises a plurality of pins grouped in sections 182-185. Each section 182-185 is protruding such that a recess is created around each of the sections 182-185 for receiving the protruding walls (292-295) enclosing and protecting the sections of pins of the electrical connector of the self-propelled guide unit.

The electrical connector 180 is fixedly fixated to a major portion of the self-propelled guide unit and as such configured to be indirectly actuated by the actuator when the actuator lifts the self-propelled guide unit, such that the electrical connector 180 vertically connects to the electrical connector (280) of the self-propelled load bearing unit.

Figure 5C:
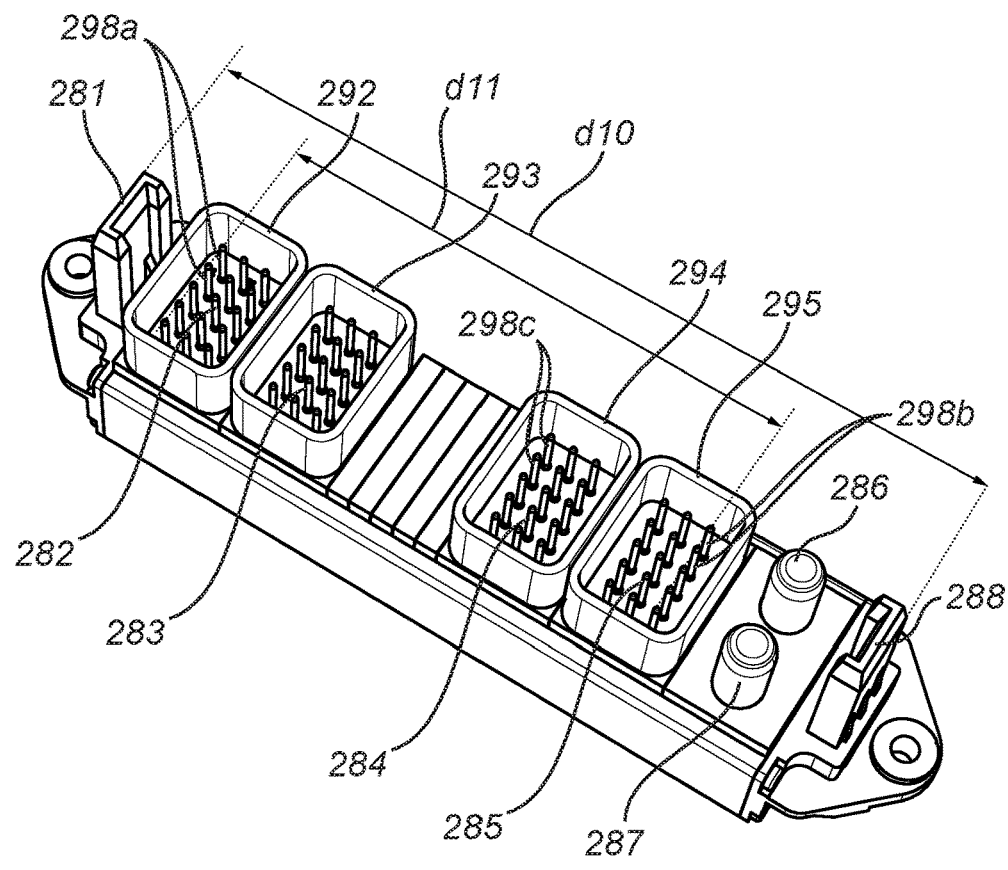
FIG. 5C shows the male electrical connector from the embodiment of FIG. 5A shown from a different angle.

FIG. 5C shows a detailed view of the electrical connector 280 of the self-propelled load bearing unit according to the embodiment shown in the drawings, when turned upside down relative to its positioning when fixated to the self-propelled load bearing unit (and relative to the view in FIG. 5A). Just as shown in FIG. 5A, the electrical connector 280 comprises a first and second protruding mechanical connector 281, 288 configured to mechanically connect the electrical connector 280 of the self-propelled load bearing unit to the electrical connector of the self-propelled guide unit. The electrical connector further comprises a plurality of pins for transferring electrical power and/or electrical signals. On the rights side of the connector 280 as illustrated in FIG. 5C, two power pins 286, 287 are located for transferring relatively large currents at 48V voltage for transferring power from the self-propelled guide unit to the self-propelled load bearing unit for powering the drive motors of the self-propelled load bearing unit. The electrical connector 280 further comprises a plurality of pins grouped in sections 282-285. The electrical connector 280 further comprises a plurality of pins grouped in sections 282-285. Each section being enclosed by a mechanical guide element structure in the form of a protruding wall 292-295, configured to protect the pins and aid in the correct engagement between the first and second plurality of recesses or protrusions (or pins and sockets) and for further mechanically connecting and securing the electrical connector 280 of the self-propelled load bearing unit to the electrical connector of the self-propelled guide unit.

Referring now to FIGS. 5B and 5C. All the mechanical guide element of the self-propelled guide unit and the self-propelled load bearing unit helps to align the two electrical connectors 180, 280 such that the pins and sockets should be inserted properly, such that the transfer of electrical signals between the self-propelled guide unit and the self-propelled load bearing unit should be correct. To test that the communication and signal transfer between the self-propelled guide unit and the self-propelled load bearing unit works in accordance with the specification, the self-propelled guide unit sends out control signals on all active pins and expects a specific answer as proof of a correct connection of the pins and sockets.

To verify proper engagement of the pins and sockets, a method is used in which test signals are run on pins and socket connections on separated positions in the electrical connectors 180, 280. If a first pin and socket engagement is verified at a first position and a second pin and socket engagement is verified at a second position, the probability is high that the pin and socket engagements placed between the first and second positions are also correct. For this purpose, important communication between the self-propelled guide unit and the self-propelled load bearing unit may be placed at pins placed at relatively large distance from each other, such that it can be verified that such important communication works properly and as such that less important communication placed at pin and socket pairs placed between the pin and socket parts for the important communication also will work properly.

In the embodiments shown in the drawings, a first pair of recesses and protrusions 198a, 298a (pin and socket pairs) are configured to transfer a first type of communication, and a second pair of recesses and protrusions 198b, 298b (pin and socket pairs) are configured to transfer a second type of communication. The first and second pin and socket pairs 198a, 298a, 198b, 298b are spaced-apart such that at least one third pin and socket pairs (e.g. 198c, 298c) for communication is placed between the first and second pin and socket pairs 198a, 298a, 198b, 298b. In the embodiment shown in FIGS. 5B and 5C, the first and second pin and socket pairs 198a, 298a, 198b, 298b are spaced-apart with a distance d11 exceeding 20% of the width d10 of the first and second electrical connectors 180, 280, more specifically, exceeding 40% of the width d10 of the first and second electrical connector 180, 280, and more specifically exceeding 60% of the width d10 of the first and second electrical connector 180, 280. The width d10 of the electrical connectors 180, 280 being defined as the outer measurement of the recesses and protrusions having the longest distance in between themselves, i.e. the outer measurement between first mechanical connectors 181, 281 and the second mechanical connectors 188, 288.

In the embodiment shown in FIGS. 5B and 5C, the first and second pin and socket pairs 198a, 298a, 198b, 298b are spaced-apart with a distance d11 exceeding 5 cm, more specifically exceeding 10 cm.

As previously mentioned, the self-propelled guide unit is responsible for navigation, and guiding and propulsion of the self-propelled load bearing unit in the logistics system. This also mean that the self-propelled guide unit is responsible for the propulsion (acceleration and deacceleration) as well all safety features of the self-propelled guide unit and the self-propelled load bearing unit, such as contact or impact sensors, non-contact sensors (such as LIDAR and IR) and emergency stop signals. If the safety features are safety features implemented on the self-propelled load bearing unit, signals related to the safety features need to be transferred correctly to the self-propelled guide unit, such that the self-propelled guide unit can correctly control the propulsion of the self-propelled load bearing unit for example by deaccelerating the self-propelled load bearing unit if an obstacle or a human operator comes into the pathway of the self-propelled load bearing unit. For these safety features to function correctly, it is very important that the relevant electrical signals can be correctly transferred between the self-propelled load bearing unit and the self-propelled guide unit. If the first and second electrical connectors 180, 280 are erroneously connected to each other, this may result in an incorrect transfer of electrical signals which may compromise the safety of the system. To ensure that all electrical connections are functioning properly, test signals are transferred on all active electrical connections. Test signals are electrical signals transmitted on a specific pin and requiring a response in the form of a specific electrical signal on that, or on another, pin. In the embodiments shown in the figures, control signals are configured to be transferred between the self-propelled load bearing unit and the self-propelled guide unit on at least a first and second pin and socket (or recesses and protrusion) with a frequency exceeding 1 Hz, preferably exceeding 10 Hz and most preferably exceeding 100 Hz, such that verification of correct connection is performed more than 1 time per second, preferably more than 10 times per second and most preferably more than 100 times per second. The pins and sockets over which correct electrical connection is verified could be configured to transfer navigation data, control signals or electrical power. Navigation data could be data from the navigation sensors, information about the surroundings received by the self-propelled guide unit, information concerning the movement of the drive wheels of the self-propelled load bearing unit obtained from the motors of the self-propelled load bearing unit or obtained from encoders connected to the drive wheels. Navigation information could also be an emergency stop signal generated by an operator pushing an emergency stop button located on the self-propelled load bearing unit.

In the embodiment shown in FIGS. 5B and 5C, the first and second pin and socket pairs 198a, 298a, 198b, 298b are configured to perform the verification using the control signals, and the first and second pin and socket pairs 198a, 298a, 198b, 298b are spaced-apart with a distance d11 exceeding 20% of the width d10 of the first and second electrical connectors 180, 280, more specifically, exceeding 40% of the width d10 of the first and second electrical connector 180, 280, and more specifically exceeding 60% of the width d10 of the first and second electrical connector 180, 280. More specifically, the first and second pin and socket pairs 198a, 298a, 198b, 298b are spaced-apart with a distance d11 exceeding 5 cm, more specifically exceeding 10 cm.

Figure 6:
FIG. 6 shows a partially internal view of the mechanics of a self-propelled guide unit for an intralogistics system in an elevated view.

FIG. 6 shows the self-propelled guide unit 100 according to the embodiment described with reference to FIGS. 1A-2 and 4A-4C in an elevated view from the left, when the front cover has been removed. With the front cover removed, it is shown how the engaging elements 171-174 are fixated to a moving frame 140 which is actuated by the actuator 141, which in the embodiment shown in FIG. 6 is a cylindrical, electrical linear actuator comprising an electrical motor and a threaded member for transforming a rotational force to a linear force. The actuator 141 is configured to pull the moving frame 140 downwards and thus move the engaging members 171-174 downwards which, when the engaging members 171-174 are in engagement with the engaging members of the self-propelled load bearing unit, lifts the self-propelled guide unit 100 from the floor surface. The moving frame 140 is further connected to a threaded override shaft 142, which exists the frame of the self-propelled guide unit 100 on the roof of the self-propelled guide unit 100 and connects to a hexagonal protrusion 143 which may be operated in an emergency mode for rotating the override shaft 142 in case of a loss of power and thereby displace the moving frame 140 up and down to disconnect the self-propelled guide unit 100 from the self-propelled load bearing unit.

FIG. 6 further shows the electrical connector 180 for vertically and electrically connecting the self-propelled guide unit 100 to the self-propelled load bearing unit such that sensor signals and ID-information can be transferred from the self-propelled load bearing unit to the self-propelled guide unit 100 and electrical power and control signals can be transferred from the self-propelled guide unit 100 to the self-propelled load bearing unit. The electrical connector 180 is described in further detail with reference to FIGS. 5A-5C.

The self-propelled guide unit 100 shown in FIG. 6 further comprising a control unit C for controlling the actuation of engaging elements 171-174 and the first electrical connector 180. The control unit is configured to control the actuation of the engaging elements 171-174 such that the engaging elements 171-174 engages the engaging elements of the self-propelled load bearing unit before the first electrical connector 180 engages the second electrical connector (280) on the self-propelled load bearing unit, such that the actuation of the engaging elements 171-174 aligns the first electrical connector 180 and the second electrical connector before the first electrical connector 180 engages the second electrical connector.

Figure 7:
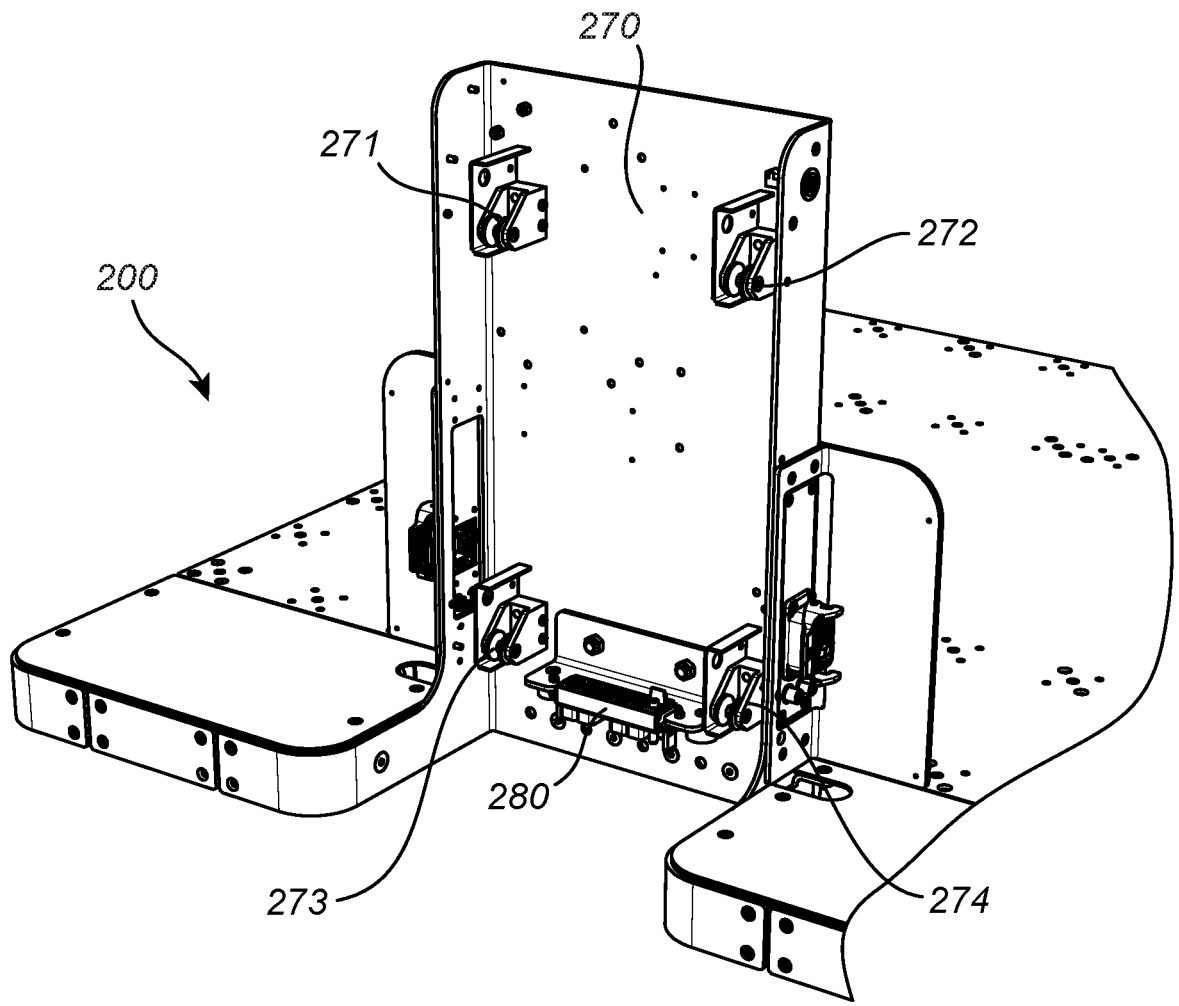
FIG. 7 shows a partially internal view of the mechanics of a self-propelled load bearing unit for an intralogistics system in an elevated view.
Figure 8A:
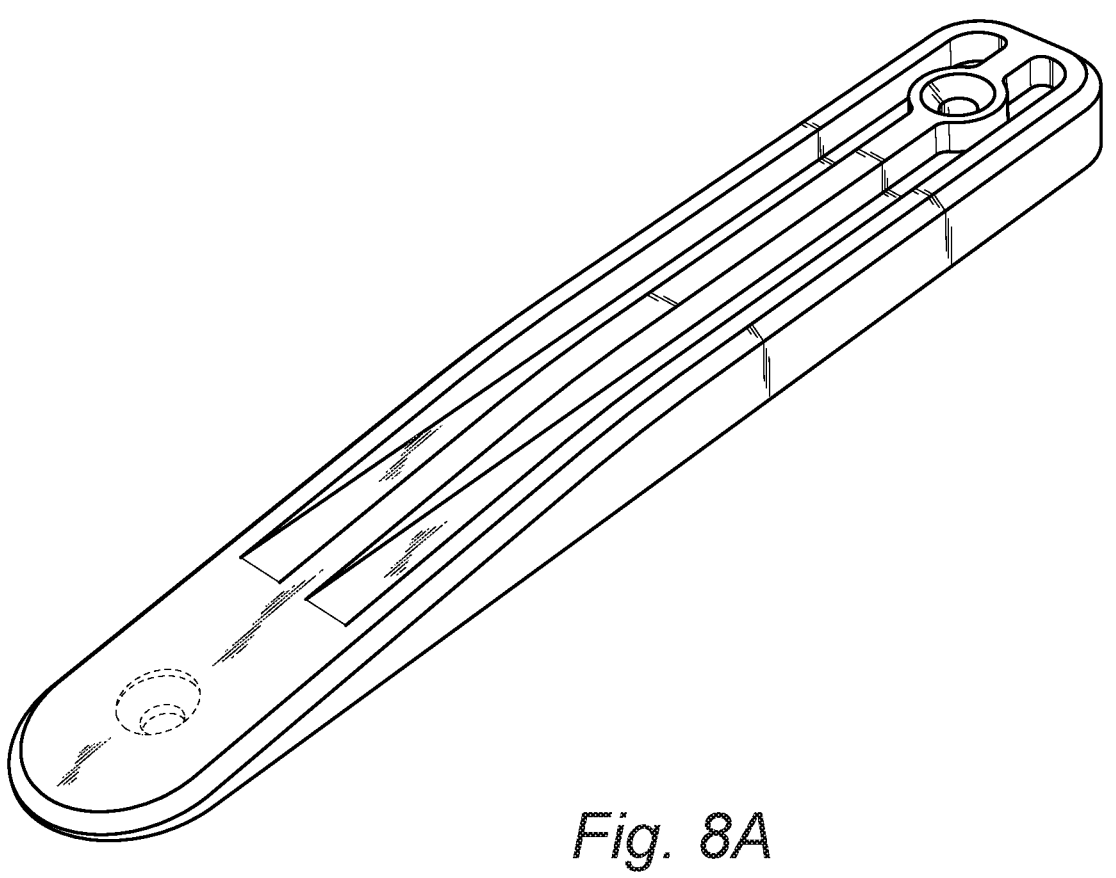
FIG. 8A shows a mechanical guide element of a first embodiment in an elevated perspective view from the right.
Figure 8B:
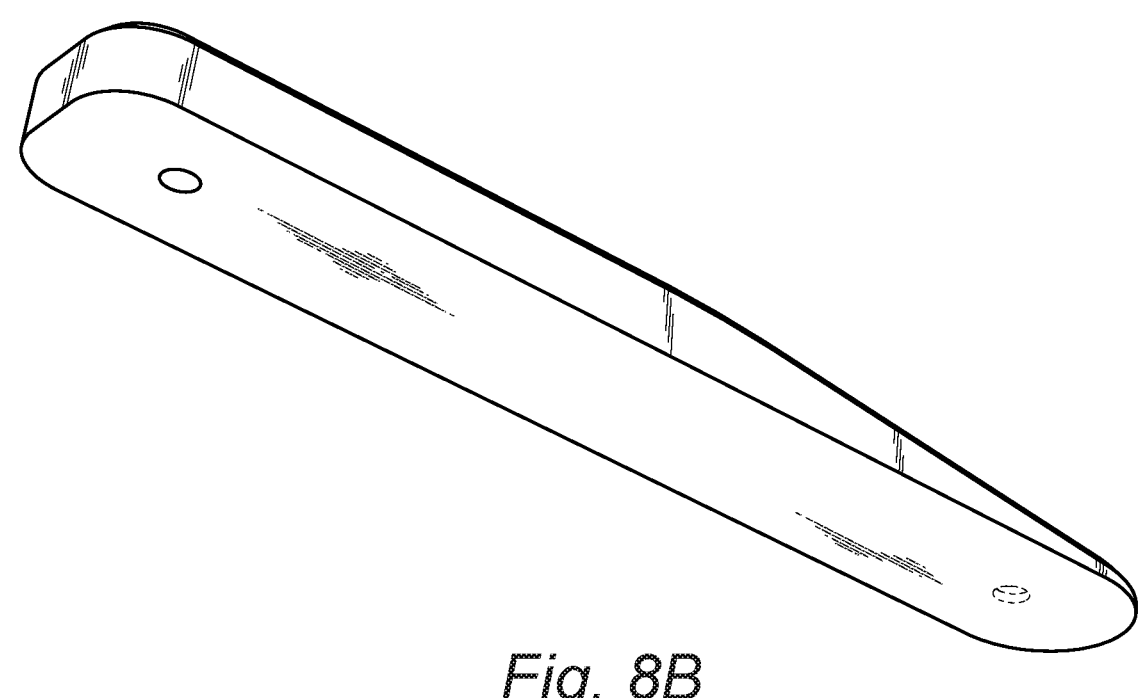
FIG. 8B shows the mechanical guide element of the first embodiment in a lowered perspective view from the left.
Figures 8C, 8D, 8G, 8H:
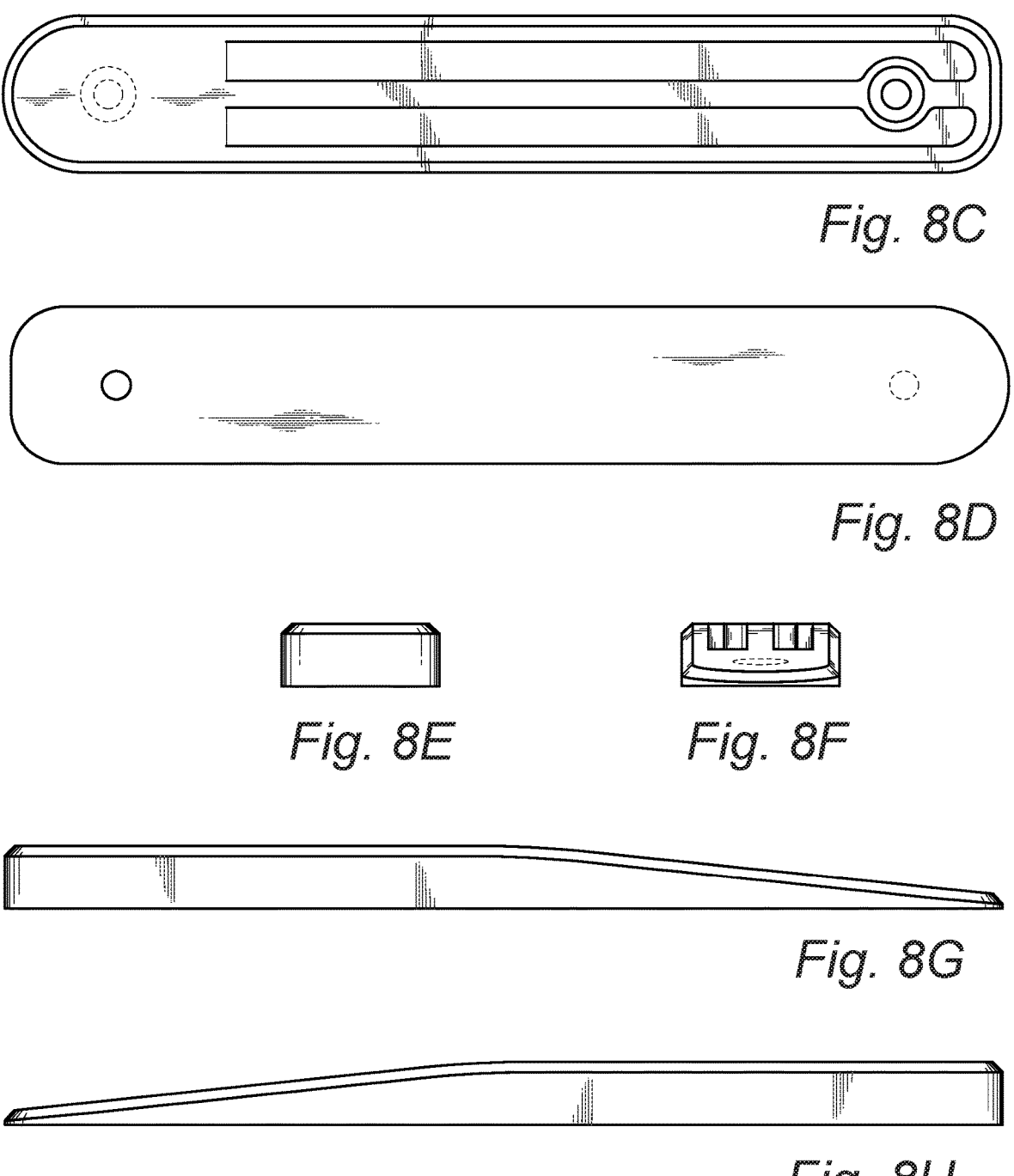
FIG. 8C shows the mechanical guide element of the first embodiment in a plain top view.
FIG. 8D shows the mechanical guide element of the first embodiment in a plain bottom view.
FIG. 8G shows the mechanical guide element of the first embodiment in a plain side view from the left.
FIG. 8H shows the mechanical guide element of the first embodiment in a plain side view from the right.
Figures 9A, 9B, 9C, 9D, 9E, 9F, 9G:
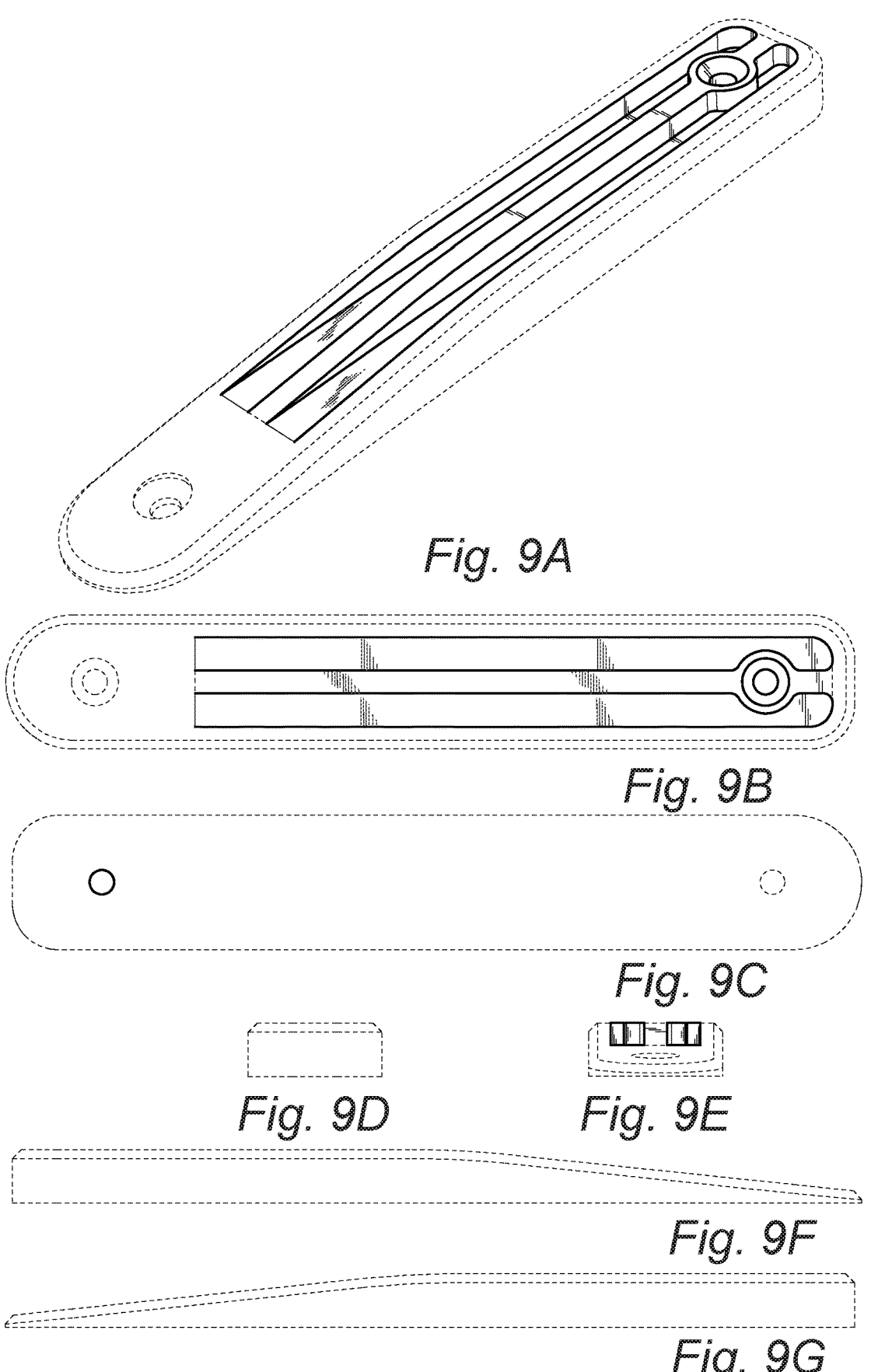
FIG. 9A shows a mechanical guide element of a second embodiment in an elevated perspective view from the right.
FIG. 9B shows the mechanical guide element of the second embodiment in a plain top view.
FIG. 9C shows the mechanical guide element of the second embodiment in a plain bottom view.
FIG. 9D shows the mechanical guide element of the second embodiment in a plain back view.
FIG. 9E shows the mechanical guide element of the second embodiment in a plain front view.
FIG. 9F shows the mechanical guide element of the second embodiment in a plain side view from the left.
FIG. 9G shows the mechanical guide element of the second embodiment in a plain side view from the right.
Figure 10A:
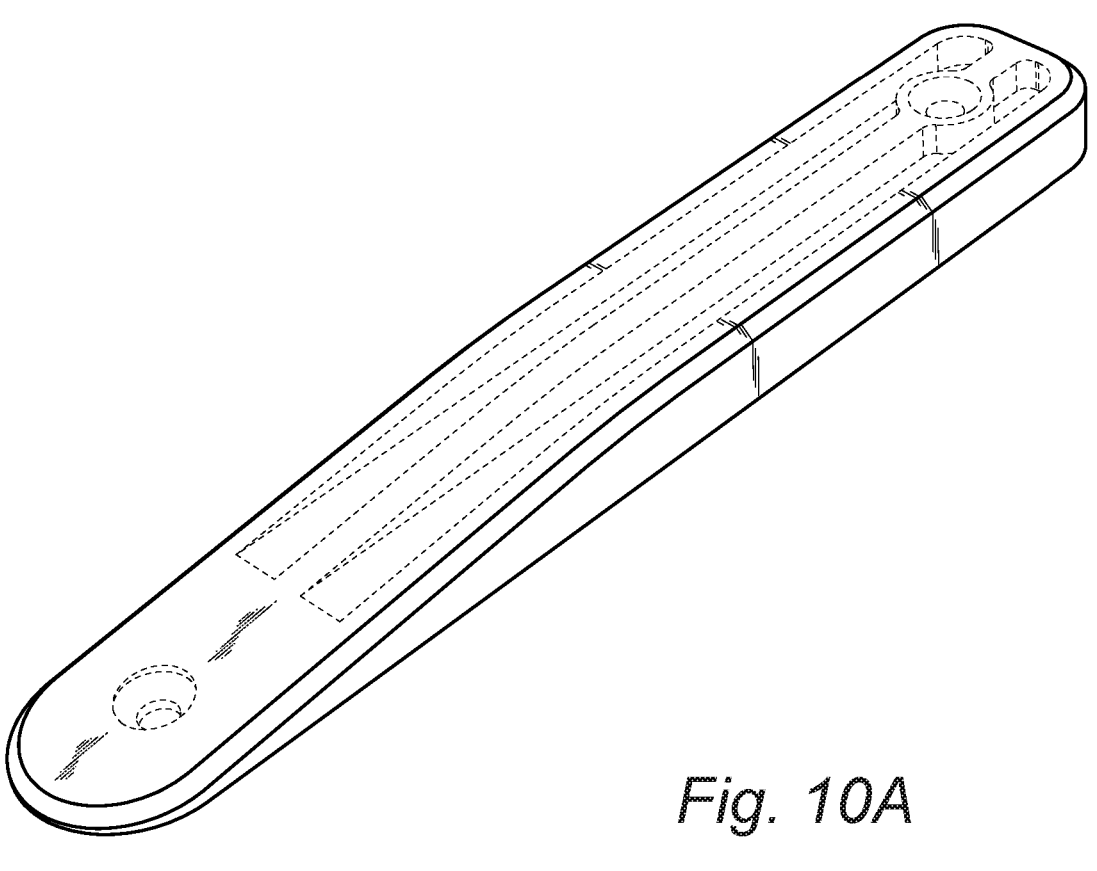
FIG. 10A shows a mechanical guide element of a third embodiment in an elevated perspective view from the right.
Figure 10B:
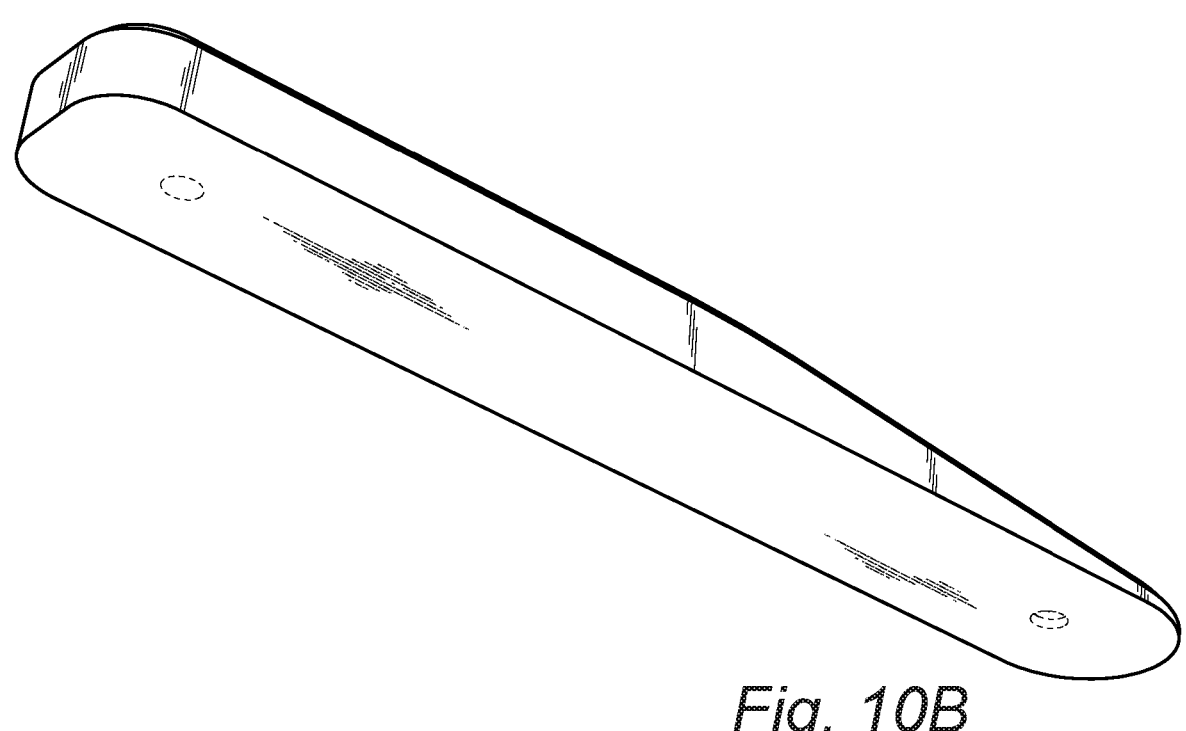
FIG. 10B shows the mechanical guide element of the third embodiment in a lowered perspective view from the left.
Figures 10C, 10D, 10G, 10H:
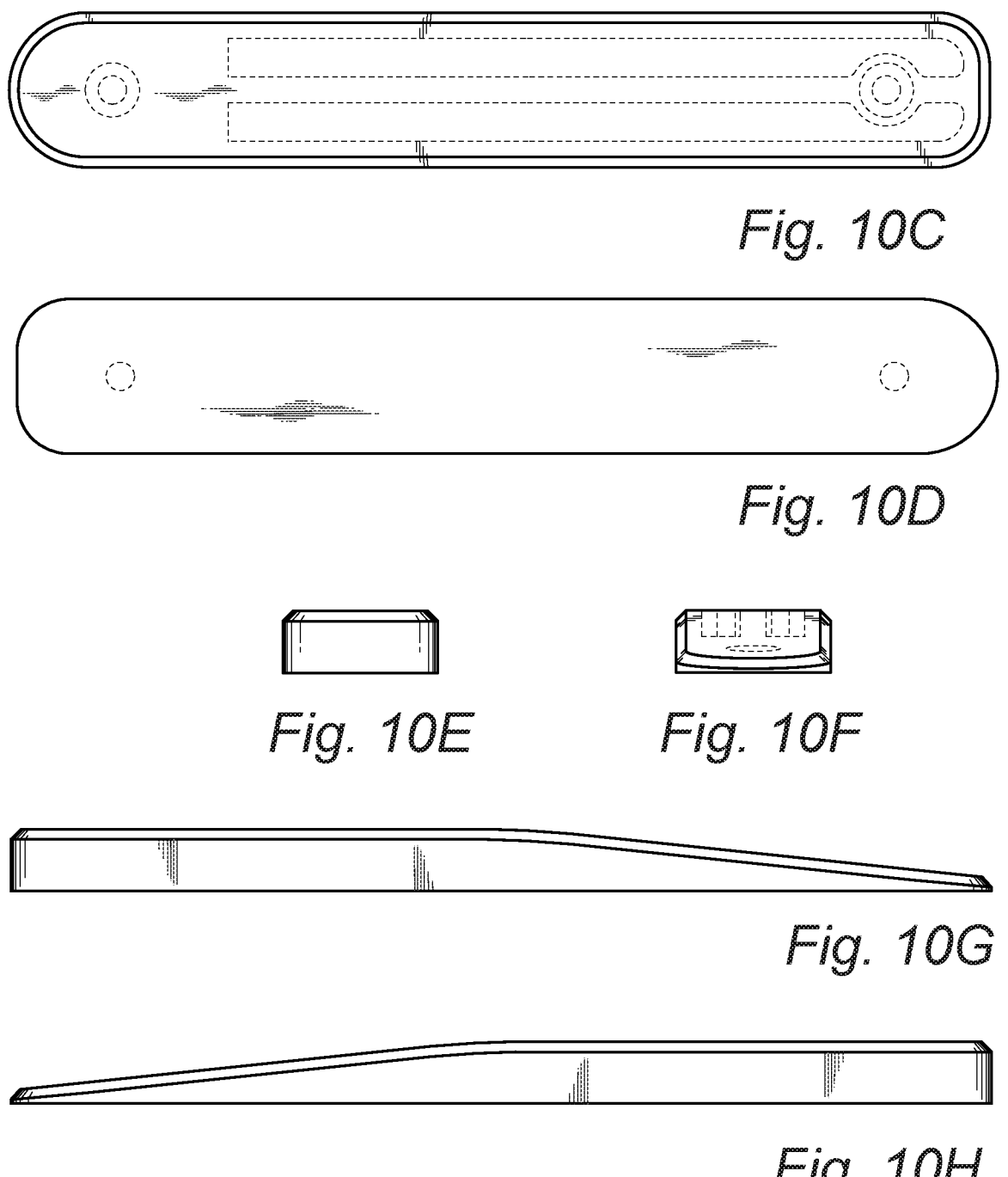
FIG. 10C shows the mechanical guide element of the third embodiment in a plain top view.
FIG. 10D shows the mechanical guide element of the third embodiment in a plain bottom view.
FIG. 10G shows the mechanical guide element of the third embodiment in a plain side view from the left.
FIG. 10H shows the mechanical guide element of the third embodiment in a plain side view from the right.
Figure 11A:
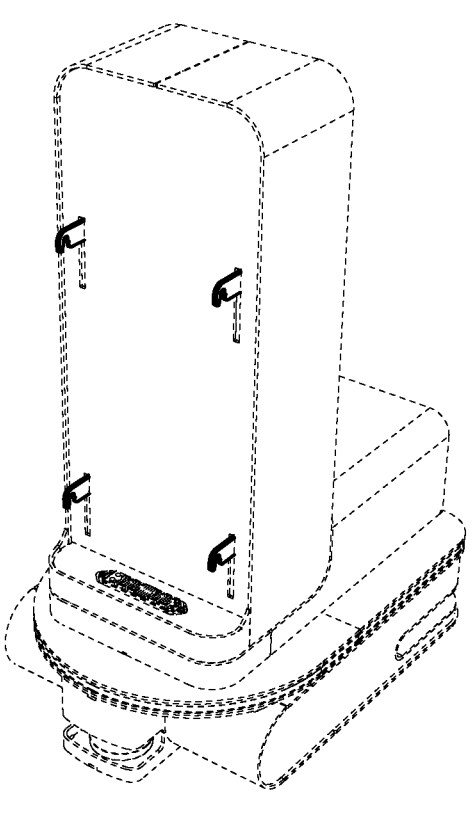
FIG. 11A shows a connection system of a self-propelled guide unit of a first embodiment in an elevated perspective view from the right.
Figure 11B:
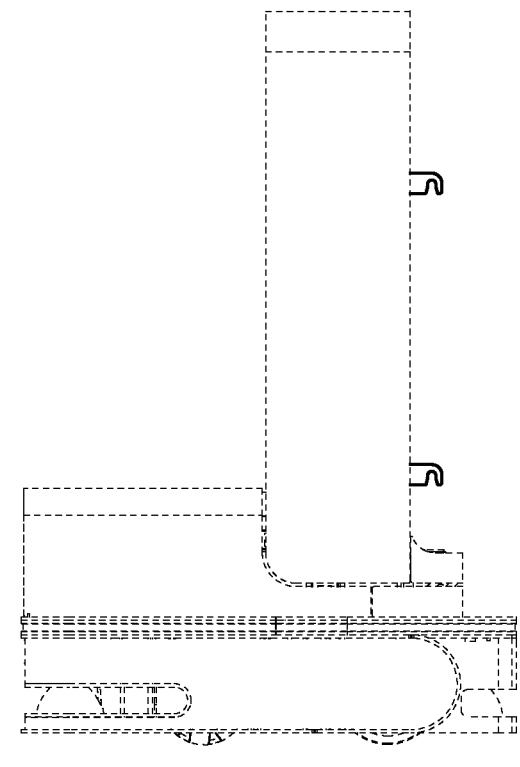
FIG. 11B shows the connection system of a self-propelled guide unit of the first embodiment in a plain side view from the left.
Figure 11C:
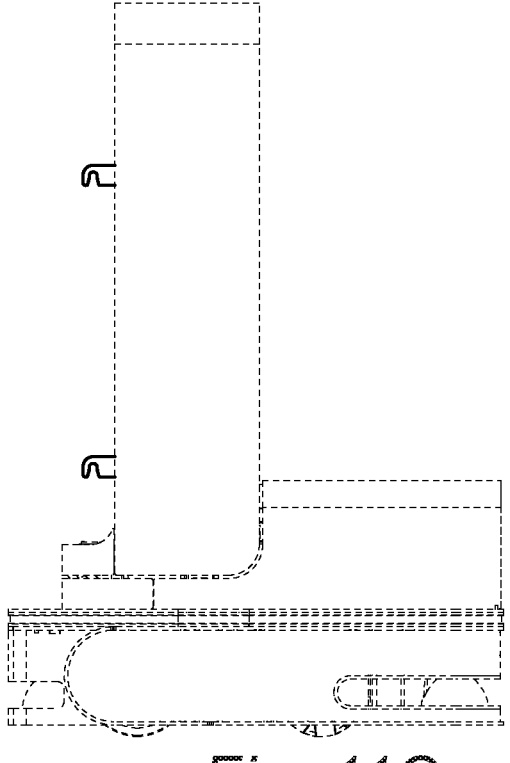
FIG. 11C shows the connection system of a self-propelled guide unit of the first embodiment in a plain side view from the right.
Figure 11D:
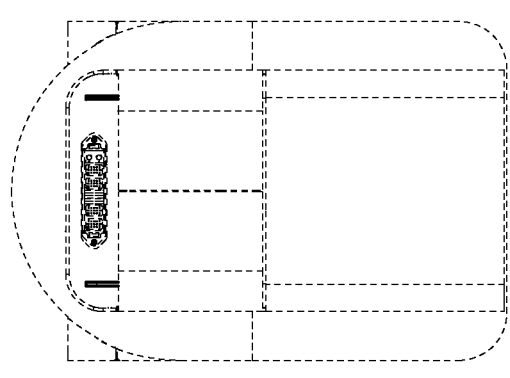
FIG. 11D shows the connection system of a self-propelled guide unit of the first embodiment in plain top view.
Figure 11E:
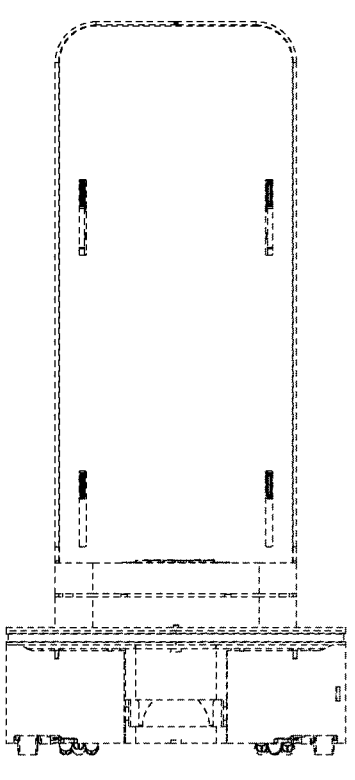
FIG. 11E shows the connection system of a self-propelled guide unit of the first embodiment in plain front view
Figure 11F:
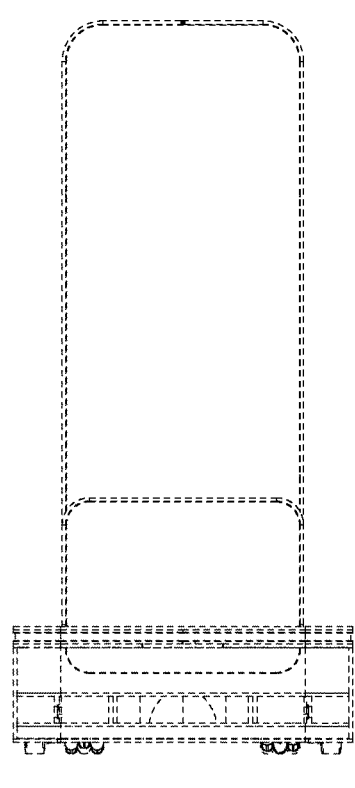
FIG. 11F shows the connection system of a self-propelled guide unit of the first embodiment in a plain back view.
Figure 12A:
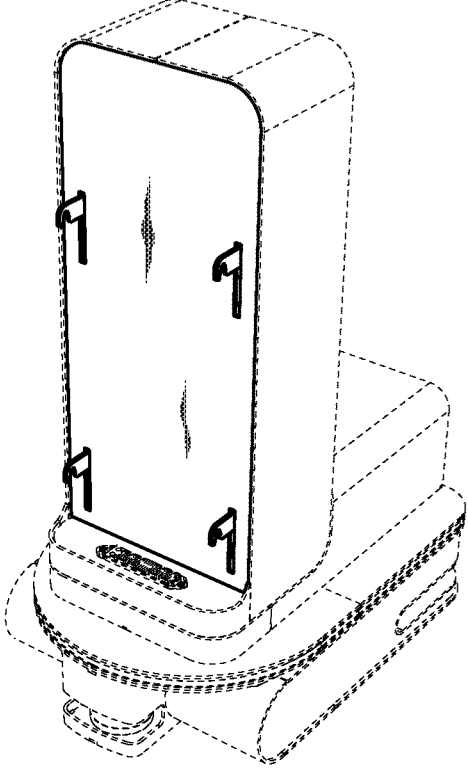
FIG. 12A shows a connection system of a self-propelled guide unit of a second embodiment in an elevated perspective view from the right.
Figure 12B:
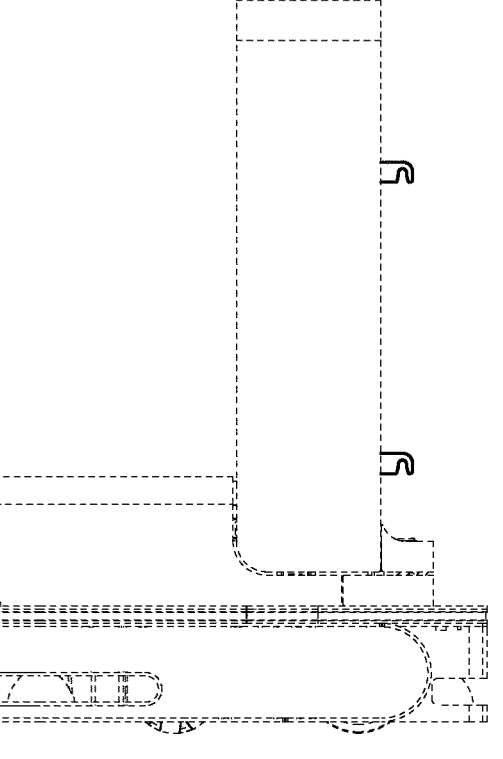
FIG. 12B shows the connection system of a self-propelled guide unit of the second embodiment in a plain side view from the left.
Figure 13A:
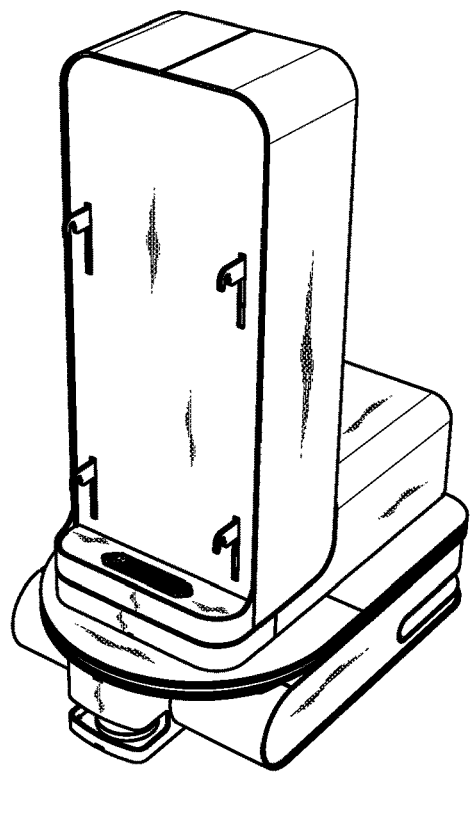
FIG. 13A shows a self-propelled guide unit of a first embodiment in an elevated perspective view from the right.
Figure 13B:
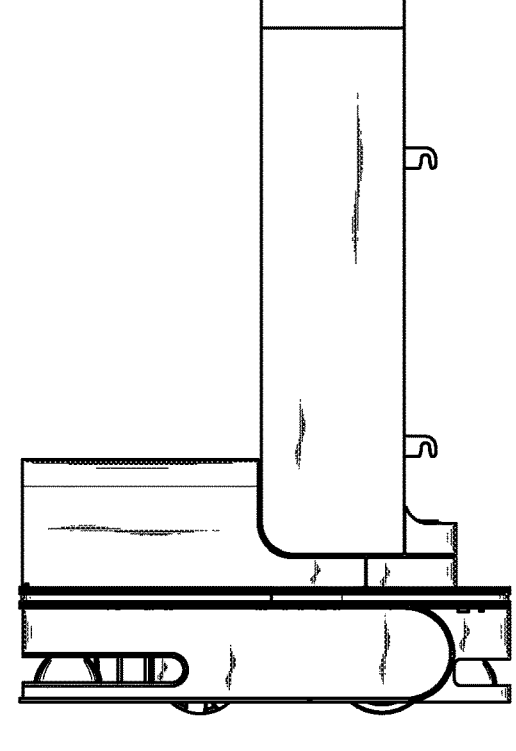
FIG. 13B shows the self-propelled guide unit of the first embodiment in a plain side view from the left.
Figure 13C:
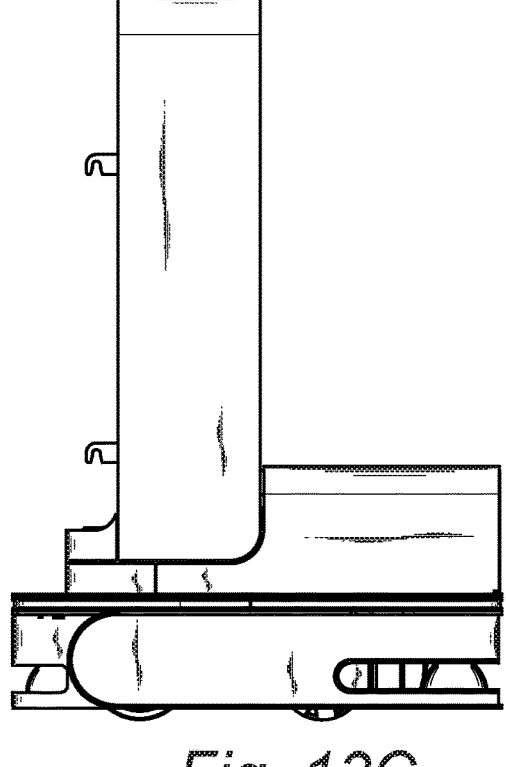
FIG. 13C shows the self-propelled guide unit of the first embodiment in a plain side view from the right.
Figure 13D:
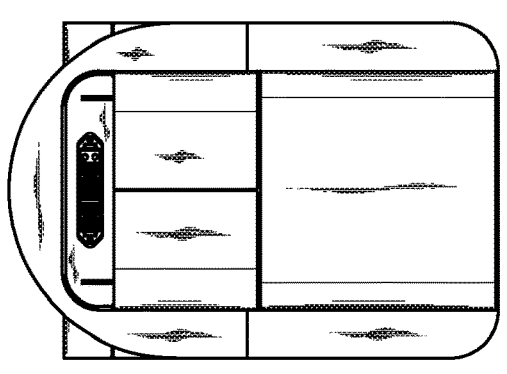
FIG. 13D shows the self-propelled guide unit of the first embodiment in plain top view.
Figure 13E:
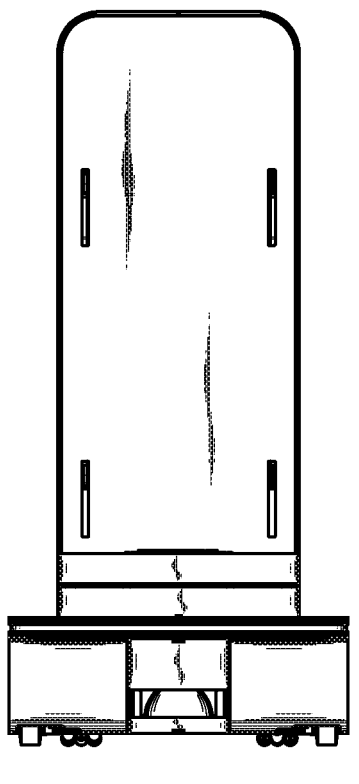
FIG. 13E shows the self-propelled guide unit of the first embodiment in plain front view
Figure 13F:
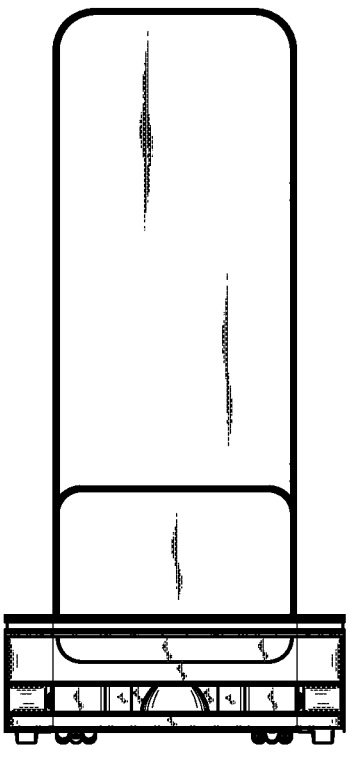
FIG. 13F shows the self-propelled guide unit of the first embodiment in a plain back view.
Figure 14A:
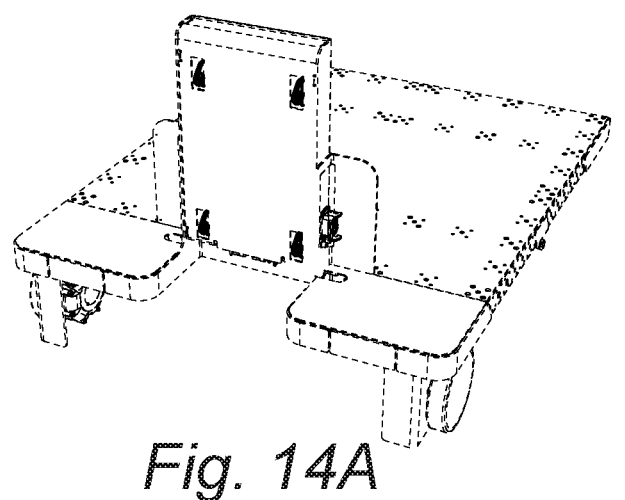
FIG. 14A shows a connection system of a self-propelled load bearing unit of a first embodiment in an elevated perspective view from the right.
Figure 15A:
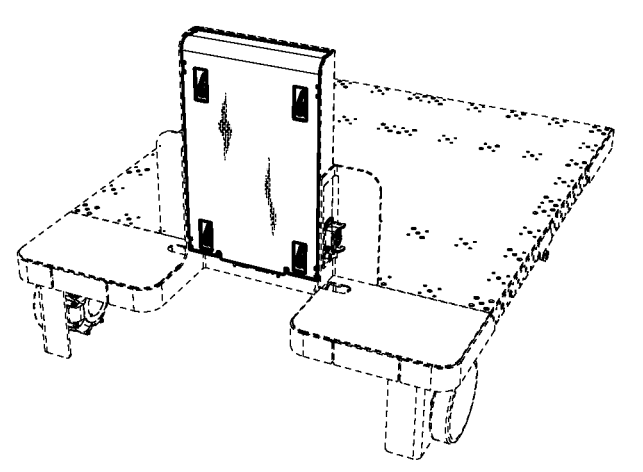
FIG. 15A shows a connection system of a self-propelled load bearing unit of a second embodiment in an elevated perspective view from the right.
Figure 15B:
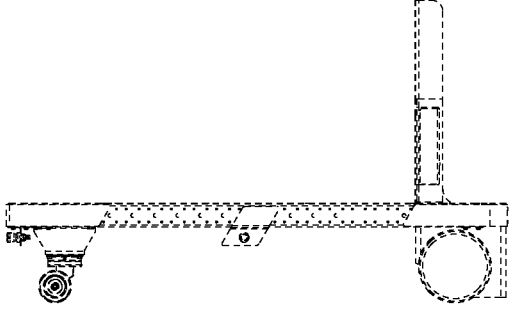
FIG. 15B shows the connection system of a self-propelled load bearing unit of the second embodiment in a plain side view from the left.
Figure 15C:
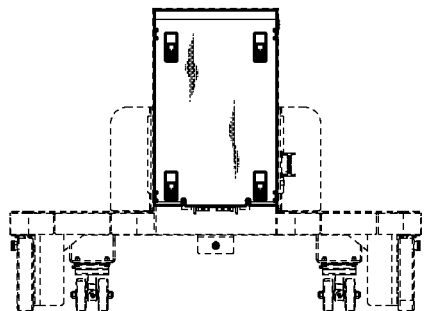
FIG. 15C shows the connection system of a self-propelled load bearing unit of the second embodiment in plain front view.
Figure 15D:
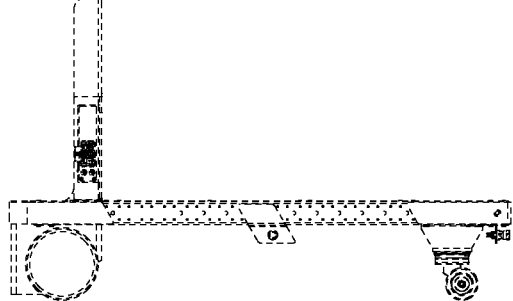
FIG. 15D shows the connection system of a self-propelled load bearing unit of the second embodiment in a plain side view from the right.
Figure 17E:
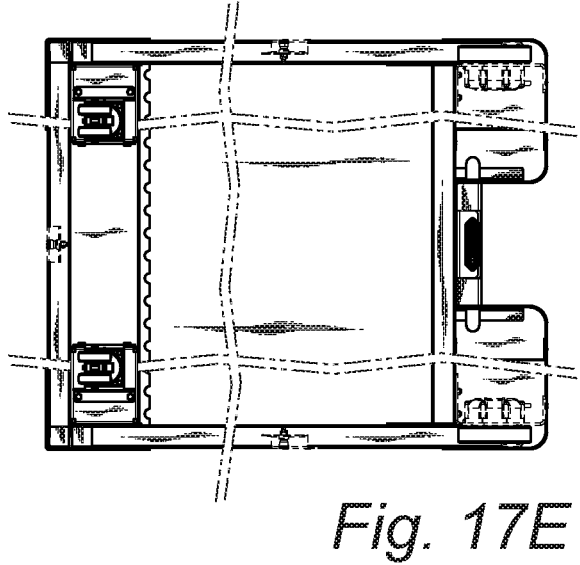
FIG. 17E shows the self-propelled load bearing unit of the first embodiment in plain bottom view.
Figure 17F:
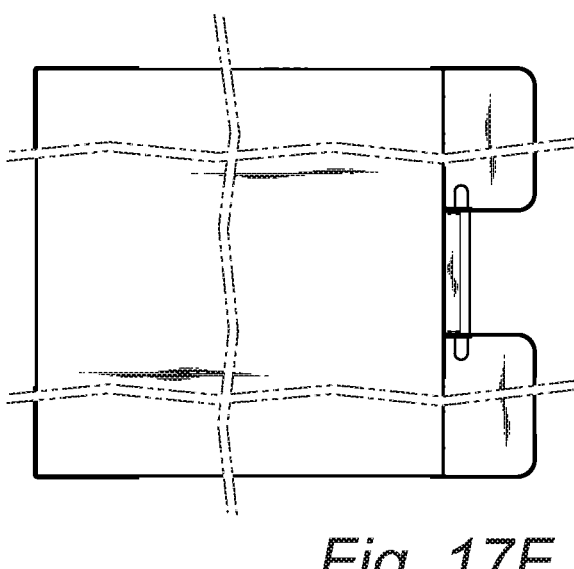
FIG. 17F shows the self-propelled load bearing unit of the first embodiment in plain top view.

FIG. 7 shows the self-propelled load bearing unit 200 according to the embodiment described with reference to FIGS. 1A-1B, 3 and 4A-4C in an elevated view from the right, when the rear cover has been removed. With the rear cover removed, it is shown how the engaging elements 171-174 of the self-propelled load bearing unit 200 are fixated to a frame portion 240 such that the weight from the self-propelled guide unit is transferred from the engagement elements 271-274 to the self-propelled load bearing unit 200 when the self-propelled guide unit hangs on the self-propelled load bearing unit 200.

FIG. 7 further shows the electrical connector 280 for vertically and electrically connecting the self-propelled guide unit to the self-propelled load bearing unit 200 such that sensor signals and ID-information can be transferred from the self-propelled load bearing unit 200 to the self-propelled guide unit and electrical power and control signals can be transferred from the self-propelled guide unit to the self-propelled load bearing unit 200. The electrical connector 280 is described in further detail with reference to FIGS. 5A-5C.

Variations to the disclosed embodiments can be understood and effected by the skilled person in practicing the claimed invention, from a study of the drawings, the disclosure, and the appended claims.

Please note that any aspect or part of an aspect as well as any method or part of method or any unit, feature or system could be combined in any applicable way if not clearly contradictory.

NUMBERED EMBODIMENTS

In the following, exemplifying numbered embodiments are provided. The numbered embodiments are not to be seen as limiting the scope of the invention, which is defined by the appended embodiments. The reference numerals in the different numbered embodiments are to be seen only as examples of elements in the appended drawings which correspond to elements described in the numbered embodiments.

Embodiment Set 1—Moving the Engagement Members Downwards for Lifting Navigator

1. A self-propelled guide unit configured to connect to and guide a self-propelled load bearing unit, such that the self-propelled load bearing unit can travel on a floor surface when the self-propelled guide unit and the self-propelled load bearing unit are connected, the self-propelled guide unit being configured to:
receive at least one parameter from the self-propelled load bearing unit,
use the at least one parameter in the generation of a control signal, and
transmit the generated control signal to the self-propelled load bearing unit for controlling the propulsion of the self-propelled load bearing unit, the self-propelled guide unit comprises:
at least one engaging element configured to engage at least one corresponding engaging element on the self-propelled load bearing unit, and
an actuator configured to lift the self-propelled guide unit from the floor surface by actuating the at least one engaging element, characterized in that the actuator is configured to move the at least one engaging element in a direction towards the floor surface, such that:
the at least one engaging element engages the at least one engaging element on the self-propelled load bearing unit, and

the at least one engaging element carries a major portion of the weight of the self-propelled guide unit, when the self-propelled guide unit is lifted from the floor surface.

2. The self-propelled guide unit according to embodiment 1, wherein the at least one engaging element on the self-propelled guide unit comprises a recess or protrusion configured to engage a corresponding recess or protrusion on the self-propelled load bearing unit.

3. The self-propelled guide unit according to embodiment 2, wherein the at least one engaging element on the self-propelled guide unit comprises a protrusion configured to engage a corresponding recess on the self-propelled load bearing unit.

4. The self-propelled guide unit according to any one of embodiments 1-3, wherein the at least one engaging element on the self-propelled guide unit is configured to stabilize the self-propelled guide unit in at least a first and second direction, wherein the first and second directions are:

perpendicular to the direction towards the floor surface, and opposite to each other.

5. The self-propelled guide unit according to any one of the preceding embodiments, wherein the self-propelled guide unit comprises at least two engaging elements being spaced apart.

6. The self-propelled guide unit according to embodiment 5, wherein a floor contacting plane is defined by wheel portions of the self-propelled guide unit configured to engage the floor surface when the self-propelled guide unit travels on the floor surface, and wherein the at least two engaging elements are horizontally spaced apart in a direction parallel to the floor contacting plane.

7. The self-propelled guide unit according to embodiment 6, wherein the at least two engaging elements are horizontally aligned on a common axis parallel to the floor contacting plane.

8. The self-propelled guide unit according to any one of embodiment 5-7, wherein the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the self-propelled guide unit has a maximum width at the widest portion of the self-propelled guide unit, in a horizontal direction perpendicular to the engagement axis, and wherein, the at least two engaging elements are spaced apart with a distance exceeding 20% of the maximum width.

9. The self-propelled guide unit according to claim 8, wherein the at least two engaging elements are spaced apart with a distance exceeding 40% of the maximum width.

10. The self-propelled guide unit according to any one of embodiment 5-9, wherein the self-propelled guide unit comprises at least two wheels, and wherein a maximum wheel-base distance is the largest distance between the distal portions of two wheels of the self-propelled guide unit, and wherein, the at least two engaging elements are spaced apart with a distance exceeding 20% of the maximum wheel-base distance.

11. The self-propelled guide unit according to claim 10, wherein the at least two engaging elements are spaced apart with a distance exceeding 40% of the maximum wheel-base distance.

12. The self-propelled guide unit according to embodiment 5, wherein a floor contacting plane is defined by wheel portions of the self-propelled guide unit configured to engage the floor surface when the self-propelled guide unit travels on the floor surface, and wherein the at least two engaging elements are vertically spaced apart in a direction perpendicular to the floor contacting plane.

13. The self-propelled guide unit according to embodiment 12, wherein the at least two engaging elements are vertically aligned on a common axis parallel to the floor contacting plane.

14. The self-propelled guide unit according to any one of embodiment 12-13, wherein the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the self-propelled guide unit has a maximum height at the tallest portion of the self-propelled guide unit, in a vertical direction perpendicular to the engagement axis, and wherein the at least two engaging elements are vertically spaced apart with a distance exceeding 20% of the maximum height.

15. The self-propelled guide unit according to any one of embodiment 12-14, wherein the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the self-propelled guide unit has an average height relative to the footprint of the self-propelled guide unit, in a vertical direction perpendicular to the engagement axis, and wherein the at least two engaging elements are vertically spaced apart with a distance exceeding 10% of the average height.

16. The self-propelled guide unit according to any one of the preceding embodiments, wherein the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, wherein the at least one engaging element on the self-propelled guide unit is configured to stabilize the self-propelled guide unit in at least a first and second direction, wherein the first and second directions are:

parallel to the engagement axis, and opposite to each other.

17. The self-propelled guide unit according to any one of embodiment 4-12, wherein the self-propelled guide unit comprises at least four engaging elements, and wherein at least two of the four engaging elements are vertically spaced apart and at least two of the four engaging elements are horizontally spaced apart.

18. The self-propelled guide unit according to any one of the preceding embodiments, wherein the at least one engaging element is positioned vertically above the center of gravity of the self-propelled guide unit, when the self-propelled guide unit travels on the floor surface.

19. The self-propelled guide unit according to any one of the preceding embodiments, wherein the at least one engaging element has an average vertical distance from the floor contacting plane, and wherein the actuator withholds force from a position having a longer vertical distance from the floor contacting plane than the average vertical distance.

20. The self-propelled guide unit according to any one of the preceding embodiments, further comprising a first electrical connector configured to connect to a second electrical connector comprised by the self-propelled load bearing unit, wherein the first electrical connector is configured to be moved by the actuator.

21. The self-propelled guide unit according to embodiment 20, wherein the first electrical connector is configured to be moved to connect to the second electrical connector by the actuator after the actuator has moved the at least one engaging element.

22. The self-propelled guide unit according to any one of embodiment 20 and 21, wherein the first electrical connector is configured to be moved, relative to the second electrical connector, by the actuator in a direction opposite to the direction towards the floor surface.

23. A connection system for connecting a self-propelled guide unit to a self-propelled load bearing unit, wherein the self-propelled guide unit is configured to connect to and guide the self-propelled load bearing unit, such that the self-propelled load bearing unit can travel on a floor surface when the self-propelled guide unit and the self-propelled load bearing unit are connected; the connection system comprises:
   at least one engaging element, on the self-propelled load bearing unit,
   at least one engaging element, on the self-propelled guide unit,
   at least one actuator configured to actuate the at least one engaging element on the self-propelled guide unit, wherein:
   the at least one engaging element of the self-propelled guide unit is configured to engage the at least one engaging element of the self-propelled load bearing unit when the actuator actuates the at least one engaging element of self-propelled guide unit in a direction towards the floor surface, and wherein
   the at least one engaging element on the self-propelled load bearing unit carries a major portion of the weight of the self-propelled guide unit, when the self-propelled guide unit is lifted from the floor surface.

24. The connection system according the embodiment 23, wherein the at least one engaging element on the self-propelled load bearing unit comprises a recess or protrusion configured to engage a corresponding recess or protrusion on the self-propelled guide unit.

25. The connection system according to embodiment 24, wherein the recess or protrusion on the self-propelled guide unit is a protrusion and the recess or protrusion on the self-propelled load bearing unit is a recess.

26. The connection system according to embodiment 23, wherein the at least one engaging element on the self-propelled load bearing unit comprises a set of recesses or protrusions configured to engage a corresponding set of recesses or protrusions comprised by the self-propelled guide unit.

27. The connection system according to any one of embodiment 23-26, wherein the self-propelled load bearing unit further comprises a second electrical connector configured to connect to a first electrical connector comprised by the self-propelled guide unit for electrically connecting the self-propelled guide unit to the self-propelled load bearing unit.

28. The connection system according to embodiment 27, wherein the first electrical connector and second electrical connector are configured to engage in connection by movement of the least one engaging element of the self-propelled guide unit in a direction towards the floor surface.

29. The connection system according to embodiment 27 or 28, wherein the first electrical connector and second electrical connector are configured to be connected in a substantially vertical direction.

30. The connection system according to any one of embodiment 23-29, further comprising a receiving portion on the self-propelled load bearing unit, the receiving portion being configured to receive at least a portion of the self-propelled guide unit, such that the receiving portion encloses three sides of at least the portion of the self-propelled guide unit.

31. The connection system according to embodiment 30, wherein the receiving portion is configured to receive at least the portion of the self-propelled guide unit along a receival axis, and wherein the receiving portion is configured to receive at least $\frac{1}{5}$ of the length of the self-propelled guide unit in the direction of the receival axis.

32. The connection system according to embodiment 30 or 31, wherein the receiving portion comprises an entry portion, and wherein the entry portion comprises at least one rounded or chamfered surface acting as a guide for the self-propelled guide unit to enter the receiving portion.

33. The connection system according to any one of embodiment 30 to 32, further comprising a mechanical guide element configured to guide the self-propelled guide unit to enter the receiving portion.

34. The connection system according to embodiment 33, wherein the mechanical guide element is at least two mechanical guide elements configured to engage two opposite sides of the self-propelled guide unit with two opposite sides of the receiving portion for guiding the self-propelled guide unit to enter the receiving portion.

35. The connection system according to embodiment 34, where the at least two mechanical guide elements are comprised by the self-propelled guide unit.

36. The connection system according to embodiment 26, wherein the set of recesses or protrusions comprised by the self-propelled load bearing unit is spaced apart with a distance exceeding 40% of the maximum width of the self-propelled load bearing unit.

37. The connection system according to embodiment 26 or 36, wherein the set of recesses or protrusions comprised by the self-propelled guide unit is spaced apart with a distance exceeding 40% of the maximum width of the self-propelled guide unit.

38. The connection system according to any one of embodiment 27 to 37, wherein the first electrical connector is configured to be moved, relative to the second electrical connector, by the actuator in a direction opposite to the direction towards the floor surface.

US 12,668,466 B2

39

39. A system for intralogistics comprising a self-propelled guide unit according to any one of embodiment 1-22, and at least one self-propelled load bearing unit.

Embodiment Set 2—Spaced Apart Engagement Members—Above Center of Gravity

1. A self-propelled guide unit configured to connect to and guide a self-propelled load bearing unit, such that the self-propelled load bearing unit can travel on a floor surface when the self-propelled guide unit and the self-propelled load bearing unit are connected, the self-propelled guide unit being configured to:
receive at least one parameter from the self-propelled load bearing unit,
use the at least one parameter in the generation of a control signal, and
transmit the generated control signal to the self-propelled load bearing unit for controlling the propulsion of the self-propelled load bearing unit, the self-propelled guide unit comprises:
at least two engaging elements configured to engage at least two corresponding engaging elements on the self-propelled load bearing unit, and
at least one actuator configured to lift the self-propelled guide unit from the floor surface by actuating the at least two engaging elements, characterized in that:
at least one of the at least two engaging elements is positioned vertically above the center of gravity of the self-propelled guide unit, when the self-propelled guide unit travels on the floor surface, and
the at least two engaging elements are spaced apart, and wherein the at least one actuator is configured to move the at least two engaging elements, such that:
the at least two engaging elements engages the at least two engaging elements on the self-propelled load bearing unit, and
the at least two engaging elements carries a major portion of the weight of the self-propelled guide unit, when the self-propelled guide unit is lifted from the floor surface.
2. The self-propelled guide unit according to embodiment 1, wherein the at least two engaging elements on the self-propelled guide unit each comprises a recess or protrusion configured to engage a corresponding recess or protrusion on the self-propelled load bearing unit.
3. The self-propelled guide unit according to embodiment 2, wherein the at least one engaging element on the self-propelled guide unit comprises a protrusion configured to engage a corresponding recess on the self-propelled load bearing unit.
4. The self-propelled guide unit according to any one of embodiment 1-3, wherein the at least two engaging elements on the self-propelled guide unit are configured to stabilize the self-propelled guide unit in at least a first and second direction, wherein the first and second directions are:
perpendicular to the direction towards the floor surface, and
opposite to each other.
5. The self-propelled guide unit according to any one of the preceding embodiments, wherein the at least two engaging elements are horizontally spaced apart.
6. The self-propelled guide unit according to any one of the preceding embodiments, wherein a floor contacting plane is defined by wheel portions of the self-propelled guide unit configured to engage the floor surface when the self-propelled guide unit travels on the floor surface, and wherein the at least two engaging elements are horizontally spaced apart in a direction parallel to the floor contacting plane.
7. The self-propelled guide unit according to any one of the preceding embodiments, wherein the at least two engaging elements are horizontally aligned on a common axis parallel to the floor contacting plane.
8. The self-propelled guide unit according to any one of the preceding embodiments, wherein the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the self-propelled guide unit has a maximum width at the widest portion of the self-propelled guide unit, in a horizontal direction perpendicular to the engagement axis, and wherein, the at least two engaging elements are spaced apart with a distance exceeding 20% of the maximum width.
9. The self-propelled guide unit according to claim 8, wherein the at least two engaging elements are spaced apart with a distance exceeding 40% of the maximum width.
10. The self-propelled guide unit according to any one of the preceding embodiments, wherein the self-propelled guide unit comprises at least two wheels, and wherein a maximum wheel-base distance is the largest distance between the distal portions of two wheels of the self-propelled guide unit, and wherein, the at least two engaging elements are spaced apart with a distance exceeding 20% of the maximum wheel-base distance.
11. The self-propelled guide unit according to claim 10, wherein the at least two engaging elements are spaced apart with a distance exceeding 40% of the maximum wheel-base distance.
12. The self-propelled guide unit according to any one of embodiments 1-6 and 8-11, wherein a floor contacting plane is defined by wheel portions of the self-propelled guide unit configured to engage the floor surface when the self-propelled guide unit travels on the floor surface, and wherein the at least two engaging elements are vertically spaced apart in a direction perpendicular to the floor contacting plane.
13. The self-propelled guide unit according to embodiment 12, wherein the at least two engaging elements are vertically aligned on a common axis perpendicular to the floor contacting plane.
14. The self-propelled guide unit according to any one of embodiment 12-13, wherein the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the self-propelled guide unit has a maximum height at the tallest portion of the self-propelled guide unit, in a vertical direction perpendicular to the engagement axis, and wherein the at least two engaging elements are vertically spaced apart with a distance exceeding 20% of the maximum height.

15. The self-propelled guide unit according to any one of embodiment 12-14, wherein the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the self-propelled guide unit has an average height relative to the footprint of the self-propelled guide unit, in a vertical direction perpendicular to the engagement axis, and wherein the at least two engaging elements are vertically spaced apart with a distance exceeding 10% of the average height.

16. The self-propelled guide unit according to any one of the preceding embodiments, wherein the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, wherein the at least one engaging element on the self-propelled guide unit is configured to stabilize the self-propelled guide unit in at least a first and second direction, wherein the first and second directions are:
parallel to the engagement axis, and
opposite to each other.

17. The self-propelled guide unit according to any one of the preceding embodiments, wherein the self-propelled guide unit comprises at least four engaging elements, and wherein at least two of the four engaging elements are vertically spaced apart and at least two of the four engaging elements are horizontally spaced apart.

18. The self-propelled guide unit according to any one of embodiment 6-17, wherein the at least two engaging elements has an average vertical distance from the floor contacting plane, and wherein the actuator withholds force from a position having a longer vertical distance from the floor contacting plane than the average vertical distance.

19. The self-propelled guide unit according to embodiment 18, wherein the at least four engaging elements have an average vertical distance from the floor contacting plane, and wherein the actuator withholds force from a position having a longer vertical distance from the floor contacting plane than the average vertical distance.

20. The self-propelled guide unit according to any one of the preceding embodiments, wherein the at least two engaging elements are positioned vertically above the center of gravity of the self-propelled guide unit, when the self-propelled guide unit travels on the floor surface.

21. The self-propelled guide unit according to any one of the preceding embodiments, further comprising a first electrical connector configured to connect to a second electrical connector comprised by the self-propelled load bearing unit, wherein the first electrical connector is configured to be moved by the actuator.

22. The self-propelled guide unit according to embodiment 21, wherein the first electrical connector is configured to be moved to connect to the second electrical connector by the actuator after the actuator has moved the at least one engaging element.

23. The self-propelled guide unit according to any one of embodiment 21 and 21, wherein the first electrical connector is configured to be moved, relative to the second electrical connector, by the actuator in a direction opposite to the direction towards the floor surface.

24. A self-propelled load bearing unit configured to connect to and be guided by a self-propelled guide unit, such that the self-propelled load bearing unit can travel on a floor surface when the self-propelled guide unit and the self-propelled load bearing unit are connected, the self-propelled load bearing unit being configured to:
transmit at least one parameter to the self-propelled load bearing unit, and
receive a control signal based on the at least one parameter from the self-propelled load bearing unit for controlling the propulsion of the self-propelled load bearing unit, the self-propelled load bearing unit comprises:
at least two spaced-apart engaging elements configured to engage at least two engaging elements on the self-propelled guide unit, wherein:
at least one of the at least two spaced-apart engaging elements are positioned vertically above the center of gravity of the self-propelled load bearing unit, when the self-propelled load bearing unit travels on the floor surface, and
the at least two engaging elements carries a major portion of the weight of the self-propelled guide unit, when the self-propelled guide unit is connected to the self-propelled load bearing unit.

25. The self-propelled load bearing unit according to embodiment 24, wherein the at least one engaging element on the self-propelled load bearing unit comprises a recess or protrusion configured to engage a corresponding recess or protrusion on the self-propelled guide unit.

26. The self-propelled load bearing unit according to embodiment 25, wherein the at least one engaging element on the self-propelled load bearing unit comprises a recess configured to engage a corresponding protrusion on the self-propelled guide unit.

27. The self-propelled load bearing unit according to any one of embodiments 24-26, wherein a floor contacting plane is defined by wheel portions of the self-propelled load bearing unit configured to engage the floor surface when the self-propelled load bearing unit travels on the floor surface, and wherein the at least two engaging elements are horizontally spaced apart in a direction parallel to the floor contacting plane.

28. The self-propelled load bearing unit according to embodiment 27, wherein the at least two engaging elements are horizontally aligned on a common axis parallel to the floor contacting plane.

29. The self-propelled load bearing unit according to any one of embodiment 24-28, wherein the self-propelled load bearing unit is configured to engage the self-propelled guide unit along an engagement axis, for positioning the self-propelled guide unit relative to the self-propelled load bearing unit in a position enabling the connection between the self-propelled guide unit and the self-propelled load bearing unit, and wherein the at least two engaging elements are spaced-apart in a horizontal direction perpendicular to the engagement axis with a distance exceeding 10 cm or exceeding 20 cm.

30. The self-propelled load bearing unit according to any one of embodiments 24-28, wherein a floor contacting plane is defined by wheel portions of the self-propelled load bearing unit configured to engage the floor surface when the self-propelled load bearing unit travels on the floor surface, and wherein the at least two engaging elements are vertically spaced apart in a direction perpendicular to the floor contacting plane.

31. The self-propelled load bearing unit according to embodiment 30, wherein the at least two engaging elements are vertically aligned on a common axis parallel to the floor contacting plane.

32. The self-propelled load bearing unit according to any one of embodiment 30-31, wherein the self-propelled load bearing unit is configured to engage the self-propelled guide unit along an engagement axis, for positioning the self-propelled guide unit relative to the self-propelled load bearing unit in a position enabling the connection between the self-propelled guide unit and the self-propelled load bearing unit, and wherein the at least two engaging elements are spaced-apart in a vertical direction perpendicular to the engagement axis with a distance exceeding 10 cm or exceeding 20 cm.

33. The self-propelled load bearing unit according to any one of embodiment 24-32, wherein the self-propelled load bearing unit comprises at least four engaging elements, and wherein at least two of the four engaging elements are vertically spaced apart and at least two of the four engaging elements are horizontally spaced apart.

34. The self-propelled load bearing unit according to any one of embodiment 24-33, further comprising a second electrical connector configured to connect to a first electrical connector comprised by the self-propelled guide unit, wherein the second electrical connector is substantially facing upwards when the self-propelled load bearing unit travels on the floor surface, enabling connection of the first and second electrical connector by vertical movement of the first electrical connector.

35. The self-propelled load bearing unit according to any one of embodiment 24-34, further comprises a receiving portion configured to receive at least a portion of the self-propelled guide unit, such that the receiving portion encloses three sides of at least the portion of the self-propelled guide unit.

36. The self-propelled load bearing unit according to embodiment 35, wherein the receiving portion is configured to receive at least the portion of the self-propelled guide unit along a receival axis, and wherein the receiving portion is configured to receive at least ⅓ of the length of the self-propelled guide unit in the direction of the receival axis.

37. The self-propelled load bearing unit according to any one of embodiment 35 and 36, wherein the receiving portion comprises an entry portion, and wherein the entry portion comprises at least one rounded or chamfered surface acting as a guide for the self-propelled guide unit to enter the receiving portion.

38. The self-propelled load bearing unit according to any one of embodiment 35-37, further comprising a mechanical guide element configured to guide the self-propelled guide unit to enter the receiving portion.

39. The self-propelled load bearing unit according to any one of embodiment 38, wherein the mechanical guide element is at least two mechanical guide elements configured to engage two opposite sides of the self-propelled guide unit with two opposite sides of the receiving portion for guiding the self-propelled guide unit to enter the receiving portion.

40. The self-propelled load bearing unit according to embodiment 39, where the at least two mechanical guide elements are comprised by the self-propelled guide unit.

41. A connection system for connecting a self-propelled guide unit to a self-propelled load bearing unit, wherein the self-propelled guide unit is configured to connect to and guide the self-propelled load bearing unit, such that the self-propelled load bearing unit can travel on a floor surface when the self-propelled guide unit and the self-propelled load bearing unit are connected; the connection system comprises:

at least two engaging elements on the self-propelled load bearing unit;

at least two engaging elements on the self-propelled guide unit;

at least one actuator configured to actuate the at least two engaging element on the self-propelled guide unit, wherein:

the at least two engaging elements of the self-propelled guide unit is configured to engage the at least two engaging elements of self-propelled load bearing unit when the actuator moves at least two engaging elements of self-propelled guide unit, and wherein:

the at least two engaging elements on the self-propelled load bearing unit carries a major portion of the weight of the self-propelled guide unit, when the self-propelled guide unit is lifted from the floor surface.

42. The connection system according the embodiment 41, wherein the at least two engaging elements on the self-propelled load bearing unit each comprises a recess or protrusion configured to engage a corresponding recess or protrusion on the self-propelled guide unit.

43. The connection system according to embodiment 42, wherein each of the recess or protrusions on the self-propelled guide unit is protrusions and each of the recess or protrusions on the self-propelled load bearing unit is recesses.

44. The connection system according to embodiment 43, wherein the protrusions stabilizes the self-propelled guide unit in a first, second and third direction, all perpendicular to one another, when the protrusions are connected to the recesses.

45. The connection system according to any one of embodiment 41 to 44, wherein the self-propelled load bearing unit further comprising a second electrical connector configured to connect to a first electrical connector of the self-propelled guide unit for electrically connecting the self-propelled guide unit to the self-propelled load bearing unit.

46. The connection system according to embodiment 45, wherein the first electrical connector and second electrical connector are configured to be connected by movement of the least two engaging elements of self-propelled guide unit in a direction towards the floor surface.

47. The connection system according to any one of embodiment 41 to 46, wherein the first electrical connector and second electrical connector are configured to be connected in a substantially vertical direction.

48. The connection system according to any one of embodiment 41 to 47, wherein the self-propelled load bearing unit further comprising a receiving portion configured to receive at least a portion of the self-propelled guide unit, such that the receiving portion encloses three sides of at least the portion of the self-propelled guide unit.

49. The connection system according to embodiment 48, wherein the receiving portion is configured to receive at least the portion of the self-propelled guide unit along a receival axis, and wherein the receiving portion is configured to receive at least ⅕ of the length of the self-propelled guide unit in the direction of the receival axis.

50. The connection system according to embodiment 48 or 49, wherein the receiving portion comprises an entry portion, and wherein the entry portion comprises at least one rounded or chamfered surface acting as a guide for the self-propelled guide unit to enter the receiving portion.

51. The connection system according to any one of embodiment 48 to 50, further comprising a mechanical guide element configured to guide the self-propelled guide unit to enter the receiving portion.

52. The connection system according to embodiment 51, wherein the mechanical guide element is at least two mechanical guide elements configured to engage two opposite sides of the self-propelled guide unit with two opposite sides of the receiving portion for guiding the self-propelled guide unit to enter the receiving portion.

53. The connection system according to embodiment 52, where the at least two mechanical guide elements are comprised by the self-propelled guide unit.

54. The connection system according to any one of embodiment 41 to 53, wherein the at least two engaging elements are horizontally spaced apart.

55. The connection system according to any one of embodiment 41 to 54, wherein the at least two engaging elements comprised by the self-propelled load bearing unit is spaced apart with a distance exceeding 40% of the maximum width of the self-propelled load bearing unit.

56. The connection system according to any one of embodiment 41 to 55, wherein the at least two engaging elements comprised by the self-propelled guide unit is spaced apart with a distance exceeding 40% of the maximum width of the self-propelled guide unit.

57. The connection system according to any one of embodiment 41 to 56, wherein at least one of the at least two engaging elements is positioned vertically above the center of gravity of the self-propelled guide unit, when the self-propelled guide unit travels on the floor surface.

58. The connection system according to any one of embodiment 41 to 57, wherein the at least two engaging elements are positioned vertically above the center of gravity of the self-propelled guide unit, when the self-propelled guide unit travels on the floor surface.

59. The connection system according to any one of embodiment 45 to 47, wherein the first electrical connector is configured to be moved by the actuator.

60. The connection system according to embodiment 59, wherein the first electrical connector is configured to be moved to connect to the second electrical connector by the actuator after the actuator has moved the at least two engaging elements.

61. The connection system according to embodiment 59 or 60, wherein the first electrical connector is configured to be moved, relative to the second electrical connector, by the actuator in a direction opposite to the direction towards the floor surface.

Embodiment Set 3—Vertical Mechanical Connection Aligning Electrical Connection

1. A connection system for connecting a self-propelled guide unit to a self-propelled load bearing unit, the self-propelled guide unit being configured to guide the self-propelled load bearing unit for moving on a floor surface when the self-propelled guide unit and the self-propelled load bearing unit are connected, the connection system comprising:
   a first set of recesses or protrusions on the self-propelled guide unit,
      a second set of recesses or protrusions on the self-propelled load bearing unit,
      a first electrical connector on the self-propelled guide unit, and
      a second electrical connector on the self-propelled load bearing unit, wherein
   the first set of recesses or protrusions are configured to engage the second set of recesses or protrusions for mechanically connecting the self-propelled guide unit to the self-propelled load bearing unit and the first and second electrical connectors are configured to be connected for electrically connecting the self-propelled guide unit to the self-propelled load bearing unit, and wherein the connection system further comprises:
   an actuator configured to move at least one of the first set of recesses or protrusions and the second set of recesses or protrusions for engaging the first set of recesses or protrusions and the second set of recesses or protrusions, and wherein at least one of the first and second electrical connectors are configured to be actuated for connecting the first electrical connector to the second electrical connector, and
   a control unit for controlling the actuation of:
      at least one of the first set of recesses or protrusions and the second set of recesses or protrusions, and
      at least one of the first and second electrical connector, wherein
   the control unit is configured to control the actuation such that the first set of recesses or protrusions engages the second set of recesses or protrusions before the first electrical connector engages the second electrical connector, such that the actuation of at least one of the first set of recesses or protrusions and the second set of recesses or protrusions aligns the first electrical connector and the second electrical connector before the first electrical connector engages the second electrical connector, wherein
   the engagement of the first and second electrical connector enables transfer of electrical control signals from the self-propelled load bearing unit to the self-propelled guide unit.

2. The connection system according to embodiment 1, wherein the first set of recesses or protrusions on the self-propelled guide unit comprises a set of protrusions.

3. The connection system according to any one of embodiment 1 and 2, wherein the second set of recesses or protrusions on the self-propelled load bearing unit comprises a set of recesses.

4. The connection system according to any one of the preceding embodiments, wherein the first set of recesses or protrusions comprises a pair of horizontally aligned recesses or protrusions.

5. The connection system according to embodiment 4, wherein the pair of horizontally aligned recesses or protrusions comprises load bearing portions, and wherein the load bearing portions are spaced apart along a horizontal axis with a distance exceeding ¼ of the width of the self-propelled guide unit at the horizontal axis.

6. The connection system according to any one of the preceding embodiments, further comprising a first electrical connector on the self-propelled guide unit, and a second electrical connector on the self-propelled load bearing unit, and wherein the first and second electrical connectors are configured to be connected for electrically connecting the self-propelled guide unit to the self-propelled load bearing unit.

7. The connection system according to embodiment 6, wherein the first and second electrical connectors are configured to be connected by the movement of the first set of recesses or protrusions in a direction towards the floor surface.

8. The connection system according to any one of embodiment 6 and 7, wherein the first electrical connector is fixedly fixated to a major portion of the self-propelled guide unit.

9. The connection system according to any one of embodiment 6-8, wherein the first and second electrical connectors are configured to be connected in a substantially vertical direction.

10. The connection system according to embodiment 9, wherein the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the first and second electrical connectors are configured to be connected in a vertical direction perpendicular to the engagement axis.

11. The connection system according to any one of embodiment 4-10, wherein the first set of recesses or protrusions comprises a second pair of horizontally aligned recesses or protrusions.

12. The connection system according to any one of embodiment 3-11, wherein the set of protrusions stabilizes the self-propelled guide unit in a first, second and third direction, all perpendicular to one another, when the set of protrusions are connected to the set of recesses.

13. The connection system according to any one of the preceding embodiments, wherein the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, wherein the first set of recesses or protrusions on the self-propelled guide unit is configured to stabilize the self-propelled guide unit in at least a first and second direction, wherein the first and second directions are:
parallel to the engagement axis, and
opposite to each other.

14. The connection system according to any one of the preceding embodiments, further comprising a receiving portion on the self-propelled load bearing unit, and wherein the receiving portion is configured to receive at least a portion of the self-propelled guide unit, such that the receiving portion encloses three sides of at least the portion of the self-propelled guide unit.

15. The connection system according to embodiment 14, wherein the receiving portion is configured to receive at least the portion of the self-propelled guide unit along a receival axis, and wherein the receiving portion is configured to receive at least ⅕ of the length of the self-propelled guide unit in the direction of the receival axis.

16. The connection system according to any one of embodiment 14 and 15, wherein the receiving portion comprises an entry portion, and wherein the entry portion comprises at least one rounded or chamfered surface acting as a guide for the self-propelled guide unit to enter the receiving portion.

17. The connection system according to any one of embodiment 14-16, further comprising a mechanical guide element configured to guide the self-propelled guide unit to enter the receiving portion.

18. The connection system according to embodiment 17, wherein the mechanical guide element is at least two mechanical guide elements configured to engage two opposite sides of the self-propelled guide unit with two opposite sides of the receiving portion for guiding the self-propelled guide unit to enter the receiving portion.

19. The connection system according to embodiment 18, where the at least two mechanical guide elements are comprised by the self-propelled guide unit.

Embodiment Set 4—Verify Connection Based on Spaced-Apart Electrical Signals

1. A connection system for connecting a self-propelled guide unit to a self-propelled load bearing unit, the self-propelled guide unit being configured to guide the self-propelled load bearing unit for moving on a floor surface when the self-propelled guide unit and the self-propelled load bearing unit are connected, the connection system comprising:
a first electrical connector on the self-propelled guide unit, the first electrical connector comprising a first plurality of recesses or protrusions,
a second electrical connector on the self-propelled load bearing unit, the second electrical connector comprising a second plurality of recesses or protrusions,
an actuator configured to move the first electrical connector in a direction towards the second electrical connector, wherein
the first electrical connector is configured to be connected to the second electrical connector such that the first and second plurality of recesses or protrusions are engaged thereby electrically connecting the self-propelled guide unit to the self-propelled load bearing unit, wherein
a first pair of recesses or protrusions of the first and second plurality of recesses or protrusions are configured to transfer a first electrical status signal from the self-propelled load bearing unit to the self-propelled guide unit to verify proper engagement, and
a second pair of recesses or protrusions of the first and second plurality of recesses or protrusions are configured to transfer a second electrical status signal from the self-propelled load bearing unit to the self-propelled guide unit to verify proper engagement, and wherein the first and second pair of recesses or protrusions are spaced apart such that at least one third pair of recesses or protrusions for transferring electrical signals from the self-propelled guide unit to the self-propelled load bearing unit are placed between the first and second pairs of recesses or protrusions.

2. The connection system according to embodiment 1, wherein the first and second pair are spaced apart with a distance exceeding 20% of the width of the first electrical connector, preferably exceeding 40% of the width of the first electrical connector and most preferably exceeding 60% of the width of the first electrical connector.

3. The connection system according to embodiment 1 or 2, wherein the first and second pair are spaced apart with a distance exceeding 5 cm, preferably exceeding 10 cm.

4. The connection system according to any one of the preceding embodiments, wherein the first and second pair of recesses or protrusions are configured to transfer a electrical status signals with a frequency exceeding 1 Hz, preferably exceeding 10 Hz and most preferably exceeding 100 Hz.

5. The connection system according to any one of the preceding embodiments, wherein the first plurality of recesses or protrusions are divided into a first number of sections and the second plurality of recesses or protrusions are divided into a second number of sections, wherein each of the sections of the first and second number of sections comprises some of the portion of the recesses or protrusions of the first and the second plurality of recesses or protrusions configured to transfer electrical control signals.

6. The connection system according to embodiment 5, wherein each of the sections of the first and second number of sections comprises a mechanical guide element structure configured to aid in correct engagement between the first and second plurality of recesses or protrusions.

7. The connection system according to any one of preceding embodiments, further comprising a first set of recesses or protrusions on the self-propelled guide unit and a second set of recesses or protrusions on the self-propelled load bearing unit, wherein the first set of recesses or protrusions are configured to engage the second set of recesses or protrusions for mechanically connecting the self-propelled guide unit to the self-propelled load bearing unit.

8. The connection system according to embodiment 7, wherein the actuator is configured to move at least one of the first set of recesses or protrusions and the second set of recesses or protrusions for engaging the first set of recesses or protrusions with the second set of recesses or protrusions.

9. The connection system according to embodiment 8, further comprising a control unit for controlling the actuation of:
at least one of the first set of recesses or protrusions and the second set of recesses or protrusions, and
at least one of the first and second electrical connector, wherein
the control unit is configured to control the actuation such that the first set of recesses or protrusions engages the second set of recesses or protrusions before the first electrical connector engages the second electrical connector, such that the actuation of at least one of the first set of recesses or protrusions and the second set of recesses or protrusions aligns the first electrical and the second electrical connector before the first electrical connector engages the second electrical connector.

10. The connection system according to embodiment 9, wherein the first and second electrical connectors are configured to be connected by the movement of the first set of recesses or protrusions in a direction towards the floor surface.

11. The connection system according to any one of the preceding embodiments, wherein the first and second electrical connectors are configured to be connected in a substantially vertical direction.

What is claimed is:

1. A self-propelled guide unit configured to connect to and guide a self-propelled load bearing unit, such that the self-propelled load bearing unit can travel on a floor surface when the self-propelled guide unit and the self-propelled load bearing unit are connected, the self-propelled guide unit being configured to:
receive at least one parameter from the self-propelled load bearing unit,
use the at least one parameter in the generation of a control signal, and
transmit the generated control signal to the self-propelled load bearing unit for controlling the propulsion of the self-propelled load bearing unit, the self-propelled guide unit comprises:
at least one engaging element configured to engage at least one corresponding engaging element on the self-propelled load bearing unit, and
an actuator configured to lift the self-propelled guide unit from the floor surface by moving the at least one engaging element on the self-propelled guide unit, in a direction towards the floor surface, such that:
the at least one engaging element on the self-propelled guide unit engages the at least one corresponding engaging element on the self-propelled load bearing unit, and
the at least one engaging element on the self-propelled guide unit carries a portion of the weight of the self-propelled guide unit, when the self-propelled guide unit is lifted from the floor surface.

2. The self-propelled guide unit according to claim 1, wherein the at least one engaging element on the self-propelled guide unit comprises a protrusion configured to engage a corresponding recess on the self-propelled load bearing unit.

3. The self-propelled guide unit according to claim 1, wherein the at least one engaging element on the self-propelled guide unit is configured to stabilize the self-propelled guide unit in at least a first and second direction when the self-propelled guide unit is connected to the self-propelled load bearing unit, wherein the first and second directions are:
perpendicular to the direction towards the floor surface, and
opposite to each other.

4. The self-propelled guide unit according to claim 1, wherein the self-propelled guide unit comprises at least two engaging elements being spaced apart.

5. The self-propelled guide unit according to claim 4, wherein a floor contacting plane is defined by wheel portions of the self-propelled guide unit configured to engage the floor surface when the self-propelled guide unit travels on the floor surface, and wherein the at least two engaging elements are horizontally spaced apart in a direction parallel to the floor contacting plane.

6. The self-propelled guide unit according to claim 4, wherein the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the self-propelled guide unit has a maximum width at the widest portion of the self-propelled guide unit, in a horizontal direction perpendicular to the engagement axis, and wherein, the at least two engaging elements on the self-propelled guide unit are spaced apart with a distance exceeding 20% of the maximum width.

7. The self-propelled guide unit according to claim 4, wherein a floor contacting plane is defined by wheel portions of the self-propelled guide unit configured to engage the floor surface when the self-propelled guide unit travels on the floor surface, and wherein the at least two engaging elements on the self-propelled guide unit are vertically spaced apart in a direction perpendicular to the floor contacting plane.

8. The self-propelled guide unit according to claim 4, wherein the self-propelled guide unit is configured to engage the self-propelled load bearing unit along an engagement axis, for positioning the self-propelled guide unit relative to the self-propelled load bearing unit in a position enabling the connection between the self-propelled guide unit and the self-propelled load bearing unit, and wherein the self-propelled guide unit has a maximum height at the tallest portion of the self-propelled guide unit, in a vertical direction perpendicular to the engagement axis, and wherein the at least two engaging elements on the self-propelled guide unit are vertically spaced apart with a distance exceeding 20% of the maximum height.

9. The self-propelled guide unit according to claim 1, wherein the at least one engaging element on the self-propelled guide unit is positioned vertically above the center of gravity of the self-propelled guide unit, when the self-propelled guide unit travels on the floor surface.

10. The self-propelled guide unit according to claim 1, wherein the at least one engaging element on the self-propelled guide unit has an average vertical distance from the floor contacting plane, and wherein the actuator withholds force from a position having a longer vertical distance from the floor contacting plane than the average vertical distance.

11. The self-propelled guide unit according to claim 1, further comprising a first electrical connector configured to connect to a second electrical connector comprised by the self-propelled load bearing unit, wherein the first electrical connector is configured to be moved by the actuator.

12. The self-propelled guide unit according to claim 11, wherein the first electrical connector is configured to be moved to connect to the second electrical connector by the actuator after the actuator has moved the at least one engaging element on the self-propelled guide unit.

13. The self-propelled guide unit according to claim 11, wherein the first electrical connector is configured to be moved, relative to the second electrical connector, by the actuator in a direction opposite to the direction towards the floor surface.

14. A connection system for connecting a self-propelled guide unit to a self-propelled load bearing unit, wherein the self-propelled guide unit is configured to connect to and guide the self-propelled load bearing unit, such that the self-propelled load bearing unit can travel on a floor surface when the self-propelled guide unit and the self-propelled load bearing unit are connected; the connection system comprises:

at least one engaging element, on the self-propelled load bearing unit, at least one engaging element, on the self-propelled guide unit, at least one actuator, on the self-propelled guide unit, configured to move the at least one engaging element on the self-propelled guide unit in a direction towards the floor surface for lifting the self-propelled guide unit, wherein:

the at least one engaging element on the self-propelled guide unit is configured to engage the at least one engaging element on the self-propelled load bearing unit when the actuator moves the at least one engaging element on the self-propelled guide unit in a direction towards the floor surface, and wherein the at least one engaging element on the self-propelled load bearing unit carries a portion of the weight of the self-propelled guide unit, when the self-propelled guide unit is lifted from the floor surface.

15. The connection system according to claim 14, wherein the at least one engaging element on the self-propelled load bearing unit comprises a set of recesses or protrusions configured to engage a corresponding set of recesses or protrusions comprised by the self-propelled guide unit.

16. The connection system according to any one of claim 14, wherein the self-propelled load bearing unit further comprises a second electrical connector configured to connect to a first electrical connector comprised by the self-propelled guide unit for electrically connecting the self-propelled guide unit to the self-propelled load bearing unit.

17. The connection system according to claim 16, wherein the first electrical connector and second electrical connector are configured to engage in connection by movement of the least one engaging element of the self-propelled guide unit in a direction towards the floor surface.

18. The connection system according to claim 16, wherein the first electrical connector is configured to be moved, relative to the second electrical connector, by the actuator in a direction opposite to the direction towards the floor surface.

19. The connection system according to claim 14, further comprising a receiving portion on the self-propelled load bearing unit, the receiving portion being configured to receive at least a portion of the self-propelled guide unit, such that the receiving portion encloses three sides of at least the portion of the self-propelled guide unit.

20. A system for intralogistics comprising:

at least one self-propelled load bearing unit; and a self-propelled guide unit configured to connect to and guide a self-propelled load bearing unit, such that the self-propelled load bearing unit can travel on a floor surface when the self-propelled guide unit and the self-propelled load bearing unit are connected, the self-propelled guide unit being configured to:

receive at least one parameter from the self-propelled load bearing unit, use the at least one parameter in the generation of a control signal, and transmit the generated control signal to the self-propelled load bearing unit for controlling the propulsion of the self-propelled load bearing unit, the self-propelled guide unit comprises:

at least one engaging element configured to engage at least one corresponding engaging element on the self-propelled load bearing unit, and an actuator configured to lift the self-propelled guide unit from the floor surface by moving the at least one engaging element on the self-propelled guide unit in a direction towards the floor surface, such that:

the at least one engaging element on the self-propelled guide unit engages the at least one corresponding engaging element on the self-propelled load bearing unit, and the at least one engaging element on the self-propelled guide unit carries a portion of the weight of the self-propelled guide unit, when the self-propelled guide unit is lifted from the floor surface.

\* \* \* \* \*